United States Patent
Lomayev et al.

(10) Patent No.: US 10,886,988 B2
(45) Date of Patent: Jan. 5, 2021

(54) APPARATUS, SYSTEM AND METHOD OF COMMUNICATING A PHYSICAL LAYER PROTOCOL DATA UNIT (PPDU)

(71) Applicant: INTEL IP CORPORATION, Santa Clara, CA (US)

(72) Inventors: Artyom Lomayev, Nizhny Novgorod (RU); Alexander Maltsev, Nizhny Novgorod (RU); Michael Genossar, Modiin (IL); Claudio Da Silva, Portland, OR (US); Carlos Cordeiro, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 16/624,449

(22) PCT Filed: Jun. 14, 2018

(86) PCT No.: PCT/US2018/037467
§ 371 (c)(1),
(2) Date: Dec. 19, 2019

(87) PCT Pub. No.: WO2018/236660
PCT Pub. Date: Dec. 27, 2018

(65) Prior Publication Data
US 2020/0127719 A1 Apr. 23, 2020

Related U.S. Application Data

(60) Provisional application No. 62/521,810, filed on Jun. 19, 2017, provisional application No. 62/524,755, filed on Jun. 26, 2017.

(51) Int. Cl.
H04B 7/06 (2006.01)
H04B 7/0456 (2017.01)
H04W 80/02 (2009.01)

(52) U.S. Cl.
CPC ......... *H04B 7/0617* (2013.01); *H04B 7/0456* (2013.01); *H04B 7/0639* (2013.01); *H04W 80/02* (2013.01)

(58) Field of Classification Search
CPC .. H04B 7/0617; H04B 7/0456; H04B 7/0639; H04W 80/02
See application file for complete search history.

(56) References Cited

U.S. PATENT DOCUMENTS

| 8,437,440 B1 | 5/2013 | Zhang et al. |
| 9,100,074 B1 | 8/2015 | Zhang et al. |

(Continued)

FOREIGN PATENT DOCUMENTS

| WO | 2016/175943 | 11/2016 |
| WO | 2017/044420 | 3/2017 |

OTHER PUBLICATIONS

International Search Report and the Written Opinion for International Application No. PCT/US2018/037467, dated Nov. 28, 2018, 11 pages.

(Continued)

*Primary Examiner* — Freshteh N Aghdam
(74) *Attorney, Agent, or Firm* — Shichrur & Co.

(57) ABSTRACT

Some demonstrative embodiments include apparatuses, devices, systems and methods of communicating a Physical Layer Protocol Data Unit (PPDU). For example, an Enhanced Directional Multi-Gigabit (DMG) (EDMG) station (STA) may be configured to generate a Physical Layer (PHY) PPDU; generate one or more PPDU waveforms corresponding to one or more respective transmit chains for digital beamforming transmission of the PPDU; and transmit the PPDU via the one or more transmit chains over a channel bandwidth of at least 2.16 Gigahertz (GHz) in a frequency band above 45 GHz.

24 Claims, 4 Drawing Sheets

(56) References Cited

U.S. PATENT DOCUMENTS

| | | | |
|---|---|---|---|
| 2017/0048095 A1 | 2/2017 | Sun et al. | |
| 2017/0078008 A1 | 3/2017 | Kasher et al. | |
| 2017/0127386 A1* | 5/2017 | Kasher | H04B 7/0413 |
| 2017/0257201 A1* | 9/2017 | Eitan | H04L 27/2613 |
| 2018/0324695 A1* | 11/2018 | Trainin | H04W 52/0216 |
| 2019/0191331 A1* | 6/2019 | Park | H04L 27/18 |
| 2019/0288763 A1 | 9/2019 | Oteri et al. | |
| 2020/0007211 A1 | 1/2020 | Liu et al. | |
| 2020/0162135 A1 | 5/2020 | Sun et al. | |
| 2020/0252156 A1 | 8/2020 | Lomayev et al. | |
| 2020/0304189 A1 | 9/2020 | Lomayev et al. | |
| 2020/0322008 A1 | 10/2020 | Lomayev et al. | |
| 2020/0322019 A1 | 10/2020 | Lomayev et al. | |
| 2020/0328842 A1 | 10/2020 | Lomayev et al. | |
| 2020/0328843 A1 | 10/2020 | Lomayev et al. | |
| 2020/0358491 A1 | 11/2020 | Lomayev et al. | |

OTHER PUBLICATIONS

Artyom Lomayev et al., 'Proposed Comment Resolution for CID 63, 68 in 11 ay', IEEE 802.11-17/0893r2, Jun. 12, 2017, 9 pages.

Claudio Da Silva et al., 'EDMG Control Mode Data Field', IEEE 802.11-17/0277r0, Feb. 27, 2017, 5 pages.

Takenori Sakamoto et al., 'Comment Resolution on EDMG A-PPDU Structure', IEEE 8021 1-17/0760r3, May 10, 2017, 9 pages.

International Preliminary Report on Patentability for International Application No. PCT/US2018/037467 dated Jan. 2, 2020, 8 pages.

International Search Report and the Written Opinion for International Application No. PCT/US2018/039248, dated Oct. 26, 2018, 13 pages.

Artyom Lomayev et al., '30.5.2 Transmitter Block Diagram for SC Mode', IEEE 802.11-17/0752r2, May 8, 2017, 7 pages.

Artyom Lomayev et al., '29.5.7.27 Encoding', IEEE 802.11-17/0214r1, Feb. 14, 2017, 6 pages.

Artyom Lomayev et al., '30.5.8 Non-EDMG Duplicate Transmission', IEEE 802.11-17/052510, Mar. 21, 2017, 6 pages.

IEEE Std 802.11™-2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.

International Preliminary Report on Patentability for International Application No. PCT/US2018/039248, dated Jan. 9,2020, 10 pages.

International Search Report and the Written Opinion for International Application No. PCT/US2018/035792, dated Sep. 27, 2018, 13 pages.

International Preliminary Report on Patentability for International Application No. PCT/US2018/035792, dated Dec. 19,2019, 10 pages.

Claudio Da Silva, Intel, "64 EDMG control mode", IEEE 802.11-16/01630r0, Dec. 21, 2016, 6 pages.

Artyom Lomayev et al., "30.5.8 Non-EDMG Duplicate Transmission", IEEE 802.11-17/0525r1, Mar. 29, 2017, 6 pages.

Christopher Hansen, Peraso, "Draft text for TX Masks", IEEE 802.11-1611627r0, Dec. 21, 2016, 6 pages.

International Search Report and the Written Opinion for International Application No. PCT/US2018/052998, dated Jan. 17, 2019, 13 pages.

Artyom Lomayev et al., 'Proposed Comment Resolution for CID 1, 2, 23, 525', IEEE 802.11-17/0880r1, Jul. 9, 2017, 12 pages.

Takenori Sakamoto et al., 'EDMG-Header-A Encoding and Modulation for EDMG SC mode A-PPDU', IEEE 802.11-17/1411r2, Sep. 13, 2017, 6 pages.

Artyom Lomayev et al., '30.6.8 OFDM PPDU Transmission', IEEE 802.11-17/1568r0, Oct. 10, 2017, 12 pages.

International Preliminary Report on Patentability for International Application No. PCT/US2018/052998, dated Apr. 30, 2020, 10 pages.

Notice of Allowance for U.S. Appl. No. 16/898,489, dated Aug. 18, 2020, 16 pages.

Notice of Allowance for U.S. Appl. No. 16/910,243, dated Sep. 3, 2020, 21 pages.

* cited by examiner

APPARATUS, SYSTEM AND METHOD OF COMMUNICATING A PHYSICAL LAYER PROTOCOL DATA UNIT (PPDU)

CROSS REFERENCE

This application claims the benefit of and priority from US Provisional Patent Application No. 62/524,755 entitled "Apparatus, System and Method of Communicating a Physical Layer Protocol Data Unit (PPDU)", filed Jun. 26, 2017, and from U.S. Provisional Patent Application No. 62/521,810 entitled "Apparatus, System and Method of Communicating a Physical Layer Protocol Data Unit (PPDU)", filed Jun. 19, 2017, the entire disclosures of which are incorporated herein by reference.

TECHNICAL FIELD

Embodiments described herein generally relate to communicating a Physical Layer Protocol Data Unit (PPDU).

BACKGROUND

A wireless communication network in a millimeter-wave band may provide high-speed data access for users of wireless communication devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
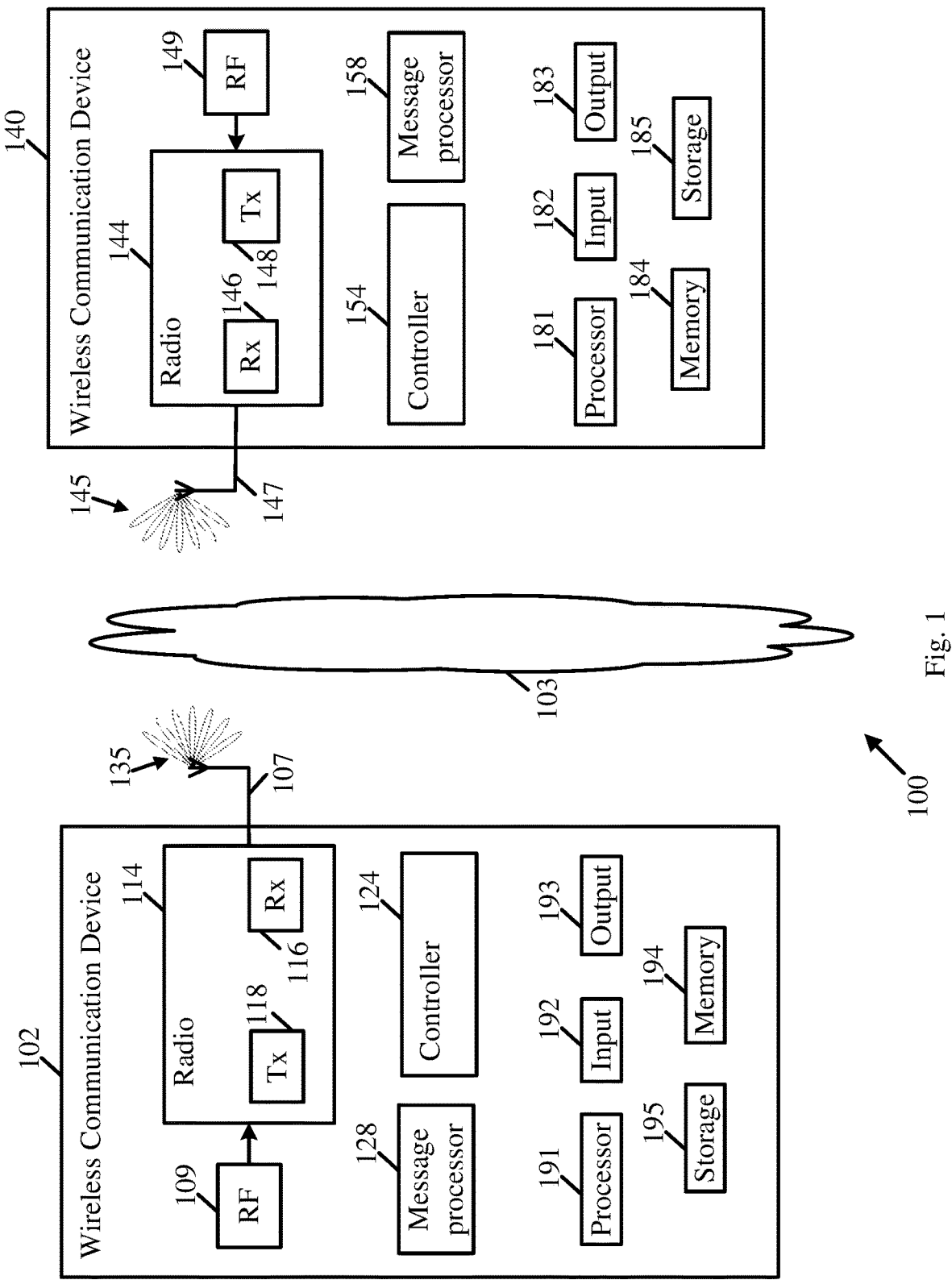
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (*IEEE 802.11-2016, IEEE Standard for Information technology—Telecommunications and information exchange between systems Local and metropolitan area networks— Specific requirements Part 11: Wireless LAN Medium Access Control (MAC) and Physical Layer (PHY) Specifications, Dec. 7, 2016*); and/or IEEE 802.11ay (*P802.11ay/D1.0 Draft Standard for Information Technology—Telecommunications and Information Exchange Between Systems—Local and Metropolitan Area Networks—Specific Requirements Part 11: Wireless LAN Medium Access Control (MAC) and Physical Layer (PHY) Specifications—Amendment 7: Enhanced Throughput for Operation in License Exempt Bands Above 45 GHz, November, 2017*)) and/or future versions and/or derivatives thereof, devices and/or networks operating in accordance with existing WFA Peer-to-Peer (P2P) specifications (*WiFi P2P technical specification, version 1.7, Jul. 6, 2016*) and/or future versions and/or derivatives thereof, devices and/or networks operating in accordance with existing Wireless-Gigabit-Alliance (WGA) specifications (including *Wireless Gigabit Alliance, Inc WiGig MAC and PHY Specification Version 1.1, April 2011,*

*Final specification*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band above 45 Gigahertz (GHz), e.g., 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHz, a frequency band above 45 GHz, a 5G frequency band, a frequency band below 20 GHz, e.g., a Sub 1 GHz (S1G) band, a 2.4 GHz band, a 5 GHz band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., at least 7 Gigabit per second, at least 30 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, and/or one more other devices.

In some demonstrative embodiments, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a WiFi channel, a 5G channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG channels. In other embodiments WM 103 may include any other directional channels.

In other embodiments, WM 103 may include any other type of channel over any other frequency band.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, an mmWave band, a 5G band, and/or any other band, for example, a 2.4 GHz band, a 5 GHz band, a S1G band, and/or any other band.

In some demonstrative embodiments, radios 114 and/or 144 may include, or may be associated with one or more, e.g., a plurality of, directional antennas.

In some demonstrative embodiments, device 102 may include one or more, e.g., a plurality of, directional antennas 107, and/or device 140 may include on or more, e.g., a plurality of, directional antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include directional antennas, which may be steered to one or more beam directions. For example, antennas 107 may be steered to one or more beam directions 135, and/or antennas 147 may be steered to one or more beam directions 145.

In some demonstrative embodiments, antennas 107 and/or 147 may include and/or may be implemented as part of a single Phased Antenna Array (PAA).

In some demonstrative embodiments, antennas 107 and/or 147 may be implemented as part of a plurality of PAAs, for example, as a plurality of physically independent PAAs.

In some demonstrative embodiments, a PAA may include, for example, a rectangular geometry, e.g., including an integer number, denoted M, of rows, and an integer number, denoted N, of columns. In other embodiments, any other types of antennas and/or antenna arrays may be used.

In some demonstrative embodiments, antennas 107 and/or antennas 147 may be connected to, and/or associated with, one or more Radio Frequency (RF) chains.

In some demonstrative embodiments, device 102 may include one or more, e.g., a plurality of, RF chains 109 connected to, and/or associated with, antennas 107.

In some demonstrative embodiments, one or more of RF chains 109 may be included as part of, and/or implemented as part of one or more elements of radio 114, e.g., as part of transmitter 118 and/or receiver 116.

In some demonstrative embodiments, device 140 may include one or more, e.g., a plurality of, RF chains 149 connected to, and/or associated with, antennas 147.

In some demonstrative embodiments, one or more of RF chains 149 may be included as part of, and/or implemented as part of one or more elements of radio 144, e.g., as part of transmitter 148 and/or receiver 146.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 128 may be configured to perform any other additional or alternative functionality and/or may include any other additional or alternative components to generate and/or process a message to be transmitted.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, a MAC Protocol Data Unit (MPDU); at least one second component configured to convert the message into a PHY PPDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 158 may be configured to perform any other additional or alternative functionality and/or may include any other additional or alternative components to generate and/or process a message to be transmitted.

In some demonstrative embodiments, message processors 128 and/or 158 may include, or may be implemented, partially or entirely, by circuitry and/or logic, e.g., one or more processors including circuitry and/or logic, memory circuitry and/or logic, MAC circuitry and/or logic, PHY circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114.

In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, device 102 and/or device 140 may include, operate as, perform the role of, and/or perform one or more functionalities of, one or more STAs. For example, device 102 may include at least one STA, and/or device 140 may include at least one STA.

In some demonstrative embodiments, device 102 and/or device 140 may include, operate as, perform the role of, and/or perform one or more functionalities of, one or more DMG STAs. For example, device 102 may include, operate as, perform the role of, and/or perform one or more functionalities of, at least one DMG STA, and/or device 140 may include, operate as, perform the role of, and/or perform one or more functionalities of, at least one DMG STA.

In other embodiments, devices 102 and/or 140 may include, operate as, perform the role of, and/or perform one or more functionalities of, any other wireless device and/or station, e.g., a WLAN STA, a WiFi STA, and the like.

In some demonstrative embodiments, device 102 and/or device 140 may be configured operate as, perform the role of, and/or perform one or more functionalities of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102 and/or device 140 may be configured to operate as, perform the role of, and/or perform one or more functionalities of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102 and/or device 140 may operate as, perform the role of, and/or perform one or more functionalities of, any other additional or alternative device and/or station.

In one example, a station (STA) may include a logical entity that is a singly addressable instance of a MAC and PHY interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments devices 102 and/or 140 may be configured to communicate over a Next Generation 60 GHz (NG60) network, an Enhanced DMG (EDMG) network, and/or any other network. For example, devices 102 and/or 140 may perform Multiple-Input-Multiple-Output (MIMO) communication, for example, for communicating over the NG60 and/or EDMG networks, e.g., over an NG60 or an EDMG frequency band.

In some demonstrative embodiments, devices 102 and/or 140 may be configured to operate in accordance with one or more Specifications, for example, including one or more *IEEE* 802.11 *Specifications*, e.g., an *IEEE* 802.11-2016 *Specification*, an *IEEE* 802.11*ay Specification*, and/or any other specification and/or protocol.

Some demonstrative embodiments may be implemented, for example, as part of a new standard in an mmWave band, e.g., a 60 GHz frequency band or any other directional band, for example, as an evolution of an *IEEE* 802.11-2016 *Specification and/or an IEEE* 802.11*ad Specification*.

In some demonstrative embodiments, devices 102 and/or 140 may be configured according to one or more standards, for example, in accordance with an *IEEE* 802.11*ay Standard*, which may be, for example, configured to enhance the efficiency and/or performance of an *IEEE* 802.11*ad Specification*, which may be configured to provide Wi-Fi connectivity in a 60 GHz band.

Some demonstrative embodiments may enable, for example, to significantly increase the data transmission rates defined in the *IEEE* 802.11*ad Specification*, for example, from 7 Gigabit per second (Gbps), e.g., up to 30 Gbps, or to any other data rate, which may, for example, satisfy growing demand in network capacity for new coming applications.

Some demonstrative embodiments may be implemented, for example, to allow increasing a transmission data rate, for example, by applying MIMO and/or channel bonding techniques.

In some demonstrative embodiments, devices 102 and/or 140 may be configured to communicate MIMO communications over the mmWave wireless communication band.

In some demonstrative embodiments, device 102 and/or device 140 may be configured to support one or more mechanisms and/or features, for example, channel bonding, Single User (SU) MIMO, and/or Multi-User (MU) MIMO, for example, in accordance with an *IEEE* 802.11*ay Standard* and/or any other standard and/or protocol.

In some demonstrative embodiments, device 102 and/or device 140 may include, operate as, perform a role of, and/or perform the functionality of, one or more EDMG STAs. For example, device 102 may include, operate as, perform a role of, and/or perform the functionality of, at least one EDMG STA, and/or device 140 may include, operate as, perform a role of, and/or perform the functionality of, at least one EDMG STA.

In some demonstrative embodiments, devices 102 and/or 140 may implement a communication scheme, which may include PHY and/or MAC layer schemes, for example, to support one or more applications, and/or increased transmission data rates, e.g., data rates of up to 30 Gbps, or any other data rate.

In some demonstrative embodiments, the PHY and/or MAC layer schemes may be configured to support frequency channel bonding over an mmWave band, e.g., over a 60 GHz band, SU MIMO techniques, and/or MU MIMO techniques.

In some demonstrative embodiments, devices 102 and/or 140 may be configured to implement one or more mechanisms, which may be configured to enable SU and/or MU communication of Downlink (DL) and/or Uplink frames (UL) using a MIMO scheme.

In some demonstrative embodiments, device 102 and/or device 140 may be configured to implement one or more MU communication mechanisms. For example, devices 102 and/or 140 may be configured to implement one or more MU mechanisms, which may be configured to enable MU communication of DL frames using a MIMO scheme, for example, between a device, e.g., device 102, and a plurality of devices, e.g., including device 140 and/or one or more other devices.

In some demonstrative embodiments, devices 102 and/or 140 may be configured to communicate over an NG60 network, an EDMG network, and/or any other network and/or any other frequency band. For example, devices 102 and/or 140 may be configured to communicate DL MIMO transmissions and/or UL MIMO transmissions, for example, for communicating over the NG60 and/or EDMG networks.

Some wireless communication Specifications, for example, the *IEEE* 802.11*ad*-2012 *Specification*, may be configured to support a SU system, in which a STA may transmit frames to a single STA at a time. Such Specifications may not be able, for example, to support a STA transmitting to multiple STAs simultaneously, for example, using a MU-MIMO scheme, e.g., a DL MU-MIMO, or any other MU scheme.

In some demonstrative embodiments, devices 102 and/or 140 may be configured to communicate over a channel bandwidth, e.g., of at least 2.16 GHz, in a frequency band above 45 GHz.

In some demonstrative embodiments, devices 102 and/or 140 may be configured to implement one or more mechanisms, which may, for example, enable to extend a single-channel BW scheme, e.g., a scheme in accordance with the *IEEE* 802.11*ad Specification* or any other scheme, for higher data rates and/or increased capabilities, e.g., as described below.

In one example, the single-channel BW scheme may include communication over a 2.16 GHz channel (also referred to as a "single-channel" or a "DMG channel").

In some demonstrative embodiments, devices 102 and/or 140 may be configured to implement one or more channel bonding mechanisms, which may, for example, support communication over a channel BW (also referred to as a "wide channel", an "EDMG channel", or a "bonded channel") including two or more channels, e.g., two or more 2.16 GHz channels, e.g., as described below.

In some demonstrative embodiments, the channel bonding mechanisms may include, for example, a mechanism and/or an operation whereby two or more channels, e.g., 2.16 GHz channels, can be combined, e.g., for a higher bandwidth of packet transmission, for example, to enable achieving higher data rates, e.g., when compared to transmissions over a single channel. Some demonstrative embodiments are described herein with respect to communication over a channel BW including two or more 2.16 GHz channels, however other embodiments may be implemented with respect to communications over a channel bandwidth, e.g., a "wide" channel, including or formed by any other number of two or more channels, for example, an aggregated channel including an aggregation of two or more channels.

In some demonstrative embodiments, device 102 and/or device 140 may be configured to implement one or more channel bonding mechanisms, which may, for example, support an increased channel bandwidth, for example, a channel BW of 4.32 GHz, a channel BW of 6.48 GHz, a channel BW of 8.64 GHz, and/or any other additional or alternative channel BW, e.g., as described below.

In some demonstrative embodiments, device 102 and/or device 140 may be configured to implement one or more channel bonding mechanisms, which may, for example, support an increased channel bandwidth, for example, a channel BW of 4.32 GHz, e.g., including two 2.16 Ghz channels according to a channel bonding factor of two, a channel BW of 6.48 GHz, e.g., including three 2.16 Ghz channels according to a channel bonding factor of three, a channel BW of 8.64 GHz, e.g., including four 2.16 Ghz channels according to a channel bonding factor of four, and/or any other additional or alternative channel BW, e.g., including any other number of 2.16 Ghz channels and/or according to any other channel bonding factor.

In some demonstrative embodiments, device 102 and/or device 140 may be configured to communicate one or more transmissions over one or more channel BWs, for example, including a channel BW of 2.16 GHz, a channel BW of 4.32 GHz, a channel BW of 6.48 GHz, a channel BW of 8.64 GHz and/or any other channel BW.

In some demonstrative embodiments, introduction of MIMO may be based, for example, on implementing robust transmission modes and/or enhancing the reliability of data transmission, e.g., rather than the transmission rate, compared to a Single Input Single Output (SISO) case. For example, one or more Space Time Block Coding (STBC) schemes utilizing a space-time channel diversity property may be implemented to achieve one or more enhancements for the MIMO transmission.

In some demonstrative embodiments, devices 102 and/or 140 may be configured to generate, process, transmit and/or receive a PHY Protocol Data Unit (PPDU) having a PPDU format (also referred to as "EDMG PPDU format"), which may be configured, for example, for communication between EDMG stations, e.g., as described below.

In some demonstrative embodiments, a PPDU, e.g., an EDMG PPDU, may include at least one non-EDMG fields, e.g., a legacy field, which may be identified, decodable, and/or processed by one or more devices ("non-EDMG devices", or "legacy devices"), which may not support one or more features and/or mechanisms ("non-legacy" mechanisms or "EDMG mechanisms"). For example, the legacy devices may include non-EDMG stations, which may be, for example, configured according to an *IEEE* 802.11-2016 *Standard*, and the like. For example, a non-EDMG station may include a DMG station, which is not an EDMG station.

Figure 2:
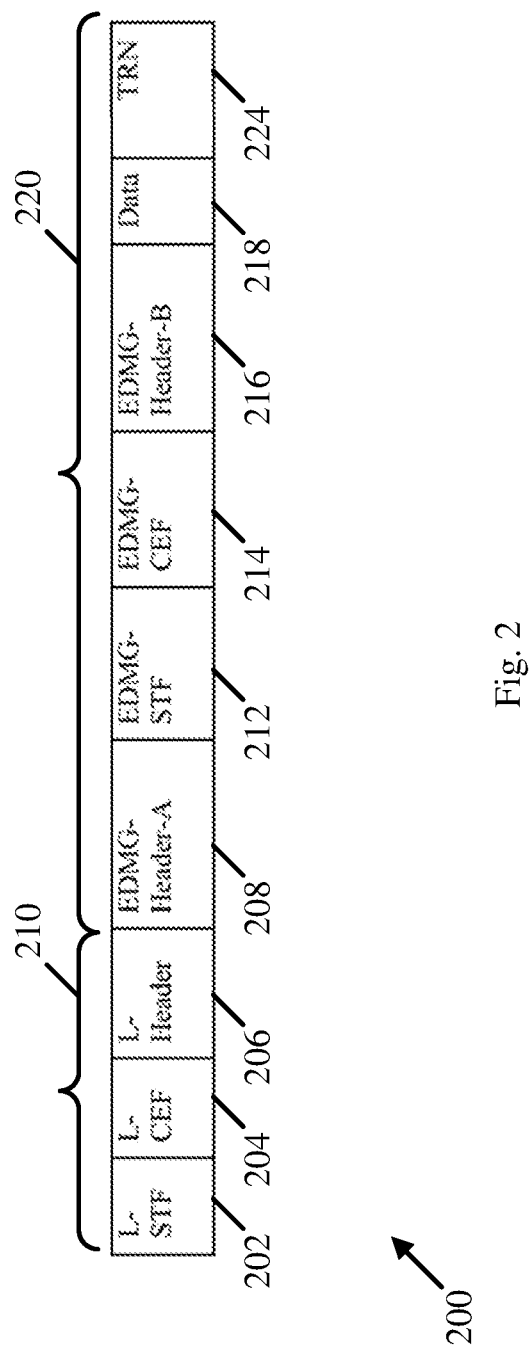
FIG. 2 is a schematic illustration of an Enhanced Directional Multi-Gigabit (EDMG) Physical Layer Protocol Data Unit (PPDU) format, which may be implemented in accordance with some demonstrative embodiments.

Reference is made to FIG. 2, which schematically illustrates an EDMG PPDU format 200, which may be implemented in accordance with some demonstrative embodiments. In one example, devices 102 (FIG. 1) and/or 140 (FIG. 1) may be configured to generate, transmit, receive and/or process one or more EDMG PPDUs having the structure and/or format of EDMG PPDU 200.

In one example, devices 102 (FIG. 1) and/or 140 (FIG. 1) may communicate EDMG PPDU 200, for example, as part of a transmission over a channel, e.g., an EDMG channel, having a channel bandwidth including one or more 2.16 GHz channels, e.g., as described below.

In some demonstrative embodiments, as shown in FIG. 2, EDMG PPDU 200 may include a non-EDMG portion 210 ("legacy portion"), e.g., as described below.

In some demonstrative embodiments, as shown in FIG. 2, non-EDMG portion 210 may include a non-EDMG (legacy) Short Training Field (STF) (L-STF) 202, a non-EDMG (Legacy) Channel Estimation Field (CEF) (L-CEF) 204, and/or a non-EDMG header (L-header) 206.

In some demonstrative embodiments, as shown in FIG. 2, EDMG PPDU 200, may include an EDMG portion 220, for example, following non-EDMG portion 210, e.g., as described below.

In some demonstrative embodiments, as shown in FIG. 2, EDMG portion 220 may include a first EDMG header, e.g., an EDMG-Header-A 208, an EDMG-STF 212, an EDMG-CEF 214, a second EDMG header, e.g., an EDMG-Header-B 216, a Data field 218, and/or one or more beamforming training fields, e.g., a training (TRN) field 224.

In some demonstrative embodiments, EDMG portion 220 may include some or all of the fields shown in FIG. 2 and/or one or more other additional or alternative fields.

In some demonstrative embodiments, Header B field 216 may be included, for example, in EDMG MU PPDUs, for example, on a per STA basis.

In some demonstrative embodiments, Header B field 216 corresponding to a STA addressed by the EDMG MU PPDU may include, for example, information relating to a transmission of a data unit, for example, a PHY Service Data Unit (PSDU) to the STA.

In some demonstrative embodiments, EDMG Header B field 216 may include for example, 64 bits, e.g., as described below. In other embodiments, the EDMG Header B field 216 may include any other number of bits.

In one example, EDMG Header B field 216 corresponding to the STA may include, for example, at least a scrambler seed field, a PSDU length field, e.g., to indicate a length of the PSDU to the STA, and/or one or more Modulation and Coding Scheme (MCS) fields to indicate one or more MCSs. For example, the Header B field may include first and second MCS fields to indicate MCSs for first and second respective spatial streams.

In other embodiments, EDMG Header B field 216 may include any other additional or alternative fields and/or information.

Referring back to FIG. 1, in some demonstrative embodiments, devices 102 and/or 140 may be configured to generate, transmit, receive and/or process one or more transmissions, e.g., including one or more non-EDMG PPDUs and/or EDMG PPDUs, e.g., as described below.

In some demonstrative embodiments, devices 102 and/or 140 may be configured to perform one or more operations, and/or functionalities of an EDMG STA and/or a non-EDMG STA, which may be configured, for example, to generate, transmit, receive and/or process one or more transmissions, e.g., including one or more EDMG PPDUs and/or non-EDMG PPDUs, e.g., including one or more fields according to the PPDU format of FIG. 2, e.g., as described below.

In some demonstrative embodiments, devices 102 and/or 140 may be configured to generate, transmit, receive and/or process one or more transmissions of PPDUs, for example, non-EDMG PPDUs and/or EDMG PPDUs, for example, Single Carrier (SC) PHY PPDUs, e.g., in accordance with an IEEE 802.11ay Specification and/or any other specification.

In some demonstrative embodiments, devices 102 and/or 140 may be configured to generate, transmit, receive and/or process one or more transmissions of PPDUs, for example, non-EDMG PPDUs and/or EDMG PPDUs, for example, for control PHY, e.g., in accordance with the IEEE 802.11ay Specification and/or any other specification.

In some demonstrative embodiments, devices 102 and/or 140 may be configured to generate, transmit, receive and/or process one or more transmissions of the PPDUs, e.g., control PHY PPDUs and/or SC PHY PPDUs, for example, by transmission over a 2.16 GHz bandwidth, a 4.32 GHz bandwidth, a 6.48 GHz bandwidth, a 8.64 GHz bandwidth, and/or any other bandwidth, for example, using single or multiple transmit chains and/or antennas, e.g., as described below.

In some demonstrative embodiments, devices 102 and/or 140 may be configured to implement one or more operations to support transmission of non-EDMG and/or EDMG PPDUs, for example, for control PHY and/or SC PHY, e.g., in accordance with an IEEE 802.11ay Specification, by applying hybrid beamforming, e.g., as described below.

In some demonstrative embodiments, devices 102 and/or 140 may be configured to generate, transmit, receive and/or process one or more transmissions of SC PPDUs, for example, non-EDMG SC PHY PPDUs and/or EDMG SC PHY PPDUs, for example, by applying hybrid beamforming, e.g., as described below.

In some demonstrative embodiments, devices 102 and/or 140 may be configured to generate, transmit, receive and/or process one or more transmissions of control PHY PPDUs, for example, non-EDMG control PHY PPDUs and/or EDMG control PHY PPDUs, for example, by applying hybrid beamforming, e.g., as described below.

In some demonstrative embodiments, devices 102 and/or 140 may be configured to generate, transmit, receive and/or process a control PHY PPDU transmission and/or a SC PHY PPDU transmission with hybrid beamforming, e.g., as described below.

Some demonstrative embodiments are described herein with respect to communicating control PHY PPDUs and/or SC PHY PPDUs using hybrid beamforming. In other embodiments, one or more of the operations and/or communications may be implemented with respect to communication of any other type of PPDUs.

In some demonstrative embodiments, devices 102 and/or 140 may be configured to generate, transmit, receive and/or process a transmission according to a hybrid beamforming scheme, for example, based on a combination of digital precoding, for example, at a digital baseband (BB), e.g., by a steering (precoding) matrix, denoted Q, and an analog Antenna Weight Vector (AWV) setup, e.g., per transmit chain, for example, at an analog Radio Frequency (RF) level, e.g., as described below.

In some demonstrative embodiments, a digital precoding matrix may be defined per 2.16 GHz channel, e.g., as described below. In other embodiments, any other precoding may be applied, e.g., on a basis of any other channel bandwidth, e.g., as described below.

In some demonstrative embodiments, devices 102 and/or 140 may be configured to generate, transmit, receive and/or process a SC PHY PPDU transmission, e.g., a SC PHY non-EDMG PPDU transmission, with hybrid beamforming, e.g., as described below.

In some demonstrative embodiments, devices 102 and/or 140 may be configured to generate, transmit, receive and/or process a control PHY PPDU transmission with hybrid beamforming, e.g., as described below.

In some demonstrative embodiments, devices 102 and/or 140 may be configured to generate, transmit, receive and/or process a non-EDMG PPDU and/or an EDMG PPDU transmission over a 2.16 GHz channel, a 4.32 GHz channel, a 6.48 GHz channel, a 8.64 GHz channel, and/or any other channel bandwidth, for example, using $N_{TX}$ transmit chains, e.g., single or multiple transmit chains, and applying hybrid beamforming, e.g., as described below.

In some demonstrative embodiments, the hybrid beamforming may represent a combination of digital precoding, e.g., by a steering matrix Q, and analog beamforming, for example, defining an AWV, e.g., per transmit chain or antenna, e.g., as described below.

In some demonstrative embodiments, devices 102 and/or 140 may be configured to generate, transmit, receive and/or process a non-EDMG PPDU, which may be configured according to a non-EDMG PPDU format, which may be, for example, received and/or decoded by both non-EDMG STAs, e.g., DMG STAs ("legacy DMG stations"), and EDMG STAs ("new STAs"), e.g., as described below.

In some demonstrative embodiments, the non-EDMG PPDU format may include, for example, a non-EDMG portion, e.g., non-EDMG portion 210 (FIG. 2), which may be followed by a data field, and a TRN field. For example, the non-EDMG portion may include a non-EDMG STF, e.g., L-STF 202 (FIG. 2), a non-EDMG CEF, e.g., L-CEF 204, and/or a non-EDMG header, e.g., L-header 206 (FIG. 2).

In some demonstrative embodiments, devices 102 and/or 140 may be configured to generate, transmit, receive and/or process an EDMG PPDU according to the EDMG PPDU format, which may include one or more EDMG fields, for example, one or more fields of EDMG portion 220 (FIG. 2) intended for, e.g., receivable by and/or decodable by, EDMG STAs, for example, only EDMG STAs. For example, non-EDMG STAs, e.g., DMG STAs, may be able to decode an L-Header of the EDMG PPDU, for example, to extract a Modulation and Coding Scheme (MCS) and/or a PHY Service Data Unit (PSDU) length and/or any other information, for example, to update a NAV counter.

In some demonstrative embodiments, device 102 may be configured to generate, transmit, receive and/or process a PPDU, e.g., as described below.

In some demonstrative embodiments, controller 124 may be configured to cause, trigger, and/or control a wireless station implemented by device 102, e.g., an EDMG STA, to generate the PPDU including at least a preamble and a data field, e.g., as described below.

In some demonstrative embodiments, the PPDU may include a non-EDMG PPDU which may be decodable, for example, by one or more non-EDMG stations which are DMG stations, e.g., as described below.

In some demonstrative embodiments, the PPDU may include an EDMG PPDU which may be decodable, for example, by EDMG stations, e.g., as described below.

In some demonstrative embodiments, the PPDU may include a control mode PPDU, for example, a control PHY PPDU, e.g., as described below.

In some demonstrative embodiments, the PPDU may include a SC PPDU, for example, a SC mode PPDU, e.g., as described below.

In some demonstrative embodiments, controller 124 may be configured to cause, trigger, and/or control the wireless station implemented by device 102 to transmit the PPDU in a SC transmission, e.g., as described below.

In some demonstrative embodiments, controller 124 may be configured to cause, trigger, and/or control the wireless station implemented by device 102 to generate one or more PPDU waveforms corresponding to one or more respective transmit chains for digital beamforming transmission of the PPDU, e.g., as described below.

In some demonstrative embodiments, controller 124 may be configured to cause, trigger, and/or control the wireless station implemented by device 102 to generate the one or more PPDU waveforms by determining a PPDU waveform corresponding to a transmit chain of the one or more transmit chains based on a matrix element of a spatial mapping matrix, e.g., as described below.

In some demonstrative embodiments, an index of the matrix element may be based on a transmit chain number of the transmit chain, e.g., as described below.

In some demonstrative embodiments, controller 124 may be configured to cause, trigger, and/or control the wireless station implemented by device 102 to transmit the PPDU via the one or more transmit chains over a channel bandwidth of at least 2.16 GHz in a frequency band above 45 GHz, e.g., as described below.

In some demonstrative embodiments, transmission of the PPDU via the transmit chain may be based on the PPDU waveform corresponding to the transmit chain, e.g., as described below.

In some demonstrative embodiments, controller 124 may be configured to cause, trigger, and/or control the wireless station implemented by device 102 to transmit the PPDU over a channel bandwidth of 2.16 GHz, e.g., as described below.

In some demonstrative embodiments, controller 124 may be configured to cause, trigger, and/or control the wireless station implemented by device 102 to transmit the PPDU over a channel bandwidth including a plurality of 2.16 GHz channel bandwidths, e.g., as described below.

In some demonstrative embodiments, controller 124 may be configured to cause, trigger, and/or control the wireless station implemented by device 102 to transmit the PPDU over a channel bandwidth of 2.16 GHz, 4.32 GHz, 6.48 GHz, or 8.64 GHz, e.g., as described below.

In some demonstrative embodiments, controller 124 may be configured to cause, trigger, and/or control the wireless station implemented by device 102 to transmit the PPDU over any other channel bandwidth.

In some demonstrative embodiments, the index of the matrix element may include a row index of the spatial mapping matrix, e.g., as described below.

In some demonstrative embodiments, the row index may be equal to the transmit chain number of the transmit chain, e.g., as described below.

In some demonstrative embodiments, the matrix element may be in a row of the spatial mapping matrix having a row index equal to 1, e.g., as described below.

In other embodiments, the row index may include any other value.

In some demonstrative embodiments, controller 124 may be configured to cause, trigger, and/or control the wireless station implemented by device 102 to transmit the PPDU according to a hybrid beamforming scheme, e.g., as described below.

In some demonstrative embodiments, the hybrid beamforming scheme may include digital beamforming according to the spatial mapping matrix, and analog beamforming according to an AWV, e.g., as described below.

In some demonstrative embodiments, controller 124 may be configured to cause, trigger, and/or control the wireless station implemented by device 102 to generate one or more preamble-data waveforms corresponding to the one or more transmit chains, e.g., as described below.

In some demonstrative embodiments, a preamble-data waveform corresponding to the transmit chain may be based on the matrix element of the spatial mapping matrix corresponding to the transmit chain, e.g., as described below.

In some demonstrative embodiments, controller 124 may be configured to cause, trigger, and/or control the wireless station implemented by device 102 to generate the one or more PPDU waveforms corresponding to the one or more transmit chains by up-sampling and filtering the one or more preamble-data waveforms, e.g., as described below.

In some demonstrative embodiments, the PPDU waveform corresponding to the transmit chain may be based on up-sampling and filtering the preamble-data waveform corresponding to the transmit chain, e.g., as described below.

In some demonstrative embodiments, controller 124 may be configured to cause, trigger, and/or control the wireless station implemented by device 102 to transmit the PPDU over a channel bandwidth including a plurality of 2.16 GHz channel bandwidths, e.g., as described below.

In some demonstrative embodiments, controller 124 may be configured to cause, trigger, and/or control the wireless station implemented by device 102 to determine the PPDU waveform corresponding to the transmit chain to include an up-sampled and filtered waveform corresponding to the transmit chain duplicated, e.g., with time delay, over the plurality of 2.16 GHz channel bandwidths, e.g., as described below.

In some demonstrative embodiments, devices 102 and/or 140 may be configured to generate, transmit, receive and/or process a non-EDMG PPDU transmission, e.g., as described below.

In some demonstrative embodiments, the non-EDMG PPDU may be decodable, for example, by one or more non-EDMG stations, which are DMG stations.

In some demonstrative embodiments, controller 124 may be configured to cause, trigger, and/or control the wireless station implemented by device 102 to determine a non-EDMG waveform corresponding to the transmit chain, and to determine the PPDU waveform corresponding to the transmit chain based on the non-EDMG waveform corresponding to the transmit chain, e.g., as described below.

In some demonstrative embodiments, the non-EDMG waveform corresponding to the transmit chain may be based on the matrix element of the spatial mapping matrix corresponding to the transmit chain, e.g., as follows:

$$r_{non-EDMG}^{iTX(1)}(nT_c) = [Q]_{i_{TX},1} \cdot r_{non-EDMG}(nT_c), \quad 1 \leq i_{TX} \leq N_{TX} \quad (1)$$

wherein $N_{TX}$ denotes a total count of the one or more transmit chains, $r_{non-EDMG}^{iTX(1)}(nT_c)$ denotes the non-EDMG waveform corresponding to the transmit chain number $i_{TX}$, $r_{non-EDMG}(nT_c)$ denotes fields of the non-EDMG PPDU, Q denotes the spatial mapping matrix, and $[\ ]_{m,n}$ denotes a matrix element from an m-th row and an n-th column.

In some demonstrative embodiments, controller 124 may be configured to cause, trigger, and/or control the wireless station implemented by device 102 to determine the PPDU waveform corresponding to the transmit chain based on an up-sampled and filtered waveform corresponding to the transmit chain, which may be defined, e.g., as follows:

$$r_{non-EDMG}^{iTX(2)}\left(n\frac{T_c}{N_{up}}\right) = \quad (2)$$

$$\begin{cases} r_{non-EDMG}^{iTX(1)}\left(n\frac{T_c}{N_{up}}\right), & n = 0, N_{up}, 2*N_{up} \ldots \\ 0 & \text{otherwise} \end{cases}$$

$$r_{non-EDMG}^{iTX(3)}\left(n\frac{T_c}{N_{up}}\right) = \sum_{k=0}^{K-1} r_{non-EDMG}^{iTX(2)}\left((n-k)\frac{T_c}{N_{up}}\right) h_{SCCB}(k), \, n = 0, 1, \ldots$$

$$r_{non-EDMG}^{iTX(4)}\left(n\frac{T_c}{N_{up}}\right) = r_{non-EDMG}^{iTX(3)}\left(\left(n+\frac{K-1}{2}\right)\frac{T_c}{N_{up}}\right), \, n = 0, 1, \ldots$$

wherein:

$$r_{non-EDMG}^{iTX(4)}\left(n\frac{T_c}{N_{up}}\right)$$

denotes an up-sampled and filtered waveform corresponding to a transmit chain number $i_{TX}$,
$h_{SCCB}$ denotes a response of a pulse shaping filter,
$T_c$ denotes a SC chip time duration,
$N_{up}$ denotes a factor value,
K denotes a length of the pulse shaping filter in samples, and $$r_{non-EDMG,}^{iTX(2)}\left(n\frac{T_c}{N_{up}}\right) = 0, \text{ for } n < 0 \text{ and } n \geq \text{length}\left(r_{non-EDMG}^{iTX(1)}\right) \times N_{up}.$$

In some demonstrative embodiments, controller 124 may be configured to cause, trigger, and/or control the wireless station implemented by device 102 to determine the PPDU waveform corresponding to the transmit chain to include the following waveform, for example, when the non-EDMG PPDU is to be transmitted over a channel bandwidth of 2.16 GHz:

$$r_{PPDU}^{iTX}(nT_c) = r_{non-EDMG}^{iTX(4)}(nT_c), 1 \leq i_{TX} \leq N_{TX} \quad (3)$$

wherein:
$r_{non-EDMG}^{iTX(4)}$ denotes an up-sampled and filtered waveform corresponding to a transmit chain number $i_{TX}$, and
$T_c$ denotes a SC chip time duration.

In some demonstrative embodiments, controller 124 may be configured to cause, trigger, and/or control the wireless station implemented by device 102 to determine the PPDU waveform corresponding to the transmit chain to include the following waveform, for example, when the non-EDMG PPDU is to be transmitted over a 4.32 GHz bandwidth:

$$r_{PPDU}^{iTX}\left(n\frac{T_c}{N_{up}}\right) = r_{non-EDMG}^{iTX(4)}\left(n\frac{T_c}{N_{up}} + \Delta t_1\right) \cdot \frac{1}{\sqrt{2}} \quad (4)$$

$$\exp\left(-j2\pi\left(\frac{\Delta F}{2}\right)\left(\frac{T_c}{N_{up}}\right)n\right) + + r_{non-EDMG}^{iTX(4)}\left(n\frac{T_c}{N_{up}} + \Delta t_2\right) \cdot \frac{1}{\sqrt{2}}$$

$$\exp\left(+j2\pi\left(\frac{\Delta F}{2}\right)\left(\frac{T_c}{N_{up}}\right)n\right), \, 1 \leq i_{TX} \leq N_{TX}$$

wherein:

$$r_{non-EDMG}^{iTX(4)}\left(n\frac{T_c}{N_{up}}\right)$$

denotes an up-sampled and filtered waveform corresponding to a transmit chain number $i_{TX}$, $T_c$ denotes a SC chip time duration, $\Delta F$ denotes a sub-channel spacing equal to 2.16 GHz, and $\Delta t_1$ and $\Delta t_2$ are in the range $[0, T_c]$.

In some demonstrative embodiments, controller 124 may be configured to cause, trigger, and/or control the wireless station implemented by device 102 to determine the PPDU waveform corresponding to the transmit chain to include the following waveform, for example, when the non-EDMG PPDU is to be transmitted over a 6.48 GHz bandwidth:

$$r_{PPDU}^{i_{TX}}\left(n\frac{T_c}{N_{up}}\right) = \quad (5)$$

$$r_{non\text{-}EDMG}^{i_{TX}(4)}\left(n\frac{T_c}{N_{up}} + \Delta t_1\right) \cdot \frac{1}{\sqrt{3}}\exp\left(-j2\pi\Delta F\left(\frac{T_c}{N_{up}}\right)n\right) + +$$

$$r_{non\text{-}EDMG}^{i_{TX}(4)}\left(n\frac{T_c}{N_{up}} + \Delta t_2\right) \cdot \frac{1}{\sqrt{3}} + + r_{non\text{-}EDMG}^{i_{TX}(4)}\left(n\frac{T_c}{N_{up}} + \Delta t_3\right) \cdot \frac{1}{\sqrt{3}}$$

$$\exp\left(+j2\pi\Delta F\left(\frac{T_c}{N_{up}}\right)n\right), 1 \leq i_{TX} \leq N_{TX}$$

wherein:

$$r_{non\text{-}EDMG}^{i_{TX}(4)}\left(n\frac{T_c}{N_{up}}\right)$$

denotes an up-sampled and filtered waveform corresponding to a transmit chain number $i_{TX}$, $T_c$ denotes a SC chip time duration, $\Delta F$ denotes a sub-channel spacing equal to 2.16 GHz, and $\Delta t_1$, $\Delta t_2$, and $\Delta t_3$ are in the range $[0, T_c]$.

In some demonstrative embodiments, controller 124 may be configured to cause, trigger, and/or control the wireless station implemented by device 102 to determine the PPDU waveform corresponding to the transmit chain to include the following waveform, for example, when the non-EDMG PPDU is to be transmitted over a 8.64 GHz bandwidth:

$$r_{PPDU}^{i_{TX}}\left(n\frac{T_c}{N_{up}}\right) = r_{non\text{-}EDMG}^{i_{TX}(4)}\left(n\frac{T_c}{N_{up}} + \Delta t_1\right) \cdot \frac{1}{\sqrt{4}} \quad (6)$$

$$\exp\left(-j2\pi\left(\frac{3\Delta F}{2}\right)\left(\frac{T_c}{N_{up}}\right)n\right) + + r_{non\text{-}EDMG}^{i_{TX}(4)}\left(n\frac{T_c}{N_{up}} + \Delta t_2\right) \cdot \frac{1}{\sqrt{4}}$$

$$\exp\left(-j2\pi\left(\frac{\Delta F}{2}\right)\left(\frac{T_c}{N_{up}}\right)n\right) + + r_{non\text{-}EDMG}^{i_{TX}(4)}\left(n\frac{T_c}{N_{up}} + \Delta t_3\right) \cdot \frac{1}{\sqrt{4}}$$

$$\exp\left(+j2\pi\left(\frac{\Delta F}{2}\right)\left(\frac{T_c}{N_{up}}\right)n\right) + + r_{non\text{-}EDMG}^{i_{TX}(4)}\left(n\frac{T_c}{N_{up}} + \Delta t_4\right) \cdot \frac{1}{\sqrt{4}}$$

$$\exp\left(+j2\pi\left(\frac{3\Delta F}{2}\right)\left(\frac{T_c}{N_{up}}\right)n\right), 1 \leq i_{TX} \leq N_{TX}$$

wherein:

$$r_{non\text{-}EDMG}^{i_{TX}(4)}\left(n\frac{T_c}{N_{up}}\right)$$

denotes an up-sampled and filtered waveform corresponding to a transmit chain number $i_{TX}$, $T_c$ denotes a SC chip time duration, $\Delta F$ denotes a sub-channel spacing equal to 2.16 GHz, and $\Delta t_1$, $\Delta t_2$, $\Delta t_3$, and $\Delta t_4$ are in the range $[0, T_c]$.

In some demonstrative embodiments, devices 102 and/or 140 may be configured to implement one or more operations to support transmission of the non-EDMG PPDU, for example, a non-EDMG SC PHY PPDU for SC PHY and/or a non-EDMG control PHY PPDU, e.g., in accordance with an *IEEE 802.11ay Specification*, for example, by applying hybrid beamforming, e.g., as described below.

In some demonstrative embodiments, devices 102 and/or 140 may be configured to generate, transmit, receive and/or process a non-EDMG SC PHY PPDU transmission, for example, using a SC non-EDMG duplicate PPDU waveform, e.g., as described below.

In some demonstrative embodiments, the SC non-EDMG duplicate PPDU waveform may be defined, for example, at a SC chip rate of 1.76 GHz, or at any other chip rate, e.g., as described below.

In some demonstrative embodiments, the SC non-EDMG duplicate PPDU waveform may be transmitted over a 2.16 GHz channel, or over any other channel.

In some demonstrative embodiments, the SC non-EDMG duplicate PPDU waveform may include, for example, a plurality of modulated fields, for example, an L-STF field, an L-CEF field, an L-header field, a data field and/or a TRN field, e.g., as follows:

$$r_{non\text{-}EDMG}(nT_c) = r_{L\text{-}STF}(nT_c) + r_{L\text{-}CEF}(nT_c - t_{L\text{-}CEF}) + r_{L\text{-}Header}(nT_c - t_{L\text{-}Header}) + + r_{Data}(nT_c - t_{Data}) + r_{TRN}(nT_c - t_{TRN})$$

wherein:

$t_{L\text{-}CEF} = T_{L\text{-}STF}$ is a duration of the L-STF part of the PPDU;

$t_{L\text{-}Header} = t_{L\text{-}CEF} + T_{L\text{-}CEF}$ is a total duration of the L-STF and L-CEF parts of the PPDU;

$t_{Data} = t_{L\text{-}Header} + T_{L\text{-}Header}$ is a total duration of the L-STF, L-CEF, and L-Header parts of the PPDU; and $t_{TRN} = t_{Data} + T_{Data}$ is a total duration of the L-STF, L-CEF, L-Header, and Data parts of the PPDU.

In some demonstrative embodiments, the TRN field may optionally be present in some PPDU transmissions, for example, in a 2.16 GHz PPDU transmission.

In some demonstrative embodiments, the TRN field may not be present in some PPDU transmissions, for example, for a 4.32 GHz PPDU transmission, a 6.48 GHz PPDU transmission, and/or an 8.64 GHz PPDU transmission.

In some demonstrative embodiments, devices 102 and/or 140 may be configured to transmit the non-EDMG PPDU using multiple transmit chains (or antennas), e.g., $N_{TX}$ transmit chains, for example, by applying a hybrid beamforming scheme, which may combine digital precoding by a steering matrix Q and analog AWV setup, e.g., per transmit chain and/or antenna, e.g., as described below.

In some demonstrative embodiments, for digital beamforming transmission, the steering matrix Q may be applied to the non-EDMG PPDU, for example, per $i_{TX}$-th transmit chain and $i_{BW}$-th 2.16 GHz band, for example, as follows:

$$r_{non\text{-}EDMG, i_{BW}}^{i_{TX}(1)}(nT_c) = [Q_{i_{BW}}]_{i_{TX}, 1} \cdot r_{non\text{-}EDMG}(nT_c), 1 \leq i_{TX} \leq N_{TX} \quad (8)$$

wherein:

$Q_{i_{BW}}$ denotes a spatial mapping matrix for $i_{BW}$-th 2.16 GHz band; and $[\ ]_{m,n}$ denotes a matrix element from an m-th row and an n-th column.

In some demonstrative embodiments, a non-EDMG waveform for the $i_{TX}$-th transmit chain may be determined, for example, by up-sampling and filtering, and then applying an appropriate carrier frequency shift of the waveform $r_{non\text{-}EDMG}^{i_{TX}(1)}(nT_c)$, e.g., if required.

In some demonstrative embodiments, the up-sampling procedure may be applied by a factor of $N_{up}$.

In some demonstrative embodiments, a filtering procedure may be applied, for example, with a pulse shaping filter $h_{SCCB}$ which may be, for example, defined at a sampling rate of $N_{up} \times 1.76$ GHz, e.g., as follows:

$$r_{non\text{-}EDMG,i_{BW}}^{i_{TX}(2)}\left(n\frac{T_c}{N_{up}}\right) = \begin{cases} r_{non\text{-}EDMG,i_{BW}}^{i_{TX}(1)}\left(n\frac{T_c}{N_{up}}\right), & n = 0, N_{up}, 2*N_{up}\ldots \\ 0 & \text{otherwise} \end{cases} \quad (9)$$

$$r_{non\text{-}EDMG,i_{BW}}^{i_{TX}(3)}\left(n\frac{T_c}{N_{up}}\right) = \sum_{k=0}^{K-1} r_{non\text{-}EDMG,i_{BW}}^{i_{TX}(2)}\left((n-k)\frac{T_c}{N_{up}}\right) h_{SCCB}(k),$$

$$n = 0, 1, \ldots$$

$$r_{non\text{-}EDMG,i_{BW}}^{i_{TX}(4)}\left(n\frac{T_c}{N_{up}}\right) = r_{non\text{-}EDMG,i_{BW}}^{i_{TX}(3)}\left(\left(n + \frac{K-1}{2}\right)\frac{T_c}{N_{up}}\right), n = 0, 1, \ldots$$

wherein:

K denotes a length of the filter $h_{SCCB}$ in samples; and $$r_{non\text{-}EDMG,i_{BW}}^{i_{TX}(2)}\left(n\frac{T_c}{N_{up}}\right) = 0, \text{ for } n < 0 \text{ and } n \geq \text{length}\left(r_{non\text{-}EDMG,i_{BW}}^{i_{TX}(1)}\right) \times N_{up}$$

In some demonstrative embodiments, a non-EDMG PPDU waveform for the $i_{TX}$-th transmit chain, for example, for transmission over a 2.16 GHz channel may be defined, for example, as follows:

$$r_{non\text{-}EDMG}^{i_{TX}}\left(n\frac{T_c}{N_{up}}\right) = r_{non\text{-}EDMG,i_{BW}=1}^{i_{TX}(4)}\left(n\frac{T_c}{N_{up}}\right), 1 \leq i_{TX} \leq N_{TX} \quad (10)$$

In some demonstrative embodiments, a non-EDMG PPDU waveform for the $i_{TX}$-th transmit chain, for example, when $N_{up}=1$, may be defined, e.g., as follows:

$$r_{PPDU}^{i_{TX}}(nT_c) = r_{non\text{-}EDMG,i_{BW}=1}^{i_{TX}(4)}(nT_c), 1 \leq i_{TX} \leq N_{TX} \quad (11)$$

In some demonstrative embodiments, a non-EDMG PPDU waveform for the $i_{TX}$-th transmit chain, for example, for duplicate transmission over a channel bandwidth including a plurality of 2.16 GHz channel bandwidths may be defined, for example, based on the channel bandwidth, e.g., as described below.

In some demonstrative embodiments, a non-EDMG PPDU waveform for the $i_{TX}$-th transmit chain, for example, for duplicate transmission over a channel bandwidth including a plurality of 2.16 GHz channel bandwidths may be defined, for example, as a combination of a plurality of waveforms corresponding to the plurality of 2.16 GHz channel bandwidths, e.g., as described below.

In some demonstrative embodiments, a non-EDMG PPDU waveform for the $i_{TX}$-th transmit chain, for example, for duplicate transmission over a channel bandwidth of 4.32 GHz may be defined, for example, as follows:

$$r_{PPDU}^{i_{TX}}\left(n\frac{T_c}{N_{up}}\right) = \quad (12)$$

$$r_{non\text{-}EDMG}^{i_{TX}}\left(n\frac{T_c}{N_{up}}\right) == r_{non\text{-}EDMG,i_{BW}=1}^{i_{TX}(4)}\left(n\frac{T_c}{N_{up}} + \Delta t_1\right) \cdot \frac{1}{\sqrt{2}}$$

$$\exp\left(-j2\pi\left(\frac{\Delta F}{2}\right)\left(\frac{T_c}{N_{up}}\right)n\right) + + r_{non\text{-}EDMG,i_{BW}=2}^{i_{TX}(4)}\left(n\frac{T_c}{N_{up}} + \Delta t_2\right) \cdot \frac{1}{\sqrt{2}}$$

$$\exp\left(+j2\pi\left(\frac{\Delta F}{2}\right)\left(\frac{T_c}{N_{up}}\right)n\right), 1 \leq i_{TX} \leq N_{TX}$$

wherein:

$\Delta F$ denotes a sub-channel spacing, e.g., a spacing equal to 2.16 GHz and/or any other spacing;

$\Delta t_1$ and $\Delta t_2$ are in the range $[0, T_c]$, e.g., $\Delta t_1=0$ and $\Delta t_2$ is in the range $[0, T_c]$, or $\Delta t_1$ is in the range $[0, T_c]$ and $\Delta t_2=0$, and/or any other combination of values and/or ranges may be implemented; and/or a zero delay shall correspond to the primary channel.

In some demonstrative embodiments, a non-EDMG PPDU waveform for the $i_{TX}$-th transmit chain, for example, for duplicate transmission over a channel bandwidth of 6.48 GHz may be defined, for example, as follows:

$$r_{PPDU}^{i_{TX}}\left(n\frac{T_c}{N_{up}}\right) = r_{non\text{-}EDMG}^{i_{TX}}\left(n\frac{T_c}{N_{up}}\right) == \quad (13)$$

$$r_{non\text{-}EDMG,i_{BW}=1}^{i_{TX}(4)}\left(n\frac{T_c}{N_{up}} + \Delta t_1\right) \cdot \frac{1}{\sqrt{3}} \exp\left(-j2\pi\Delta F\left(\frac{T_c}{N_{up}}\right)n\right) + +$$

$$r_{non\text{-}EDMG,i_{BW}=2}^{i_{TX}(4)}\left(n\frac{T_c}{N_{up}} + \Delta t_2\right) \cdot \frac{1}{\sqrt{3}} + +$$

$$r_{non\text{-}EDMG,i_{BW}=3}^{i_{TX}(4)}\left(n\frac{T_c}{N_{up}} + \Delta t_3\right) \cdot \frac{1}{\sqrt{3}}$$

$$\exp\left(+j2\pi\Delta F\left(\frac{T_c}{N_{up}}\right)n\right), 1 \leq i_{TX} \leq N_{TX}$$

wherein:

$\Delta t_1$, $\Delta t_2$, and $\Delta t_3$ are in the range $[0, T_c]$, e.g., $\Delta t_1=0$ and $\Delta t_2$ is in the range $[0, T_c]$ and $\Delta t_3$ is in the range $[0, T_c]$, or $\Delta t_1$ is in the range $[0, T_c]$ and $\Delta t_2=0$ and $\Delta t_3$ is in the range $[0, T_c]$, or $\Delta t_1$ is in the range $[0, T_c]$ and $\Delta t_2$ is in the range $[0, T_c]$ and $\Delta t_3=0$, and/or any other combination of values and/or ranges may be implemented; and/or a zero delay shall correspond to the primary channel.

In some demonstrative embodiments, a non-EDMG PPDU waveform for the $i_{TX}$-th transmit chain, for example, for duplicate transmission over a channel bandwidth of 8.64 GHz may be defined, for example, as follows:

$$r_{PPDU}^{i_{TX}}\left(n\frac{T_c}{N_{up}}\right) = r_{non\text{-}EDMG}^{i_{TX}}\left(n\frac{T_c}{N_{up}}\right) == \quad (14)$$

$$r_{non\text{-}EDMG,i_{BW}=1}^{i_{TX}(4)}\left(n\frac{T_c}{N_{up}} + \Delta t_1\right) \cdot \frac{1}{\sqrt{4}} \exp\left(-j2\pi\left(\frac{3\Delta F}{2}\right)\left(\frac{T_c}{N_{up}}\right)n\right) + +$$

$$r_{non\text{-}EDMG,i_{BW}=2}^{i_{TX}(4)}\left(n\frac{T_c}{N_{up}} + \Delta t_2\right) \cdot \frac{1}{\sqrt{4}} \exp\left(-j2\pi\left(\frac{\Delta F}{2}\right)\left(\frac{T_c}{N_{up}}\right)n\right) + +$$

$$r_{non\text{-}EDMG,i_{BW}=3}^{i_{TX}(4)}\left(n\frac{T_c}{N_{up}} + \Delta t_3\right) \cdot \frac{1}{\sqrt{4}} \exp$$

$$\left(+j2\pi\left(\frac{\Delta F}{2}\right)\left(\frac{T_c}{N_{up}}\right)n\right) + + r_{non\text{-}EDMG,i_{BW}=4}^{i_{TX}(4)}\left(n\frac{T_c}{N_{up}} + \Delta t_4\right) \cdot \frac{1}{\sqrt{4}}$$

-continued $$\exp\left(+j2\pi\left(\frac{3\Delta F}{2}\right)\left(\frac{T_c}{N_{up}}\right)n\right), 1 \leq i_{TX} \leq N_{TX}$$

wherein:

$\Delta t_1$, $\Delta t_2$, $\Delta t_3$ and $\Delta t_4$ are in the range $[0, T_c]$, e.g., $\Delta t_1=0$ and $\Delta t_2$ is in the range $[0, T_c]$ and $\Delta t_3$ is in the range $[0, T_c]$ and $\Delta t_4$ is in the range $[0, T_c]$, or $\Delta t_1$ is in the range $[0, T_c]$ and $\Delta t_2=0$ and $\Delta t_3$ is in the range $[0, T_c]$ and $\Delta t_4$ is in the range $[0, T_c]$, or $\Delta t_1$ is in the range $[0, T_c]$ and $\Delta t_2$ is in the range $[0, T_c]$ and $\Delta t_3=0$ and $\Delta t_4$ is in the range $[0, T_c]$, or $\Delta t_1$ is in the range $[0, T_c]$ and $\Delta t_2$ is in the range $[0, T_c]$ and $\Delta t_3$ is in the range $[0, T_c]$ and $\Delta t_4=0$, and/or any other combination of values and/or ranges may be implemented; and/or a zero delay shall correspond to the primary channel.

In some demonstrative embodiments, a non-EDMG PPDU waveform for the $i_{TX}$-th transmit chain, for example, for duplicate transmission over any other additional and/or alternative channel bandwidth may be defined, for example, based on one or more of the above definitions, e.g., as described below.

In some demonstrative embodiments, one or more parameters, which may be implemented for the non-EDMG PPDU waveform, for example, the pulse shaping filter impulse response $h_{SCCB}$ and/or the parameter $N_{up}$ may be, for example, implementation specific.

In some demonstrative embodiments, devices 102 and/or 140 may be configured to generate, transmit, receive and/or process an EDMG PPDU transmission which may be decodable, for example, by EDMG stations, e.g., as described below.

In some demonstrative embodiments, controller 124 may be configured to cause, trigger, and/or control the wireless station implemented by device 102 to determine an EDMG waveform corresponding to the transmit chain, and to determine the PPDU waveform corresponding to the transmit chain based on the EDMG waveform corresponding to the transmit chain, e.g., as described below.

In some demonstrative embodiments, the EDMG waveform corresponding to the transmit chain may be determined, for example, based on the matrix element of the spatial mapping matrix corresponding to the transmit chain, e.g., as follows:

$$r_{EDMG\text{-}Pream\text{-}Data}^{i_{TX}(1)}(nT_c) = [Q]_{i_{TX},1} r_{EDMG\text{-}Pream\text{-}Data}(nT_c), 1 \leq i_{TX} \leq N_{TX} \quad (15)$$

wherein $N_{TX}$ denotes a total count of the one or more transmit chains, $r_{EDMG\text{-}Pream\text{-}Data}^{i_{TX}(1)}(nT_c)$ denotes the EDMG waveform corresponding to the transmit chain number $i_{TX}$, $r_{EDMG\text{-}Pream\text{-}Data}(nT_c)$ denotes the preamble and date field of the EDMG PPDU, Q denotes the spatial mapping matrix, and $[\ ]_{m,n}$ denotes a matrix element from an m-th row and an n-th column.

In some demonstrative embodiments, controller 124 may be configured to cause, trigger, and/or control the wireless station implemented by device 102 to determine the PPDU waveform corresponding to the transmit chain based on an up-sampled and filtered waveform corresponding to the transmit chain, which may be defined, e.g., as follows:

$$r_{EDMG\text{-}Pream\text{-}Data}^{i_{TX}(2)}\left(n\frac{T_c}{N_{up}}\right) = \begin{cases} r_{EDMG\text{-}Pream\text{-}Data}^{i_{TX}(1)}\left(n\frac{T_c}{N_{up}}\right), & n = 0, N_{up}, 2*N_{up} \ldots \\ 0 & \text{otherwise} \end{cases} \quad (16)$$

$$r_{EDMG\text{-}Pream\text{-}Data}^{i_{TX}(3)}\left(n\frac{T_c}{N_{up}}\right) = \sum_{k=0}^{K-1} r_{EDMG\text{-}Pream\text{-}Data}^{i_{TX}(2)}\left((n-k)\frac{T_c}{N_{up}}\right) h_{SCCB}(k),$$

$$n = 0, 1, \ldots$$

$$r_{EDMG\text{-}Pream\text{-}Data}^{i_{TX}(4)}\left(n\frac{T_c}{N_{up}}\right) = r_{EDMG\text{-}Pream\text{-}Data}^{i_{TX}(3)}\left(\left(n+\frac{K-1}{2}\right)\frac{T_c}{N_{up}}\right),$$

$$n = 0, 1, \ldots$$

wherein:

$$r_{EDMG\text{-}Pream\text{-}Data}^{i_{TX}(4)}\left(n\frac{T_c}{N_{up}}\right)$$

denotes an up-sampled and filtered waveform corresponding to a transmit chain number $i_{TX}$, $$r_{EDMG\text{-}Pream\text{-}Data}^{i_{TX}(1)}\left(n\frac{T_c}{N_{up}}\right)$$

denotes an EDMG preamble-date waveform corresponding to a transmit chain number $i_{TX}$,
$h_{SCCB}$ denotes a response of a pulse shaping filter,
$T_c$ denotes a SC chip time duration,
$N_{up}$ denotes a factor value,
K denotes a length of the pulse shaping filter in samples, and $$r_{EDMG\text{-}Pream\text{-}Data}^{i_{TX}(2)}\left(n\frac{T_c}{N_{up}}\right) = 0,$$

for $n < 0$ and $n \geq \text{length}\left(r_{EDMG\text{-}Pream\text{-}Data}^{i_{TX}(1)}\right) \times N_{up}$.

In some demonstrative embodiments, controller 124 may be configured to cause, trigger, and/or control the wireless station implemented by device 102 to determine the PPDU waveform corresponding to the transmit chain to include the following waveform, for example, when the EDMG PPDU is to be transmitted over a channel bandwidth of 2.16 GHz:

$$r_{EDMG\text{-}Pream\text{-}Data}^{i_{TX}}\left(n\frac{T_c}{N_{up}}\right) = r_{EDMG\text{-}Pream\text{-}Data}^{i_{TX}(4)}\left(n\frac{T_c}{N_{up}}\right), 1 \leq i_{TX} \leq N_{TX} \quad (17)$$

wherein:

$$r_{EDMG\text{-}Pream\text{-}Data}^{i_{TX}(4)}\left(n\frac{T_c}{N_{up}}\right)$$

denotes an up-sampled and filtered waveform corresponding to a transmit chain number $i_{TX}$, and
$T_c$ denotes a SC chip time duration.

In some demonstrative embodiments, controller 124 may be configured to cause, trigger, and/or control the wireless station implemented by device 102 to determine the PPDU waveform corresponding to the transmit chain to include the following waveform, for example, when the EDMG PPDU is to be transmitted over a 4.32 GHz bandwidth:

$$r^{i_{TX}}_{EDMG\text{-}Pream\text{-}Data}\left(n\frac{T_c}{N_{up}}\right) == r^{i_{TX}(4)}_{EDMG\text{-}Pream\text{-}Data}\left(n\frac{T_c}{N_{up}}+\Delta t_1\right)\cdot\frac{1}{\sqrt{2}} \quad (18)$$

$$\exp\left(-j2\pi\left(\frac{\Delta F}{2}\right)\left(\frac{T_c}{N_{up}}\right)n\right) + + r^{i_{TX}(4)}_{EDMG\text{-}Pream\text{-}Data}\left(n\frac{T_c}{N_{up}}+\Delta t_2\right)\cdot\frac{1}{\sqrt{2}}$$

$$\exp\left(+j2\pi\left(\frac{\Delta F}{2}\right)\left(\frac{T_c}{N_{up}}\right)n\right), 1\le i_{TX}\le N_{TX}$$

wherein:

$$r^{i_{TX}(4)}_{EDMG\text{-}Pream\text{-}Data}\left(n\frac{T_c}{N_{up}}\right)$$

denotes an up-sampled and filtered waveform corresponding to a transmit chain number $i_{TX}$, $T_c$ denotes a SC chip time duration, $\Delta F$ denotes a sub-channel spacing equal to 2.16 GHz, and $\Delta t_1$ and $\Delta t_2$ are in the range [0, $T_c$].

In some demonstrative embodiments, controller 124 may be configured to cause, trigger, and/or control the wireless station implemented by device 102 to determine the PPDU waveform corresponding to the transmit chain to include the following waveform, for example, when the EDMG PPDU is to be transmitted over a 6.48 GHz bandwidth:

$$r^{i_{TX}}_{EDMG\text{-}Pream\text{-}Data}\left(n\frac{T_c}{N_{up}}\right) == r^{i_{TX}(4)}_{EDMG\text{-}Pream\text{-}Data}\left(n\frac{T_c}{N_{up}}+\Delta t_1\right)\cdot\frac{1}{\sqrt{3}} \quad (19)$$

$$\exp\left(-j2\pi\Delta F\left(\frac{T_c}{N_{up}}\right)n\right) + + r^{i_{TX}(4)}_{EDMG\text{-}Pream\text{-}Data}\left(n\frac{T_c}{N_{up}}+\Delta t_2\right)\cdot\frac{1}{\sqrt{3}} + +$$

$$r^{i_{TX}(4)}_{EDMG\text{-}Pream\text{-}Data}\left(n\frac{T_c}{N_{up}}+\Delta t_3\right)\cdot\frac{1}{\sqrt{3}}$$

$$\exp\left(+j2\pi\Delta F\left(\frac{T_c}{N_{up}}\right)n\right), 1\le i_{TX}\le N_{TX}$$

wherein:

$$r^{i_{TX}(4)}_{EDMG\text{-}Pream\text{-}Data}\left(n\frac{T_c}{N_{up}}\right)$$

denotes an up-sampled and filtered waveform corresponding to a transmit chain number $i_{TX}$, $T_c$ denotes a SC chip time duration, $\Delta F$ denotes a sub-channel spacing equal to 2.16 GHz, and $\Delta t_1$, $\Delta t_2$, and $\Delta t_3$ are in the range [0, $T_c$].

In some demonstrative embodiments, controller 124 may be configured to cause, trigger, and/or control the wireless station implemented by device 102 to determine the PPDU waveform corresponding to the transmit chain to include the following waveform, for example, when the EDMG PPDU is to be transmitted over a 8.64 GHz bandwidth:

$$r^{i_{TX}}_{EDMG\text{-}Pream\text{-}Data}\left(n\frac{T_c}{N_{up}}\right) == \quad (20)$$

$$r^{i_{TX}(4)}_{EDMG\text{-}Pream\text{-}Data}\left(n\frac{T_c}{N_{up}}+\Delta t_1\right)\cdot\frac{1}{\sqrt{4}}\exp\left(-j2\pi\left(\frac{3\Delta F}{2}\right)\left(\frac{T_c}{N_{up}}\right)n\right) + +$$

$$r^{i_{TX}(4)}_{EDMG\text{-}Pream\text{-}Data}\left(n\frac{T_c}{N_{up}}+\Delta t_2\right)\cdot\frac{1}{\sqrt{4}}\exp\left(-j2\pi\left(\frac{\Delta F}{2}\right)\left(\frac{T_c}{N_{up}}\right)n\right) + +$$

$$r^{i_{TX}(4)}_{EDMG\text{-}Pream\text{-}Data}\left(n\frac{T_c}{N_{up}}+\Delta t_3\right)\cdot\frac{1}{\sqrt{4}}\exp\left(+j2\pi\left(\frac{\Delta F}{2}\right)\left(\frac{T_c}{N_{up}}\right)n\right) + +$$

$$r^{i_{TX}(4)}_{EDMG\text{-}Pream\text{-}Data}\left(n\frac{T_c}{N_{up}}+\Delta t_4\right)\cdot\frac{1}{\sqrt{4}}$$

$$\exp\left(+j2\pi\left(\frac{3\Delta F}{2}\right)\left(\frac{T_c}{N_{up}}\right)n\right), 1\le i_{TX}\le N_{TX}$$

wherein:

$$r^{i_{TX}(4)}_{EDMG\text{-}Pream\text{-}Data}\left(n\frac{T_c}{N_{up}}\right)$$

denotes an up-sampled and filtered waveform corresponding to a transmit chain number $i_{TX}$, $T_c$ denotes a SC chip time duration, $\Delta F$ denotes a sub-channel spacing equal to 2.16 GHz, and $\Delta t_1$, $\Delta t_2$, $\Delta t_3$, and $\Delta t_4$ are in the range [0, $T_c$].

In some demonstrative embodiments, a control mode EDMG PPDU may include, for example, a preamble, a data field, e.g., data field 218 (FIG. 2), and an optional TRN field, e.g., TRN field 224 (FIG. 2).

In some demonstrative embodiments, the preamble for the control mode EDMG PPDU may include, for example, an L-STF, e.g., L-STF 202 (FIG. 2), an L-CEF, e.g., L-CEF 204 (FIG. 2), an L-Header, e.g., L-Header 206 (FIG. 2), and/or an EDMG Header-A, e.g., EDMG Header A 208 (FIG. 2).

In some demonstrative embodiments, a total number of transmit chains $N_{TX}$ may be maintained constant during transmission, for example, over the different fields of the EDMG PPDU.

In some demonstrative embodiments, the preamble and data part of the EDMG PPDU may be defined, for example, at a SC chip rate equal to 1.76 GHz and/or any other chip rate.

In some demonstrative embodiments, the preamble and data part of the EDMG PPDU may be defined, for example, to include the following modulated fields:

$$r_{EDMG\text{-}Pream\text{-}Data}(nT_c) = r_{L\text{-}STF}(nT_c) + r_{L\text{-}CEF}$$
$$(nT_c - t_{L\text{-}CEF}) + r_{L\text{-}Header}(nT_c - t_{L\text{-}Header}) + +$$
$$r_{EDMG\text{-}Header\text{-}A}(nT_c - t_{EDMG\text{-}Header\text{-}A}) + r_{Data}(nT_c - t_{Data})$$

$t_{L\text{-}CEF} = T_{L\text{-}STF}$ is a duration of L-STF field of the PPDU;

$t_{L\text{-}Header} = t_{L\text{-}CEF} + T_{L\text{-}CEF}$ is a total duration of L-STF and L-CEF fields of the PPDU;

$t_{EDMG\text{-}Header\text{-}A} = t_{L\text{-}Header} + T_{L\text{-}Header}$ is a total duration of L-STF, L-CEF, and L-Header fields of the PPDU; and/or $t_{Data} = t_{EDMG\text{-}Header\text{-}A} + T_{EDMG\text{-}Header\text{-}A}$ is a total duration of L-STF, L-CEF, L-Header, and EDMG-Header-A fields of the PPDU.

In some demonstrative embodiments, the steering matrix Q may be applied to the EDMG preamble and data part of the PPDU, for example, per $i_{TX}$-th transmit chain and $i_{BW}$-th 2.16 GHz band, for example, as follows:

$$r^{i_{TX}(1)}_{EDMG\text{-}Pream\text{-}Data,i_{Bw}}(nT_c) = [Q_{i_{BW}}]_{i_{TX},1} \cdot r_{EDMG\text{-}Pream\text{-}Data}(nT_c), \quad (21)$$

$$1 \le i_{TX} \le N_{TX}$$

wherein:

$Q_{i_{BW}}$ denotes a spatial mapping matrix for $i_{BW}$-th 2.16 GHz band; and $[\ ]_{m,n}$ denotes a matrix element from an m-th row and an n-th column.

In some demonstrative embodiments, a filtering procedure may be applied, for example, with a pulse shaping filter $h_{SCCB}$ which may be, for example, defined at a sampling rate of $N_{up} \times 1.76$ GHz, e.g., as follows:

$$r^{i_{TX}(2)}_{EDMG\text{-}Pream\text{-}Data,i_{BW}}\left(n\frac{T_c}{N_{up}}\right) = \quad (22)$$

$$\begin{cases} r^{i_{TX}(1)}_{EDMG\text{-}Pream\text{-}Data,i_{BW}}\left(n\frac{T_c}{N_{up}}\right), & n = 0, N_{up}, 2*N_{up} \ldots \\ 0 & \text{otherwise} \end{cases}$$

$$r^{i_{TX}(3)}_{EDMG\text{-}Pream\text{-}Data,i_{BW}}\left(n\frac{T_c}{N_{up}}\right) =$$

$$\sum_{k=0}^{K-1} r^{i_{TX}(2)}_{EDMG\text{-}Pream\text{-}Data,i_{BW}}\left((n-k)\frac{T_c}{N_{up}}\right) h_{SCCB}(k), n = 0, 1, \ldots$$

$$r^{i_{TX}(4)}_{EDMG\text{-}Pream\text{-}Data,i_{BW}}\left(n\frac{T_c}{N_{up}}\right) =$$

$$r^{i_{TX}(3)}_{EDMG\text{-}Pream\text{-}Data,i_{BW}}\left(\left(n + \frac{K-1}{2}\right)\frac{T_c}{N_{up}}\right), n = 0, 1, \ldots$$

wherein:

K denotes a length of $h_{SCCB}$ in samples; and $$r^{i_{TX}(2)}_{EDMG\text{-}Pream\text{-}Data,i_{BW}}\left(n\frac{T_c}{N_{up}}\right) = 0,$$

$$\text{for } n < 0 \text{ and } n \ge \text{length}(r^{i_{TX}(1)}_{EDMG\text{-}Pream\text{-}Data,i_{BW}}) \times N_{up}$$

In some demonstrative embodiments, a waveform of the EDMG preamble and data part of the EDMG PPDU for the $i_{TX}$-th transmit chain, for example, for transmission over a 2.16 GHz channel may be defined, for example, as follows:

$$r^{i_{TX}}_{EDMG\text{-}Pream\text{-}Data}\left(n\frac{T_c}{N_{up}}\right) = r^{i_{TX}(4)}_{EDMG\text{-}Pream\text{-}Data,i_{BW}=1}\left(n\frac{T_c}{N_{up}}\right), \quad (23)$$

$$1 \le i_{TX} \le N_{TX}$$

In some demonstrative embodiments, a waveform of the EDMG preamble and data part of the EDMG PPDU for the $i_{TX}$-th transmit chain, for example, for duplicate transmission over a channel bandwidth including a plurality of 2.16 GHz channel bandwidths may be defined, for example, based on the channel bandwidth, e.g., as described below.

In some demonstrative embodiments, a waveform of the EDMG preamble and data part of the EDMG PPDU for the $i_{TX}$-th transmit chain, for example, for transmission over a channel bandwidth including a plurality of 2.16 GHz channel bandwidths may be defined, for example, as a combination of a plurality of waveforms corresponding to the plurality of 2.16 GHz channel bandwidths, e.g., as described below.

In some demonstrative embodiments, a waveform of the EDMG preamble and data part of the EDMG PPDU for the $i_{TX}$-th transmit chain, for example, for transmission, e.g., duplicate transmission, over a 4.32 GHz channel may be defined, for example, as follows:

$$r^{i_{TX}}_{EDMG\text{-}Pream\text{-}Data}\left(n\frac{T_c}{N_{up}}\right) == \quad (24)$$

$$r^{i_{TX}(4)}_{EDMG\text{-}Pream\text{-}Data,i_{BW}=1}\left(n\frac{T_c}{N_{up}} + \Delta t_1\right) \cdot \frac{1}{\sqrt{2}}$$

$$\exp\left(-j2\pi\left(\frac{\Delta F}{2}\right)\left(\frac{T_c}{N_{up}}\right)n\right) + +$$

$$r^{i_{TX}(4)}_{EDMG\text{-}Pream\text{-}Data,i_{BW}=2}\left(n\frac{T_c}{N_{up}} + \Delta t_2\right) \cdot \frac{1}{\sqrt{2}}$$

$$\exp\left(+j2\pi\left(\frac{\Delta F}{2}\right)\left(\frac{T_c}{N_{up}}\right)n\right), 1 \le i_{TX} \le N_{TX}$$

wherein:

$\Delta F$ denotes a sub-channel spacing equal to 2.16 GHz, and/or any other spacing;

$\Delta t_1$ and $\Delta t_2$ are in the range $[0, T_c]$, e.g., $\Delta t_1=0$ and $\Delta t_2$ is in the range $[0, T_c]$, or $\Delta t_1$ is in the range $[0, T_c]$ and $\Delta t_2=0$, and/or any other combination of values and/or ranges may be implemented; and/or a zero delay shall correspond to the primary channel.

In some demonstrative embodiments, a waveform of the EDMG preamble and data part of the EDMG PPDU for the $i_{TX}$-th transmit chain, for example, for transmission, e.g., duplicate transmission, over a 6.48 GHz channel may be defined, for example, as follows:

$$r^{i_{TX}}_{EDMG\text{-}Pream\text{-}Data}\left(n\frac{T_c}{N_{up}}\right) == \quad (25)$$

$$r^{i_{TX}(4)}_{EDMG\text{-}Pream\text{-}Data,i_{BW}=1}\left(n\frac{T_c}{N_{up}} + \Delta t_1\right) \cdot \frac{1}{\sqrt{3}} \exp\left(-j2\pi\Delta F\left(\frac{T_c}{N_{up}}\right)n\right) + +$$

$$r^{i_{TX}(4)}_{EDMG\text{-}Pream\text{-}Data,i_{BW}=2}\left(n\frac{T_c}{N_{up}} + \Delta t_2\right) \cdot \frac{1}{\sqrt{3}} + +$$

$$r^{i_{TX}(4)}_{EDMG\text{-}Pream\text{-}Data,i_{BW}=3}\left(n\frac{T_c}{N_{up}} + \Delta t_3\right) \cdot \frac{1}{\sqrt{3}}$$

$$\exp\left(+j2\pi\Delta F\left(\frac{T_c}{N_{up}}\right)n\right), 1 \le i_{TX} \le N_{TX}$$

wherein:

$t_1$, $\Delta t_2$, and $\Delta t_3$ are in the range $[0, T_c]$, e.g., $\Delta t_1=0$ and $\Delta t_2$ is in the range $[0, T_c]$ and $\Delta t_3$ is in the range $[0, T_c]$, or $\Delta t_1$ is in the range $[0, T_c]$ and $\Delta t_2=0$ and $\Delta t_3$ is in the range $[0, T_c]$, or $\Delta t_1$ is in the range $[0, T_c]$ and $\Delta t_2$ is in the range $[0, T_c]$ and $\Delta t_3=0$, and/or any other combination of values and/or ranges may be implemented; and/or a zero delay shall correspond to the primary channel.

In some demonstrative embodiments, a waveform of the EDMG preamble and data part of the EDMG PPDU for the $i_{TX}$-th transmit chain, for example, for transmission, e.g., duplicate transmission, over a 8.64 GHz channel may be defined, for example, as follows:

$$r_{EDMG\text{-}Pream\text{-}Data}^{i_{TX}}\left(n\frac{T_c}{N_{up}}\right) = \qquad (26)$$

$$r_{EDMG\text{-}Pream\text{-}Data, i_{BW}=1}^{i_{TX}(4)}\left(n\frac{T_c}{N_{up}}+\Delta t_1\right)\cdot\frac{1}{\sqrt{4}}$$

$$\exp\left(-j2\pi\left(\frac{3\Delta F}{2}\right)\left(\frac{T_c}{N_{up}}\right)n\right)++$$

$$r_{EDMG\text{-}Pream\text{-}Data, i_{BW}=2}^{i_{TX}(4)}\left(n\frac{T_c}{N_{up}}+\Delta t_2\right)\cdot\frac{1}{\sqrt{4}}$$

$$\exp\left(-j2\pi\left(\frac{\Delta F}{2}\right)\left(\frac{T_c}{N_{up}}\right)n\right)++$$

$$r_{EDMG\text{-}Pream\text{-}Data, i_{BW}=3}^{i_{TX}(4)}\left(n\frac{T_c}{N_{up}}+\Delta t_3\right)\cdot\frac{1}{\sqrt{4}}$$

$$\exp\left(+j2\pi\left(\frac{\Delta F}{2}\right)\left(\frac{T_c}{N_{up}}\right)n\right)++$$

$$r_{EDMG\text{-}Pream\text{-}Data, i_{BW}=4}^{i_{TX}(4)}\left(n\frac{T_c}{N_{up}}+\Delta t_4\right)\cdot\frac{1}{\sqrt{4}}$$

$$\exp\left(+j2\pi\left(\frac{3\Delta F}{2}\right)\left(\frac{T_c}{N_{up}}\right)n\right), 1\le i_{TX}\le N_{TX}$$

wherein:

$\Delta t_1$, $\Delta t_2$, $\Delta t_3$ and $\Delta t_4$ are in the range $[0, T_c]$, e.g., $\Delta t_1=0$ and $\Delta t_2$ is in the range $[0, T_c]$ and $\Delta t_3$ is in the range $[0, T_c]$ and $\Delta t_4$ is in the range $[0, T_c]$, or $\Delta t_1$ is in the range $[0, T_c]$ and $\Delta t_2=0$ and $\Delta t_3$ is in the range $[0, T_c]$ and $\Delta t_4$ is in the range $[0, T_c]$, or $\Delta t_1$ is in the range $[0, T_c]$ and $\Delta t_2$ is in the range $[0, T_c]$ and $\Delta t_3=0$ and $\Delta t_4$ is in the range $[0, T_c]$, or $\Delta t_1$ is in the range $[0, T_c]$ and $\Delta t_2$ is in the range $[0, T_c]$ and $\Delta t_3$ is in the range $[0, T_c]$ and $\Delta t_4=0$, and/or any other combination of values and/or ranges may be implemented; and/or a zero delay shall correspond to the primary channel.

In some demonstrative embodiments, a waveform of the EDMG preamble and data part of the EDMG PPDU for the $i_{TX}$-th transmit chain, for example, for transmission over any other additional and/or alternative channel bandwidth may be defined, for example, based on one or more of the above definitions.

In some demonstrative embodiments, devices 102 and/or 140 may be configured to generate, transmit, receive and/or process the PPDU transmission including a TRN field, e.g., as described below. For example, the TRN field may optionally be present in some PPDU transmissions.

In some demonstrative embodiments, controller 124 may be configured to cause, trigger, and/or control the wireless station implemented by device 102 to generate the PPDU including the TRN field, and to generate the PPDU waveform corresponding to the transmit chain based on a waveform for the TRN field, e.g., as described below.

In some demonstrative embodiments, controller 124 may be configured to cause, trigger, and/or control the wireless station implemented by device 102 to generate the waveform for the TRN field by filtering and resampling a TRN field corresponding to the number of the transmit chain, e.g., as described below.

In some demonstrative embodiments, controller 124 may be configured to cause, trigger, and/or control the wireless station implemented by device 102 to determine the waveform for the TRN field based on the following resampling procedure:

$$r_{TRN}^{i_{TX}(2)}\left(n\frac{T_c}{3N_{CB}}\right) = \begin{cases} r_{TRN}^{i_{TX}(1)}\left(n\frac{T_c}{3N_{CB}}\right), & n=0, 3, 6\ldots \\ 0 & \text{otherwise} \end{cases} \qquad (27)$$

$$r_{TRN}^{i_{TX}(3)}\left(n\frac{T_c}{3N_{CB}}\right) = \sum_{k=0}^{K-1} r_{TRN}^{i_{TX}(2)}\left((n-k)\frac{T_c}{3N_{CB}}\right)h_{SCCB}(k), n=0, 1, \ldots$$

$$r_{TRN}^{i_{TX}(4)}\left(n\frac{2T_c}{3N_{CB}}\right) = r_{TRN}^{i_{TX}(3)}\left(\left(2n+\frac{K-1}{2}\right)\frac{T_c}{3N_{CB}}\right), n=0, 1, \ldots$$

wherein:

$$r_{TRN}^{i_{TX}(1)}\left(n\frac{T_c}{N_{CB}}\right)$$

denotes a TRN field corresponding to a transmit chain number $i_{TX}$, $T_c$ denotes a SC chip time duration, $N_{up}$ denotes a factor value, $N_{CB}$ denotes a channel bonding factor, $h_{SCCB}$ denotes a response of a pulse shaping filter, K denotes a length of the pulse shaping filter in samples, and $$r_{TRN}^{i_{TX}(2)}\left(n\frac{T_c}{3N_{CB}}\right) = 0, \text{ for } n<0 \text{ and } n\ge \text{length}\left(r_{TRN}^{i_{TX}(1)}\right)\times 3$$

In some demonstrative embodiments, a TRN field of the PPDU, e.g., $$r_{TRN}^{i_{TX}(1)}\left(n\frac{T_c}{N_{CB}}\right),$$

may be defined, for example, at the SC chip rate equal to $N_{CB}\times 1.76$ GHz, for example, per an $i_{TX}$-th transmit chain, e.g., in accordance with an *IEEE 802.11ay Specification* and/or any other Specification.

In some demonstrative embodiments, the TRN field may be, for example, filtered and resampled, for example, with a conversion rate ratio of $N_{up}/N_{CB}$, and/or any other conversion rate ratio, e.g., as described below.

In some demonstrative embodiments, the resampling procedure for the ratio $N_{up}/N_{CB}=3/2$, may be defined, e.g., as follows:

$$r_{TRN}^{i_{TX}(2)}\left(n\frac{T_c}{3N_{CB}}\right) = \begin{cases} r_{TRN}^{i_{TX}(1)}\left(n\frac{T_c}{3N_{CB}}\right), & n=0, 3, 6\ldots \\ 0 & \text{otherwise} \end{cases} \qquad (28)$$

$$r_{EDMG\text{-}Pream\text{-}Data}^{i_{TX}(3)}\left(n\frac{T_c}{3N_{CB}}\right) = \sum_{k=0}^{K-1} r_{TRN}^{i_{TX}(2)}\left((n-k)\frac{T_c}{3N_{CB}}\right)h_{SCCB}(k),$$

$$n=0, 1, \ldots$$

$$r_{TRN}^{i_{TX}(4)}\left(n\frac{2T_c}{3N_{CB}}\right) = r_{TRN}^{i_{TX}(3)}\left(\left(2n+\frac{K-1}{2}\right)\frac{T_c}{3N_{CB}}\right), n=n=0, 1, \ldots$$

wherein:
K denotes a length of $h_{SCCB}$ in samples; and $$r_{TRN}^{i_{TX}(2)}\left(n\frac{T_c}{3N_{CB}}\right) = 0, \text{ for } n < 0 \text{ and } n \geq \text{length}\left(r_{TRN}^{i_{TX}(1)}\right) \times 3$$

In some demonstrative embodiments, a control mode EDMG PPDU waveform for the $i_{TX}$-th transmit chain may be determined, for example, by concatenating the preamble and data part, e.g., as defined above, with the TRN field, e.g., as defined above, for example, as follows:

$$r_{PPDU}^{i_{TX}}\left(n\frac{T_c}{N_{up}}\right) = r_{EDMG\text{-}Pream\text{-}Data}^{i_{TX}}\left(n\frac{T_c}{N_{up}}\right) + r_{TRN}^{i_{TX}}\left(n\frac{T_c}{N_{up}} - t_{TRN}\right), \quad (29)$$

$$1 \leq i_{TX} \leq N_{TX}$$

wherein:
$t_{TRN} = t_{Data} + T_{Data}$ is a total duration of L-STF, L-CEF, L-Header, EDMG-Header-A, and Data fields of the PPDU; and
$N_{TX}$ is a total number of transmit chains.

Figure 3:
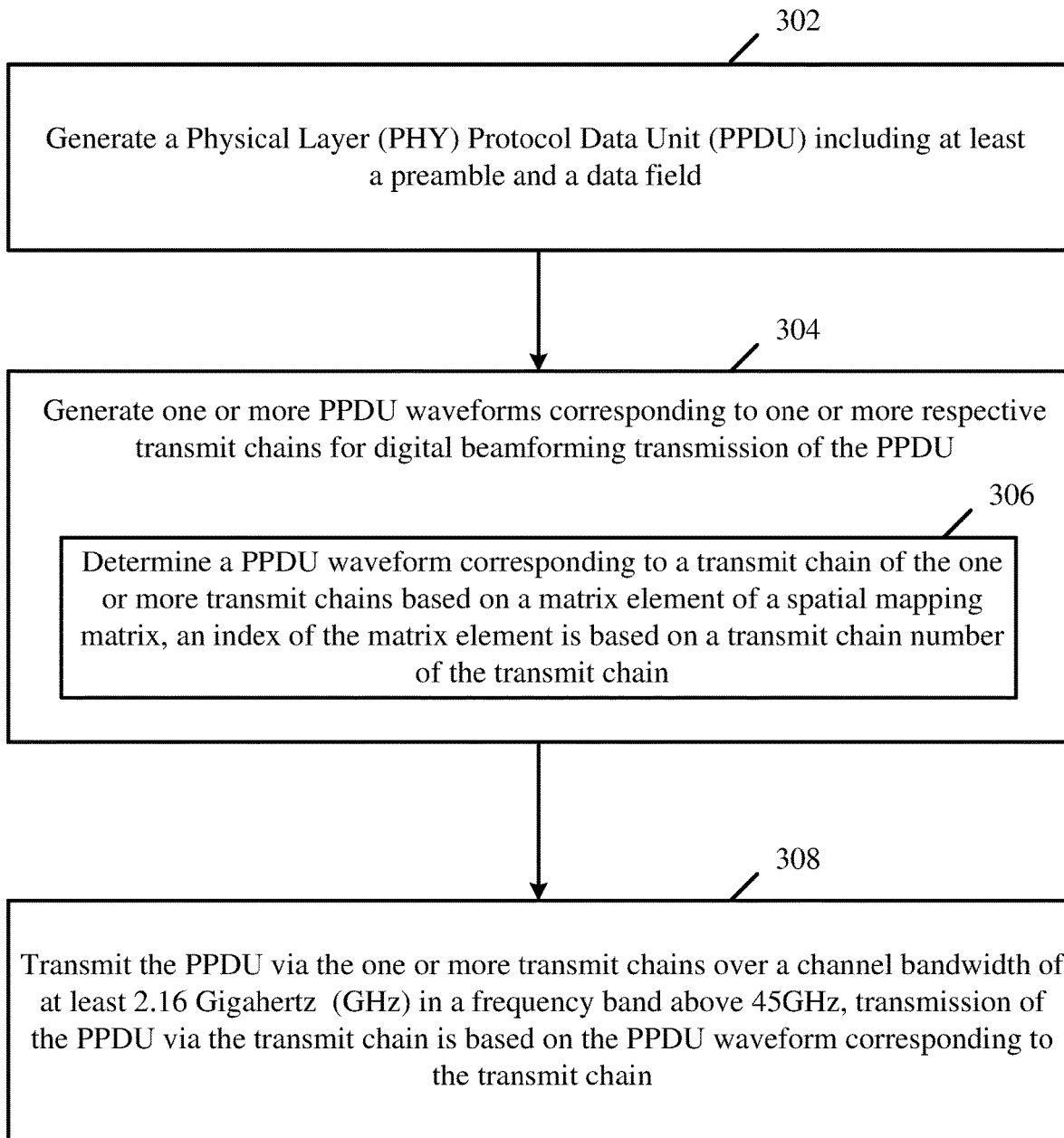
FIG. 3 is a schematic flow-chart illustration of a method of communicating a PPDU, in accordance with some demonstrative embodiments.

Reference is made to FIG. 3, which schematically illustrates a method of communicating a PPDU, in accordance with some demonstrative embodiments. For example, one or more of the operations of the method of FIG. 3 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 302, the method may include generating a PPDU including at least a preamble and a data field. For example, controller 124 (FIG. 1) may be configured to cause, trigger, and/or control the wireless station implemented by device 102 (FIG. 1) to generate the PPDU including at least the preamble and the data field, e.g., as described above.

As indicated at block 304, the method may include generating one or more PPDU waveforms corresponding to one or more respective transmit chains for digital beamforming transmission of the PPDU. For example, controller 124 (FIG. 1) may be configured to cause, trigger, and/or control the wireless station implemented by device 102 (FIG. 1) to generate the one or more PPDU waveforms corresponding to the one or more respective transmit chains for digital beamforming transmission of the PPDU, e.g., as described above.

As indicated at block 306, generating the one or more PPDU waveforms may include determining a PPDU waveform corresponding to a transmit chain of the one or more transmit chains based on a matrix element of a spatial mapping matrix. For example, an index of the matrix element may be based on a transmit chain number of the transmit chain, e.g., as described above.

As indicated at block 308, the method may include transmitting the PPDU via the one or more transmit chains over a channel bandwidth of at least 2.16 GHz in a frequency band above 45 GHz. For example, controller 124 (FIG. 1) may be configured to cause, trigger, and/or control the wireless station implemented by device 102 (FIG. 1) to transmit the PPDU via the one or more transmit chains over the channel bandwidth of at least 2.16 GHz in the frequency band above 45 GHz, e.g., as described above.

In some demonstrative embodiments, transmission of the PPDU via the transmit chain may be based on the PPDU waveform corresponding to the transmit chain, e.g., as described above.

Figure 4:
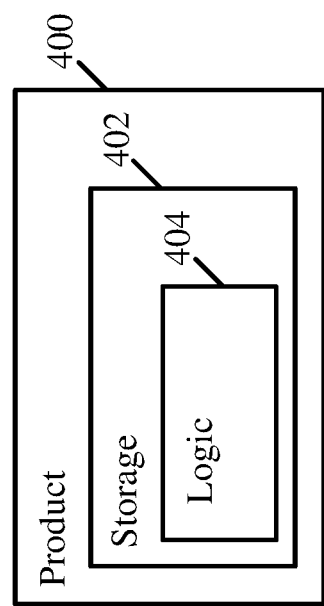
FIG. 4 is a schematic illustration of a product of manufacture, in accordance with some demonstrative embodiments.

Reference is made to FIG. 4, which schematically illustrates a product of manufacture 400, in accordance with some demonstrative embodiments. Product 400 may include one or more tangible computer-readable ("machine-readable") non-transitory storage media 402, which may include computer-executable instructions, e.g., implemented by logic 404, operable to, when executed by at least one computer processor, enable the at least one computer processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to cause device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1) to perform, trigger and/or implement one or more operations and/or functionalities, and/or to perform, trigger and/or implement one or more operations and/or functionalities described with reference to the FIGS. 1, 2, and/or 3, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative embodiments, product 400 and/or machine readable storage media 402 may include one or more types of computer-readable storage media capable of storing data, including volatile memory, non-volatile memory, removable or non-removable memory, erasable or non-erasable memory, writeable or rewriteable memory, and the like. For example, machine readable storage media 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause an Enhanced Directional Multi-Gigabit (DMG) (EDMG) station (STA) to generate a Physical Layer (PHY) Protocol Data Unit (PPDU) comprising at least a preamble and a data field; generate one or more PPDU waveforms corresponding to one or more respective transmit chains for digital beamforming transmission of the PPDU by determining a PPDU waveform corresponding to a transmit chain of the one or more transmit chains based on a matrix element of a spatial mapping matrix, an index of the matrix element is based on a transmit chain number of the transmit chain; and transmit the PPDU via the one or more transmit chains over a channel bandwidth of at least 2.16 Gigahertz (GHz) in a frequency band above 45 GHz, transmission of the PPDU via the transmit chain is based on the PPDU waveform corresponding to the transmit chain.

Example 2 includes the subject matter of Example 1, and optionally, wherein the index of the matrix element comprises a row index of the spatial mapping matrix, the row index is equal to the transmit chain number of the transmit chain.

Example 3 includes the subject matter of Example 1 or 2, and optionally, wherein the matrix element is in a row of the spatial mapping matrix having a row index equal to 1.

Example 4 includes the subject matter of any one of Examples 1-3, and optionally, wherein the apparatus is configured to cause the EDMG STA to transmit the PPDU according to a hybrid beamforming scheme.

Example 5 includes the subject matter of Example 4, and optionally, wherein the hybrid beamforming scheme comprises digital beamforming according to the spatial mapping matrix, and analog beamforming according to an Antenna Weight Vector (AWV).

Example 6 includes the subject matter of any one of Examples 1-5, and optionally, wherein the apparatus is configured to cause the EDMG STA to generate one or more preamble-data waveforms corresponding to the one or more transmit chains, a preamble-data waveform corresponding to the transmit chain is based on the matrix element of the spatial mapping matrix; and generate the one or more PPDU waveforms corresponding to the one or more transmit chains by up-sampling and filtering the one or more preamble-data waveforms, the PPDU waveform corresponding to the transmit chain is based on up-sampling and filtering the preamble-data waveform corresponding to the transmit chain.

Example 7 includes the subject matter of any one of Examples 1-6, and optionally, wherein the apparatus is configured to cause the EDMG STA to transmit the PPDU over a channel bandwidth of 2.16 GHz.

Example 8 includes the subject matter of any one of Examples 1-6, and optionally, wherein the apparatus is configured to cause the EDMG STA to transmit the PPDU over a channel bandwidth comprising a plurality of 2.16 GHz channel bandwidths.

Example 9 includes the subject matter of Example 8, and optionally, wherein the apparatus is configured to cause the EDMG STA to determine the PPDU waveform corresponding to the transmit chain to comprise an up-sampled and filtered waveform corresponding to the transmit chain duplicated, with time delay, over the plurality of 2.16 GHz channel bandwidths.

Example 10 includes the subject matter of any one of Examples 1-9, and optionally, wherein the PPDU comprises a non-EDMG PPDU decodable by one or more non-EDMG stations, which are DMG stations.

Example 11 includes the subject matter of Example 10, and optionally, wherein the apparatus is configured to cause the EDMG STA to determine a non-EDMG waveform corresponding to the transmit chain, and to determine the PPDU waveform corresponding to the transmit chain based on the non-EDMG waveform corresponding to the transmit chain, the non-EDMG waveform corresponding to the transmit chain determined based on the matrix element of the spatial mapping matrix as follows:

$$r_{non\text{-}EDMG}^{iTX(1)}(nT_c) = [Q]_{i_{TX},1} \cdot r_{non\text{-}EDMG}(nT_c),$$
$$1 \leq i_{TX} \leq N_{TX}$$

wherein $N_{Tx}$ denotes a total count of the one or more transmit chains, $r_{non\text{-}EDMG}^{iTX(1)}(nT_c)$ denotes the non-EDMG waveform corresponding to the transmit chain number $i_{TX}$, $r_{non\text{-}EDMG}(nT_c)$ denotes fields of the non-EDMG PPDU, Q denotes the spatial mapping matrix, and $[\ ]_{m,n}$ denotes a matrix element from an m-th row and an n-th column.

Example 12 includes the subject matter of Example 11, and optionally, wherein the apparatus is configured to cause the EDMG STA to determine the PPDU waveform corresponding to the transmit chain based on an up-sampled and filtered waveform corresponding to the transmit chain, which is defined as follows:

$$r_{non\text{-}EDMG}^{iTX(2)}\left(n\frac{T_c}{N_{up}}\right) = \begin{cases} r_{non\text{-}EDMG}^{iTX(1)}\left(n\frac{T_c}{N_{up}}\right), & n = 0, N_{up}, 2*N_{up} \ldots \\ 0 & \text{otherwise} \end{cases}$$

$$r_{non\text{-}EDMG}^{iTX(3)}\left(n\frac{T_c}{N_{up}}\right) = \sum_{k=0}^{K-1} r_{non\text{-}EDMG}^{iTX(2)}\left((n-k)\frac{T_c}{N_{up}}\right) h_{SCCB}(k), n = 0, 1, \ldots$$

$$r_{non\text{-}EDMG}^{iTX(4)}\left(n\frac{T_c}{N_{up}}\right) = r_{non\text{-}EDMG}^{iTX(3)}\left(\left(n + \frac{K-1}{2}\right)\frac{T_c}{N_{up}}\right), n = 0, 1, \ldots$$

wherein:

$$r_{non\text{-}EDMG}^{iTX(4)}\left(n\frac{T_c}{N_{up}}\right)$$

denotes an up-sampled and filtered waveform corresponding to a transmit chain number $i_{TX}$,
$h_{SCCB}$ denotes a response of a pulse shaping filter,
$T_c$ denotes a Single Carrier (SC) chip time duration,
$N_{up}$ denotes a factor value, K denotes a length of the pulse shaping filter in samples, and $$r_{non\text{-}EDMG,}^{iTX(2)}\left(n\frac{T_c}{N_{up}}\right) = 0, \text{ for } n < 0 \text{ and } n \geq \text{length}\left(r_{non\text{-}EDMG}^{iTX(1)}\right) \times N_{up}.$$

Example 13 includes the subject matter of any one of Examples 10-12, and optionally, wherein the apparatus is configured to, when the non-EDMG PPDU is to be transmitted over a channel bandwidth of 2.16 GHz, determine the PPDU waveform corresponding to the transmit chain to comprise the following waveform:

$$r_{PPDU}^{iTX}(nT_c) = r_{non\text{-}EDMG}^{iTX(4)}(nT_c), 1 \leq i_{TX} \leq N_{TX}$$

wherein:

$r_{non\text{-}EDMG}^{iTX(4)}$ denotes an up-sampled and filtered waveform corresponding to a transmit chain number $i_{TX}$, and $T_c$ denotes a Single Carrier (SC) chip time duration, Example 14 includes the subject matter of any one of Examples 10-12, and optionally, wherein the apparatus is configured to, when the non-EDMG PPDU is to be transmitted over a 4.32 GHz bandwidth, determine the PPDU waveform corresponding to the transmit chain to comprise the following waveform:

$$r_{PPDU}^{iTX}\left(n\frac{T_c}{N_{up}}\right) = r_{non\text{-}EDMG}^{iTX(4)}\left(n\frac{T_c}{N_{up}} + \Delta t_1\right) \cdot \frac{1}{\sqrt{2}} \exp\left(-j2\pi\left(\frac{\Delta F}{2}\right)\left(\frac{T_c}{N_{up}}\right)n\right) + +$$

$$r_{non\text{-}EDMG}^{iTX(4)}\left(n\frac{T_c}{N_{up}} + \Delta t_2\right) \cdot \frac{1}{\sqrt{2}} \exp\left(+j2\pi\left(\frac{\Delta F}{2}\right)\left(\frac{T_c}{N_{up}}\right)n\right), 1 \leq i_{TX} \leq N_{TX}$$

wherein:

$$r_{non\text{-}EDMG}^{iTX(4)}\left(n\frac{T_c}{N_{up}}\right)$$

denotes an up-sampled and filtered waveform corresponding to a transmit chain number $i_{TX}$, $T_c$ denotes a Single Carrier (SC) chip time duration, $\Delta F$ denotes a sub-channel spacing equal to 2.16 GHz, and $\Delta t_1$ and $\Delta t_2$ are in the range [0, $T_c$].

Example 15 includes the subject matter of any one of Examples 10-12, and optionally, wherein the apparatus is configured to, when the non-EDMG PPDU is to be transmitted over a 6.48 GHz bandwidth, determine the PPDU waveform corresponding to the transmit chain to comprise the following waveform:

$$r_{PPDU}^{iTX}\left(n\frac{T_c}{N_{up}}\right) = r_{non\text{-}EDMG}^{iTX(4)}\left(n\frac{T_c}{N_{up}} + \Delta t_1\right) \cdot \frac{1}{\sqrt{3}}$$

$$\exp\left(-j2\pi\Delta F\left(\frac{T_c}{N_{up}}\right)n\right) + + r_{non\text{-}EDMG}^{iTX(4)}\left(n\frac{T_c}{N_{up}} + \Delta t_2\right) \cdot \frac{1}{\sqrt{3}} + +$$

$$r_{non\text{-}EDMG}^{iTX(4)}\left(n\frac{T_c}{N_{up}} + \Delta t_3\right) \cdot \frac{1}{\sqrt{3}} \exp\left(+j2\pi\Delta F\left(\frac{T_c}{N_{up}}\right)n\right), 1 \leq i_{TX} \leq N_{TX}$$

wherein:

$$r_{non\text{-}EDMG}^{iTX(4)}\left(n\frac{T_c}{N_{up}}\right)$$

denotes an up-sampled and filtered waveform corresponding to a transmit chain number $i_{TX}$, $T_c$ denotes a Single Carrier (SC) chip time duration, $\Delta F$ denotes a sub-channel spacing equal to 2.16 GHz, and $\Delta t_1$, $\Delta t_2$, and $\Delta t_3$ are in the range [0, $T_c$].

Example 16 includes the subject matter of any one of Examples 10-12, and optionally, wherein the apparatus is configured to, when the non-EDMG PPDU is to be transmitted over a 8.64 GHz bandwidth, determine the PPDU waveform corresponding to the transmit chain to comprise the following waveform:

$$r_{PPDU}^{iTX}\left(n\frac{T_c}{N_{up}}\right) =$$

$$r_{non\text{-}EDMG}^{iTX(4)}\left(n\frac{T_c}{N_{up}} + \Delta t_1\right) \cdot \frac{1}{\sqrt{4}} \exp\left(-j2\pi\left(\frac{3\Delta F}{2}\right)\left(\frac{T_c}{N_{up}}\right)n\right) + +$$

$$r_{non\text{-}EDMG}^{iTX(4)}\left(n\frac{T_c}{N_{up}} + \Delta t_2\right) \cdot \frac{1}{\sqrt{4}} \exp\left(-j2\pi\left(\frac{\Delta F}{2}\right)\left(\frac{T_c}{N_{up}}\right)n\right) + +$$

$$r_{non\text{-}EDMG}^{iTX(4)}\left(n\frac{T_c}{N_{up}} + \Delta t_3\right) \cdot \frac{1}{\sqrt{4}} \exp\left(+j2\pi\left(\frac{\Delta F}{2}\right)\left(\frac{T_c}{N_{up}}\right)n\right) + +$$

$$r_{non\text{-}EDMG}^{iTX(4)}\left(n\frac{T_c}{N_{up}} + \Delta t_4\right) \cdot \frac{1}{\sqrt{4}} \exp\left(+j2\pi\left(\frac{3\Delta F}{2}\right)\left(\frac{T_c}{N_{up}}\right)n\right), 1 \leq i_{TX} \leq N_{TX}$$

wherein:

$$r_{non\text{-}EDMG}^{iTX(4)}\left(n\frac{T_c}{N_{up}}\right)$$

denotes an up-sampled and filtered waveform corresponding to a transmit chain number $i_{TX}$, $T_c$ denotes a Single Carrier (SC) chip time duration, $\Delta F$ denotes a sub-channel spacing equal to 2.16 GHz, and $\Delta t_1$, $\Delta t_2$, $\Delta t_3$, and $\Delta t_4$ are in the range [0, $T_c$].

Example 17 includes the subject matter of any one of Examples 1-9, and optionally, wherein the PPDU comprises an EDMG PPDU decodable by EDMG stations.

Example 18 includes the subject matter of Example 17, and optionally, wherein the apparatus is configured to cause the EDMG STA to determine an EDMG waveform corresponding to the transmit chain, and to determine the PPDU waveform corresponding to the transmit chain based on the EDMG waveform corresponding to the transmit chain, the EDMG waveform corresponding to the transmit chain determined based on the matrix element of the spatial mapping matrix as follows:

$$r_{EDMG\text{-}Pream\text{-}Data}^{iTX(1)}(nT_c) = [Q]_{i_{TX},1} \cdot r_{EDMG\text{-}Pream\text{-}Data}(nT_c), 1 \leq i_{TX} \leq N_{TX}$$

wherein $N_{Tx}$ denotes a total count of the one or more transmit chains, $r_{EDMG\text{-}Pream\text{-}Data}^{iTX(1)}$ ($nT_c$) denotes the EDMG waveform corresponding to the transmit chain number $i_{TX}$, $r_{EDMG\text{-}Pream\text{-}Data}(nT_c)$ denotes the preamble and date field of the EDMG PPDU, Q denotes the spatial mapping matrix, and [ ]$_{m,n}$ denotes a matrix element from an m-th row and an n-th column.

Example 19 includes the subject matter of Example 17 or 18, and optionally, wherein the apparatus is configured to cause the EDMG STA to determine the PPDU waveform corresponding to the transmit chain based on an up-sampled and filtered waveform corresponding to the transmit chain, which is defined as follows:

$$r^{i_{TX}(2)}_{EDMG\text{-}Pream\text{-}Data}\left(n\frac{T_c}{N_{up}}\right) =$$

$$\begin{cases} r^{i_{TX}(1)}_{EDMG\text{-}Pream\text{-}Data}\left(n\frac{T_c}{N_{up}}\right), & n = 0, N_{up}, 2*N_{up}\dots \\ 0 & \text{otherwise} \end{cases}$$

$$r^{i_{TX}(3)}_{EDMG\text{-}Pream\text{-}Data}\left(n\frac{T_c}{N_{up}}\right) = \sum_{k=0}^{K-1} r^{i_{TX}(2)}_{EDMG\text{-}Pream\text{-}Data}\left((n-k)\frac{T_c}{N_{up}}\right) h_{SCCB}(k),$$

$$n = 0, 1, \dots$$

$$r^{i_{TX}(4)}_{EDMG\text{-}Pream\text{-}Data}\left(n\frac{T_c}{N_{up}}\right) = r^{i_{TX}(3)}_{EDMG\text{-}Pream\text{-}Data}\left(\left(n + \frac{K-1}{2}\right)\frac{T_c}{N_{up}}\right),$$

$$n = 0, 1, \dots$$

wherein:

$$r^{i_{TX}(4)}_{EMDG\text{-}Pream\text{-}Data}\left(n\frac{T_c}{N_{up}}\right)$$

denotes an up-sampled and filtered waveform corresponding to a transmit chain number $i_{TX}$, $$r^{i_{TX}(1)}_{EMDG\text{-}Pream\text{-}Data}\left(n\frac{T_c}{N_{up}}\right)$$

denotes an EDMG preamble-date waveform corresponding to a transmit chain number $i_{TX}$,
$h_{SCCB}$ denotes a response of a pulse shaping filter,
$T_c$ denotes a Single Carrier (SC) chip time duration,
$N_{up}$ denotes a factor value,
K denotes a length of the pulse shaping filter in samples, and $$r^{i_{TX}(2)}_{EMDG\text{-}Pream\text{-}Data}\left(n\frac{T_c}{N_{up}}\right) = 0,$$

for $n < 0$ and $n \geq \text{length}(r^{i_{TX}(1)}_{EMDG\text{-}Pream\text{-}Data}) \times N_{up}$.

Example 20 includes the subject matter of any one of Examples 17-19, and optionally, wherein the apparatus is configured to, when the EDMG PPDU is to be transmitted over a channel bandwidth of 2.16 GHz, determine the PPDU waveform corresponding to the transmit chain to comprise the following waveform:

$$r^{i_{TX}}_{EMDG\text{-}Pream\text{-}Data}\left(n\frac{T_c}{N_{up}}\right) = r^{i_{TX}(4)}_{EMDG\text{-}Pream\text{-}Data}\left(n\frac{T_c}{N_{up}}\right), 1 \leq i_{TX} \leq N_{TX}$$

wherein:

$$r^{i_{TX}(4)}_{EMDG\text{-}Pream\text{-}Data}\left(n\frac{T_c}{N_{up}}\right)$$

denotes an up-sampled and filtered waveform corresponding to a transmit chain number $i_{TX}$, and
$T_c$ denotes a Single Carrier (SC) chip time duration, Example 21 includes the subject matter of any one of Examples 17-19, and optionally, wherein the apparatus is configured to, when the EDMG PPDU is to be transmitted over a 4.32 GHz bandwidth, determine the PPDU waveform corresponding to the transmit chain to comprise the following waveform:

$$r^{i_{TX}}_{EMDG\text{-}Pream\text{-}Data}\left(n\frac{T_c}{N_{up}}\right) == $$

$$r^{i_{TX}(4)}_{EMDG\text{-}Pream\text{-}Data}\left(n\frac{T_c}{N_{up}} + \Delta t_1\right) \cdot \frac{1}{\sqrt{2}}\exp\left(-j2\pi\left(\frac{\Delta F}{2}\right)\left(\frac{T_c}{N_{up}}\right)n\right) + +$$

$$r^{i_{TX}(4)}_{EMDG\text{-}Pream\text{-}Data}\left(n\frac{T_c}{N_{up}} + \Delta t_2\right) \cdot \frac{1}{\sqrt{2}}\exp\left(+j2\pi\left(\frac{\Delta F}{2}\right)\left(\frac{T_c}{N_{up}}\right)n\right),$$

$$1 \leq i_{TX} \leq N_{TX}$$

wherein:

$$r^{i_{TX}(4)}_{EMDG\text{-}Pream\text{-}Data}\left(n\frac{T_c}{N_{up}}\right)$$

denotes an up-sampled and filtered waveform corresponding to a transmit chain number $i_{TX}$,
$T_c$ denotes a Single Carrier (SC) chip time duration,
$\Delta F$ denotes a sub-channel spacing equal to 2.16 GHz, and
$\Delta t_1$ and $\Delta t_2$ are in the range [0, $T_c$].

Example 22 includes the subject matter of any one of Examples 17-19, and optionally, wherein the apparatus is configured to, when the EDMG PPDU is to be transmitted over a 6.48 GHz bandwidth, determine the PPDU waveform corresponding to the transmit chain to comprise the following waveform:

$$r^{i_{TX}}_{EMDG\text{-}Pream\text{-}Data}\left(n\frac{T_c}{N_{up}}\right) == r^{i_{TX}(4)}_{EMDG\text{-}Pream\text{-}Data}\left(n\frac{T_c}{N_{up}} + \Delta t_1\right) \cdot$$

$$\frac{1}{\sqrt{3}}\exp\left(-j2\pi\Delta F\left(\frac{T_c}{N_{up}}\right)n\right) + + r^{i_{TX}(4)}_{EMDG\text{-}Pream\text{-}Data}\left(n\frac{T_c}{N_{up}} + \Delta t_2\right) \cdot \frac{1}{\sqrt{3}} + +$$

$$r^{i_{TX}(4)}_{EMDG\text{-}Pream\text{-}Data}\left(n\frac{T_c}{N_{up}} + \Delta t_3\right) \cdot \frac{1}{\sqrt{3}}\exp\left(+j2\pi\Delta F\left(\frac{T_c}{N_{up}}\right)n\right),$$

$$1 \leq i_{TX} \leq N_{TX}$$

wherein:

$$r^{i_{TX}(4)}_{EMDG\text{-}Pream\text{-}Data}\left(n\frac{T_c}{N_{up}}\right)$$

denotes an up-sampled and filtered waveform corresponding to a transmit chain number $i_{TX}$,
$T_c$ denotes a Single Carrier (SC) chip time duration,
$\Delta F$ denotes a sub-channel spacing equal to 2.16 GHz, and
$\Delta t_1$, $\Delta t_2$, and $\Delta t_3$ are in the range [0, $T_c$].

Example 23 includes the subject matter of any one of Examples 17-19, and optionally, wherein the apparatus is configured to, when the EDMG PPDU is to be transmitted over a 8.64 GHz bandwidth, determine the PPDU waveform corresponding to the transmit chain to comprise the following waveform:

$$r^{i_{TX}}_{EMDG\text{-}Pream\text{-}Data}\left(n\frac{T_c}{N_{up}}\right) ==$$

$$r^{i_{TX}(4)}_{EMDG\text{-}Pream\text{-}Data}\left(n\frac{T_c}{N_{up}} + \Delta t_1\right) \cdot \frac{1}{\sqrt{4}} \exp\left(-j2\pi\left(\frac{3\Delta F}{2}\right)\left(\frac{T_c}{N_{up}}\right)n\right) ++$$

$$r^{i_{TX}(4)}_{EMDG\text{-}Pream\text{-}Data}\left(n\frac{T_c}{N_{up}} + \Delta t_2\right) \cdot \frac{1}{\sqrt{4}} \exp\left(-j2\pi\left(\frac{\Delta F}{2}\right)\left(\frac{T_c}{N_{up}}\right)n\right) ++$$

$$r^{i_{TX}(4)}_{EMDG\text{-}Pream\text{-}Data}\left(n\frac{T_c}{N_{up}} + \Delta t_3\right) \cdot \frac{1}{\sqrt{4}} \exp\left(+j2\pi\left(\frac{\Delta F}{2}\right)\left(\frac{T_c}{N_{up}}\right)n\right) ++$$

$$r^{i_{TX}(4)}_{EMDG\text{-}Pream\text{-}Data}\left(n\frac{T_c}{N_{up}} + \Delta t_4\right) \cdot$$

$$\frac{1}{\sqrt{4}} \exp\left(+j2\pi\left(\frac{3\Delta F}{2}\right)\left(\frac{T_c}{N_{up}}\right)n\right),$$

$$1 \le i_{TX} \le N_{TX}$$

wherein:

$$r^{i_{TX}(4)}_{EMDG\text{-}Pream\text{-}Data}\left(n\frac{T_c}{N_{up}}\right)$$

denotes an up-sampled and filtered waveform corresponding to a transmit chain number $i_{TX}$, $T_c$ denotes a Single Carrier (SC) chip time duration, $\Delta F$ denotes a sub-channel spacing equal to 2.16 GHz, and $\Delta t_1$, $\Delta t_2$, $\Delta t_3$, and $\Delta t_4$ are in the range [0, $T_c$].

Example 24 includes the subject matter of any one of Examples 1-23, and optionally, wherein the apparatus is configured to cause the EDMG STA to generate the PPDU comprising a training (TRN) field, and to generate the PPDU waveform corresponding to the transmit chain based on a waveform for the TRN field.

Example 25 includes the subject matter of Example 24, and optionally, wherein the apparatus is configured to cause the EDMG STA to generate the waveform for the TRN field by filtering and resampling a TRN field corresponding to the number of the transmit chain.

Example 26 includes the subject matter of Example 24 or 25, and optionally, wherein the apparatus is configured to cause the EDMG STA to determine the waveform for the TRN field based on the following resampling procedure:

$$r^{i_{TX}(2)}_{TRN}\left(n\frac{T_c}{3N_{CB}}\right) = \begin{cases} r^{i_{TX}(2)}_{TRN}\left(n\frac{T_c}{3N_{CB}}\right), & n = 0, 3, 6 \ldots \\ 0 & \text{otherwise} \end{cases}$$

$$r^{i_{TX}(3)}_{TRN}\left(n\frac{T_c}{3N_{CB}}\right) = \sum_{k=0}^{K-1} r^{i_{TX}(2)}_{TRN}\left((n-k)\frac{T_c}{3N_{CB}}\right)h_{SCCB}(k),$$

$$n = 0, 1, \ldots$$

$$r^{i_{TX}(4)}_{TRN}\left(n\frac{2T_c}{3N_{CB}}\right) = r^{i_{TX}(3)}_{TRN}\left(\left(2n + \frac{K-1}{2}\right)\frac{T_c}{3N_{CB}}\right), n = 0, 1, \ldots$$

wherein:

$$r^{i_{TX}(1)}_{TRN}\left(n\frac{T_c}{N_{CB}}\right)$$

denotes a TRN field corresponding to a transmit chain number $i_{TX}$, $T_c$ denotes a Single Carrier (SC) chip time duration, $N_{up}$ denotes a factor value, $N_{CB}$ denotes a channel bonding factor, $h_{SCCB}$ denotes a response of a pulse shaping filter, K denotes a length of the pulse shaping filter in samples, and $$r^{i_{TX}(2)}_{TRN}\left(n\frac{T_c}{3N_{CB}}\right) = 0, \text{ for } n < 0 \text{ and } n \ge \text{length}\left(r^{i_{TX}(1)}_{TRN}\right) \times 3.$$

Example 27 includes the subject matter of any one of Examples 1-26, and optionally, wherein the apparatus is configured to cause the EDMG STA to transmit the PPDU in a Single Carrier (SC) transmission.

Example 28 includes the subject matter of any one of Examples 1-27, and optionally, wherein the PPDU comprises a control mode PPDU.

Example 29 includes the subject matter of any one of Examples 1-28, and optionally, wherein the apparatus is configured to cause the EDMG STA to transmit the PPDU over a channel bandwidth of 2.16 GHz, 4.32 GHz, 6.48 GHz, or 8.64 GHz.

Example 30 includes the subject matter of any one of Examples 1-29, and optionally, comprising a radio.

Example 31 includes the subject matter of any one of Examples 1-30, and optionally, comprising one or more antennas.

Example 32 includes a system of wireless communication comprising an Enhanced Directional Multi-Gigabit (DMG) (EDMG) station (STA), the EDMG STA comprising one or more antennas; a radio; a memory; a processor; and a controller configured to cause the EDMG STA to generate a Physical Layer (PHY) Protocol Data Unit (PPDU) comprising at least a preamble and a data field; generate one or more PPDU waveforms corresponding to one or more respective transmit chains for digital beamforming transmission of the PPDU by determining a PPDU waveform corresponding to a transmit chain of the one or more transmit chains based on a matrix element of a spatial mapping matrix, an index of the matrix element is based on a transmit chain number of the transmit chain; and transmit the PPDU via the one or more transmit chains over a channel bandwidth of at least 2.16 Gigahertz (GHz) in a frequency band above 45 GHz, transmission of the PPDU via the transmit chain is based on the PPDU waveform corresponding to the transmit chain.

Example 33 includes the subject matter of Example 32, and optionally, wherein the index of the matrix element comprises a row index of the spatial mapping matrix, the row index is equal to the transmit chain number of the transmit chain.

Example 34 includes the subject matter of Example 32 or 33, and optionally, wherein the matrix element is in a row of the spatial mapping matrix having a row index equal to 1.

Example 35 includes the subject matter of any one of Examples 32-34, and optionally, wherein the controller is configured to cause the EDMG STA to transmit the PPDU according to a hybrid beamforming scheme.

Example 36 includes the subject matter of Example 35, and optionally, wherein the hybrid beamforming scheme comprises digital beamforming according to the spatial mapping matrix, and analog beamforming according to an Antenna Weight Vector (AWV).

Example 37 includes the subject matter of any one of Examples 32-36, and optionally, wherein the controller is configured to cause the EDMG STA to generate one or more preamble-data waveforms corresponding to the one or more transmit chains, a preamble-data waveform corresponding to the transmit chain is based on the matrix element of the spatial mapping matrix; and generate the one or more PPDU waveforms corresponding to the one or more transmit chains by up-sampling and filtering the one or more preamble-data waveforms, the PPDU waveform corresponding to the transmit chain is based on up-sampling and filtering the preamble-data waveform corresponding to the transmit chain.

Example 38 includes the subject matter of any one of Examples 32-37, and optionally, wherein the controller is configured to cause the EDMG STA to transmit the PPDU over a channel bandwidth of 2.16 GHz.

Example 39 includes the subject matter of any one of Examples 32-37, and optionally, wherein the controller is configured to cause the EDMG STA to transmit the PPDU over a channel bandwidth comprising a plurality of 2.16 GHz channel bandwidths.

Example 40 includes the subject matter of Example 39, and optionally, wherein the controller is configured to cause the EDMG STA to determine the PPDU waveform corresponding to the transmit chain to comprise an up-sampled and filtered waveform corresponding to the transmit chain duplicated, with time delay, over the plurality of 2.16 GHz channel bandwidths.

Example 41 includes the subject matter of any one of Examples 32-40, and optionally, wherein the PPDU comprises a non-EDMG PPDU decodable by one or more non-EDMG stations, which are DMG stations.

Example 42 includes the subject matter of Example 41, and optionally, wherein the controller is configured to cause the EDMG STA to determine a non-EDMG waveform corresponding to the transmit chain, and to determine the PPDU waveform corresponding to the transmit chain based on the non-EDMG waveform corresponding to the transmit chain, the non-EDMG waveform corresponding to the transmit chain determined based on the matrix element of the spatial mapping matrix as follows:

$$r_{non\text{-}EDMG}^{i_{TX}(1)}(nT_c) = [Q]_{i_{TX},1} \cdot r_{non\text{-}EDMG}(nT_c),$$
$$1 \leq i_{TX} \leq N_{TX}$$

wherein $N_{Tx}$ denotes a total count of the one or more transmit chains, $r_{non\text{-}EDMG}^{i_{TX}(1)}(nT_c)$ denotes the non-EDMG waveform corresponding to the transmit chain number $i_{TX}$, $r_{non\text{-}EDMG}(nT_c)$ denotes fields of the non-EDMG PPDU, Q denotes the spatial mapping matrix, and $[\ ]_{m,n}$ denotes a matrix element from an m-th row and an n-th column.

Example 43 includes the subject matter of Example 42, and optionally, wherein the controller is configured to cause the EDMG STA to determine the PPDU waveform corresponding to the transmit chain based on an up-sampled and filtered waveform corresponding to the transmit chain, which is defined as follows:

$$r_{non\text{-}EDMG}^{i_{TX}(2)}\left(n\frac{T_c}{N_{up}}\right) = \begin{cases} r_{non\text{-}EDMG}^{i_{TX}(1)}\left(n\frac{T_c}{N_{up}}\right), & n = 0, N_{up}, 2*N_{up} \ldots \\ 0 & \text{otherwise} \end{cases}$$

$$r_{non\text{-}EDMG}^{i_{TX}(3)}\left(n\frac{T_c}{N_{up}}\right) = \sum_{k=0}^{K-1} r_{non\text{-}EDMG}^{i_{TX}(2)}\left((n-k)\frac{T_c}{N_{up}}\right) h_{SCCB}(k),$$

$$n = 0, 1, \ldots$$

$$r_{non\text{-}EDMG}^{i_{TX}(4)}\left(n\frac{T_c}{N_{up}}\right) = r_{non\text{-}EDMG}^{i_{TX}(3)}\left(\left(n + \frac{K-1}{2}\right)\frac{T_c}{N_{up}}\right), n = 0, 1, \ldots$$

wherein:

$$r_{non\text{-}EDMG}^{i_{TX}(4)}\left(n\frac{T_c}{N_{up}}\right)$$

denotes an up-sampled and filtered waveform corresponding to a transmit chain number $i_{TX}$, $h_{SCCB}$ denotes a response of a pulse shaping filter, $T_c$ denotes a Single Carrier (SC) chip time duration, $N_{up}$ denotes a factor value, K denotes a length of the pulse shaping filter in samples, and $$r_{non\text{-}EDMG,}^{i_{TX}(2)}\left(n\frac{T_c}{N_{up}}\right) = 0, \text{ for } n < 0 \text{ and } n \geq \text{length}(r_{non\text{-}EDMG}^{i_{TX}(1)}) \times N_{up}.$$

Example 44 includes the subject matter of any one of Examples 41-43, and optionally, wherein the controller is configured to, when the non-EDMG PPDU is to be transmitted over a channel bandwidth of 2.16 GHz, determine the PPDU waveform corresponding to the transmit chain to comprise the following waveform:

$$r_{PPDU}^{i_{TX}}(nT_c) = r_{non\text{-}EDMG}^{i_{TX}(4)}(nT_c), 1 \leq i_{TX} \leq N_{TX}$$

wherein:

$r_{non\text{-}EDMG}^{i_{TX}(4)}$ denotes an up-sampled and filtered waveform corresponding to a transmit chain number $i_{TX}$, and $T_c$ denotes a Single Carrier (SC) chip time duration, Example 45 includes the subject matter of any one of Examples 41-43, and optionally, wherein the controller is configured to, when the non-EDMG PPDU is to be transmitted over a 4.32 GHz bandwidth, determine the PPDU waveform corresponding to the transmit chain to comprise the following waveform:

$$r_{PPDU}^{i_{TX}}\left(n\frac{T_c}{N_{up}}\right) = r_{non\text{-}EDMG}^{i_{TX}(4)}\left(n\frac{T_c}{N_{up}} + \Delta t_1\right) \cdot \frac{1}{\sqrt{2}} \exp\left(-j2\pi\left(\frac{\Delta F}{2}\right)\left(\frac{T_c}{N_{up}}\right)n\right) + $$
$$+ r_{non\text{-}EDMG}^{i_{TX}(4)}\left(n\frac{T_c}{N_{up}} + \Delta t_2\right) \cdot \frac{1}{\sqrt{2}} \exp\left(+j2\pi\left(\frac{\Delta F}{2}\right)\left(\frac{T_c}{N_{up}}\right)n\right), 1 \leq i_{TX} \leq N_{TX}$$

wherein:

$$r_{non\text{-}EDMG}^{i_{TX}(4)}\left(n\frac{T_c}{N_{up}}\right)$$

denotes an up-sampled and filtered waveform corresponding to a transmit chain number $i_{TX}$, $T_c$ denotes a Single Carrier (SC) chip time duration, $\Delta F$ denotes a sub-channel spacing equal to 2.16 GHz, and $\Delta t_1$ and $\Delta t_2$ are in the range $[0, T_c]$.

Example 46 includes the subject matter of any one of Examples 41-43, and optionally, wherein the controller is configured to, when the non-EDMG PPDU is to be transmitted over a 6.48 GHz bandwidth, determine the PPDU waveform corresponding to the transmit chain to comprise the following waveform:

$$r_{PPDU}^{i_{TX}}\left(n\frac{T_c}{N_{up}}\right) = r_{non\text{-}EDMG}^{i_{TX}(4)}\left(n\frac{T_c}{N_{up}} + \Delta t_1\right) \cdot \frac{1}{\sqrt{3}}$$

$$\exp\left(-j2\pi\Delta F\left(\frac{T_c}{N_{up}}\right)n\right) + + r_{non\text{-}EDMG}^{i_{TX}(4)}\left(n\frac{T_c}{N_{up}} + \Delta t_2\right) \cdot \frac{1}{\sqrt{3}} + +$$

$$r_{non\text{-}EDMG}^{i_{TX}(4)}\left(n\frac{T_c}{N_{up}} + \Delta t_3\right) \cdot \frac{1}{\sqrt{3}} \exp\left(+j2\pi\Delta F\left(\frac{T_c}{N_{up}}\right)n\right), 1 \le i_{TX} \le N_{TX}$$

wherein:

$$r_{non\text{-}EDMG}^{i_{TX}(4)}\left(n\frac{T_c}{N_{up}}\right)$$

denotes an up-sampled and filtered waveform corresponding to a transmit chain number $i_{TX}$,
$T_c$ denotes a Single Carrier (SC) chip time duration,
$\Delta F$ denotes a sub-channel spacing equal to 2.16 GHz, and
$\Delta t_1$, $\Delta t_2$, and $\Delta t_3$ are in the range $[0, T_c]$.

Example 47 includes the subject matter of any one of Examples 41-43, and optionally, wherein the controller is configured to, when the non-EDMG PPDU is to be transmitted over a 8.64 GHz bandwidth, determine the PPDU waveform corresponding to the transmit chain to comprise the following waveform:

$$r_{PPDU}^{i_{TX}}\left(n\frac{T_c}{N_{up}}\right) = r_{non\text{-}EDMG}^{i_{TX}(4)}\left(n\frac{T_c}{N_{up}} + \Delta t_1\right) \cdot \frac{1}{\sqrt{4}}\exp\left(-j2\pi\left(\frac{3\Delta F}{2}\right)\left(\frac{T_c}{N_{up}}\right)n\right) + +$$

$$r_{non\text{-}EDMG}^{i_{TX}(4)}\left(n\frac{T_c}{N_{up}} + \Delta t_2\right) \cdot \frac{1}{\sqrt{4}}\exp\left(-j2\pi\left(\frac{\Delta F}{2}\right)\left(\frac{T_c}{N_{up}}\right)n\right) + +$$

$$r_{non\text{-}EDMG}^{i_{TX}(4)}\left(n\frac{T_c}{N_{up}} + \Delta t_3\right) \cdot \frac{1}{\sqrt{4}}\exp\left(+j2\pi\left(\frac{\Delta F}{2}\right)\left(\frac{T_c}{N_{up}}\right)n\right) + +$$

$$r_{non\text{-}EDMG}^{i_{TX}(4)}\left(n\frac{T_c}{N_{up}} + \Delta t_4\right) \cdot \frac{1}{\sqrt{4}}\exp\left(+j2\pi\left(\frac{3\Delta F}{2}\right)\left(\frac{T_c}{N_{up}}\right)n\right),$$

$$1 \le i_{TX} \le N_{TX}$$

wherein:

$$r_{non\text{-}EDMG}^{i_{TX}(4)}\left(n\frac{T_c}{N_{up}}\right)$$

denotes an up-sampled and filtered waveform corresponding to a transmit chain number $i_{TX}$,
$T_c$ denotes a Single Carrier (SC) chip time duration,
$\Delta F$ denotes a sub-channel spacing equal to 2.16 GHz, and
$\Delta t_1$, $\Delta t_2$, $\Delta t_3$, and $\Delta t_4$ are in the range $[0, T_c]$.

Example 48 includes the subject matter of any one of Examples 32-40, and optionally, wherein the PPDU comprises an EDMG PPDU decodable by EDMG stations.

Example 49 includes the subject matter of Example 48, and optionally, wherein the controller is configured to cause the EDMG STA to determine an EDMG waveform corresponding to the transmit chain, and to determine the PPDU waveform corresponding to the transmit chain based on the EDMG waveform corresponding to the transmit chain, the EDMG waveform corresponding to the transmit chain determined based on the matrix element of the spatial mapping matrix as follows:

$$r_{EDMG\text{-}Pream\text{-}Data}^{i_{TX}(1)}(nT_c) = [Q]_{i_{TX},1} \cdot r_{EDMG\text{-}Pream\text{-}Data}(nT_c), 1 \le i_{TX} \le N_{TX}$$

wherein $N_{Tx}$ denotes a total count of the one or more transmit chains, $r_{EDMG\text{-}Pream\text{-}Data}^{i_{TX}(1)}(nT_c)$ denotes the EDMG waveform corresponding to the transmit chain number $i_{TX}$, $r_{EDMG\text{-}Pream\text{-}Data}(nT_c)$ denotes the preamble and date field of the EDMG PPDU, Q denotes the spatial mapping matrix, and $[\ ]_{m,n}$ denotes a matrix element from an m-th row and an n-th column.

Example 50 includes the subject matter of Example 48 or 49, and optionally, wherein the controller is configured to cause the EDMG STA to determine the PPDU waveform corresponding to the transmit chain based on an up-sampled and filtered waveform corresponding to the transmit chain, which is defined as follows:

$$r_{EDMG\text{-}Pream\text{-}Data}^{i_{TX}(2)}\left(n\frac{T_c}{N_{up}}\right) =$$

$$\begin{cases} r_{EDMG\text{-}Pream\text{-}Data}^{i_{TX}(1)}\left(n\frac{T_c}{N_{up}}\right), & n = 0, N_{up}, 2*N_{up} \ldots \\ 0 & \text{otherwise} \end{cases}$$

$$r_{EDMG\text{-}Pream\text{-}Data}^{i_{TX}(3)}\left(n\frac{T_c}{N_{up}}\right) = \sum_{k=0}^{K-1} r_{EDMG\text{-}Pream\text{-}Data}^{i_{TX}(2)}\left((n-k)\frac{T_c}{N_{up}}\right) h_{SCCB}(k),$$

$$n = 0, 1, \ldots$$

$$r_{EDMG\text{-}Pream\text{-}Data}^{i_{TX}(4)}\left(n\frac{T_c}{N_{up}}\right) = r_{EDMG\text{-}Pream\text{-}Data}^{i_{TX}(3)}\left(\left(n + \frac{K-1}{2}\right)\frac{T_c}{N_{up}}\right),$$

$$n = 0, 1, \ldots$$

wherein:

$$r_{EDMG\text{-}Pream\text{-}Data}^{i_{TX}(4)}\left(n\frac{T_c}{N_{up}}\right)$$

denotes an up-sampled and filtered waveform corresponding to a transmit chain number $i_{TX}$, $$r_{EDMG\text{-}Pream\text{-}Data}^{i_{TX}(1)}\left(n\frac{T_c}{N_{up}}\right)$$

denotes an EDMG preamble-date waveform corresponding to a transmit chain number $i_{TX}$,
$h_{SCCB}$ denotes a response of a pulse shaping filter,
$T_c$ denotes a Single Carrier (SC) chip time duration,
$N_{up}$ denotes a factor value,
K denotes a length of the pulse shaping filter in samples, and $$r_{EDMG\text{-}Pream\text{-}Data}^{i_{TX}(2)}\left(n\frac{T_c}{N_{up}}\right) = 0,$$

for $n < 0$ and $n \ge \text{length}(r_{EDMG\text{-}Pream\text{-}Data}^{i_{TX}(1)}) \times N_{up}$.

Example 51 includes the subject matter of any one of Examples 48-50, and optionally, wherein the controller is configured to, when the EDMG PPDU is to be transmitted over a channel bandwidth of 2.16 GHz, determine the PPDU waveform corresponding to the transmit chain to comprise the following waveform:

$$r^{i_{TX}}_{EDMG\text{-}Pream\text{-}Data}\left(n\frac{T_c}{N_{up}}\right) = r^{i_{TX}(4)}_{EDMG\text{-}Pream\text{-}Data}\left(n\frac{T_c}{N_{up}}\right), 1 \leq i_{TX} \leq N_{TX}$$

wherein:

$$r^{i_{TX}(4)}_{EDMG\text{-}Pream\text{-}Data}\left(n\frac{T_c}{N_{up}}\right)$$

denotes an up-sampled and filtered waveform corresponding to a transmit chain number $i_{TX}$, and $T_c$ denotes a Single Carrier (SC) chip time duration, Example 52 includes the subject matter of any one of Examples 48-50, and optionally, wherein the controller is configured to, when the EDMG PPDU is to be transmitted over a 4.32 GHz bandwidth, determine the PPDU waveform corresponding to the transmit chain to comprise the following waveform:

$$r^{i_{TX}}_{EDMG\text{-}Pream\text{-}Data}\left(n\frac{T_c}{N_{up}}\right) = =$$
$$r^{i_{TX}(4)}_{EDMG\text{-}Pream\text{-}Data}\left(n\frac{T_c}{N_{up}}+\Delta t_1\right)\cdot\frac{1}{\sqrt{2}}\exp\left(-j2\pi\left(\frac{\Delta F}{2}\right)\left(\frac{T_c}{N_{up}}\right)n\right) + +$$
$$r^{i_{TX}(4)}_{EDMG\text{-}Pream\text{-}Data}\left(n\frac{T_c}{N_{up}}+\Delta t_2\right)\cdot\frac{1}{\sqrt{2}}\exp\left(+j2\pi\left(\frac{\Delta F}{2}\right)\left(\frac{T_c}{N_{up}}\right)n\right),$$
$$1 \leq i_{TX} \leq N_{TX}$$

wherein:

$$r^{i_{TX}(4)}_{EDMG\text{-}Pream\text{-}Data}\left(n\frac{T_c}{N_{up}}\right)$$

denotes an up-sampled and filtered waveform corresponding to a transmit chain number $i_{TX}$, $T_c$ denotes a Single Carrier (SC) chip time duration, $\Delta F$ denotes a sub-channel spacing equal to 2.16 GHz, and $\Delta t_1$ and $\Delta t_2$ are in the range $[0, T_c]$.

Example 53 includes the subject matter of any one of Examples 48-50, and optionally, wherein the controller is configured to, when the EDMG PPDU is to be transmitted over a 6.48 GHz bandwidth, determine the PPDU waveform corresponding to the transmit chain to comprise the following waveform:

$$r^{i_{TX}}_{EDMG\text{-}Pream\text{-}Data}\left(n\frac{T_c}{N_{up}}\right) == r^{i_{TX}(4)}_{EDMG\text{-}Pream\text{-}Data}\left(n\frac{T_c}{N_{up}}+\Delta t_1\right)\cdot$$
$$\frac{1}{\sqrt{3}}\exp\left(-j2\pi\Delta F\left(\frac{T_c}{N_{up}}\right)n\right) + + r^{i_{TX}(4)}_{EDMG\text{-}Pream\text{-}Data}\left(n\frac{T_c}{N_{up}}+\Delta t_2\right)\cdot\frac{1}{\sqrt{3}} + +$$
$$r^{i_{TX}(4)}_{EDMG\text{-}Pream\text{-}Data}\left(n\frac{T_c}{N_{up}}+\Delta t_3\right)\cdot\frac{1}{\sqrt{3}}\exp\left(+j2\pi\Delta F\left(\frac{T_c}{N_{up}}\right)n\right),$$
$$1 \leq i_{TX} \leq N_{TX}$$

wherein:

$$r^{i_{TX}(4)}_{EDMG\text{-}Pream\text{-}Data}\left(n\frac{T_c}{N_{up}}\right)$$

denotes an up-sampled and filtered waveform corresponding to a transmit chain number $i_{TX}$, $T_c$ denotes a Single Carrier (SC) chip time duration, $\Delta F$ denotes a sub-channel spacing equal to 2.16 GHz, and $\Delta t_1$, $\Delta t_2$, and $\Delta t_3$ are in the range $[0, T_c]$.

Example 54 includes the subject matter of any one of Examples 48-50, and optionally, wherein the controller is configured to, when the EDMG PPDU is to be transmitted over a 8.64 GHz bandwidth, determine the PPDU waveform corresponding to the transmit chain to comprise the following waveform:

$$r^{i_{TX}}_{EDMG\text{-}Pream\text{-}Data}\left(n\frac{T_c}{N_{up}}\right) = =$$
$$r^{i_{TX}(4)}_{EDMG\text{-}Pream\text{-}Data}\left(n\frac{T_c}{N_{up}}+\Delta t_1\right)\cdot\frac{1}{\sqrt{4}}\exp\left(-j2\pi\left(\frac{3\Delta F}{2}\right)\left(\frac{T_c}{N_{up}}\right)n\right) + +$$
$$r^{i_{TX}(4)}_{EDMG\text{-}Pream\text{-}Data}\left(n\frac{T_c}{N_{up}}+\Delta t_2\right)\cdot\frac{1}{\sqrt{4}}\exp\left(-j2\pi\left(\frac{\Delta F}{2}\right)\left(\frac{T_c}{N_{up}}\right)n\right) + +$$
$$r^{i_{TX}(4)}_{EDMG\text{-}Pream\text{-}Data}\left(n\frac{T_c}{N_{up}}+\Delta t_3\right)\cdot\frac{1}{\sqrt{4}}\exp\left(+j2\pi\left(\frac{\Delta F}{2}\right)\left(\frac{T_c}{N_{up}}\right)n\right) + +$$
$$r^{i_{TX}(4)}_{EDMG\text{-}Pream\text{-}Data}\left(n\frac{T_c}{N_{up}}+\Delta t_4\right)\cdot\frac{1}{\sqrt{4}}\exp\left(+j2\pi\left(\frac{3\Delta F}{2}\right)\left(\frac{T_c}{N_{up}}\right)n\right),$$
$$1 \leq i_{TX} \leq N_{TX}$$

wherein:

$$r^{i_{TX}(4)}_{EDMG\text{-}Pream\text{-}Data}\left(n\frac{T_c}{N_{up}}\right)$$

denotes an up-sampled and filtered waveform corresponding to a transmit chain number $i_{TX}$, $T_c$ denotes a Single Carrier (SC) chip time duration, $\Delta F$ denotes a sub-channel spacing equal to 2.16 GHz, and $\Delta t_1$, $\Delta t_2$, $\Delta t_3$, and $\Delta t_4$ are in the range $[0, T_c]$.

Example 55 includes the subject matter of any one of Examples 32-54, and optionally, wherein the controller is configured to cause the EDMG STA to generate the PPDU comprising a training (TRN) field, and to generate the PPDU waveform corresponding to the transmit chain based on a waveform for the TRN field.

Example 56 includes the subject matter of Example 55, and optionally, wherein the controller is configured to cause the EDMG STA to generate the waveform for the TRN field by filtering and resampling a TRN field corresponding to the number of the transmit chain.

Example 57 includes the subject matter of Example 55 or 56, and optionally, wherein the controller is configured to cause the EDMG STA to determine the waveform for the TRN field based on the following resampling procedure:

$$r^{i_{TX}(2)}_{TRN}\left(n\frac{T_c}{3N_{CB}}\right) = \begin{cases} r^{i_{TX}(1)}_{TRN}\left(n\frac{T_c}{3N_{CB}}\right), & n = 0, 3, 6 \ldots \\ 0 & \text{otherwise} \end{cases}$$

$$r^{i_{TX}(3)}_{TRN}\left(n\frac{T_c}{3N_{CB}}\right) = \sum_{k=0}^{K-1} r^{i_{TX}(2)}_{TRN}\left((n-k)\frac{T_c}{3N_{CB}}\right)h_{SCCB}(k),$$

-continued $n = 0, 1, \ldots$ $$r_{TRN}^{i_{TX}(4)}\left(n\frac{2T_c}{3N_{CB}}\right) = r_{TRN}^{i_{TX}(3)}\left(\left(2n + \frac{K-1}{2}\right)\frac{T_c}{3N_{CB}}\right), n = 0, 1, \ldots$$

wherein:

$$r_{TRN}^{i_{TX}(1)}\left(n\frac{T_c}{N_{CB}}\right)$$

denotes a TRN field corresponding to a transmit chain number $i_{TX}$,
$T_c$ denotes a Single Carrier (SC) chip time duration,
$N_{up}$ denotes a factor value,
$N_{CB}$ denotes a channel bonding factor,
$h_{SCCB}$ denotes a response of a pulse shaping filter,
K denotes a length of the pulse shaping filter in samples, and $$r_{TRN}^{i_{TX}(2)}\left(n\frac{T_c}{3N_{CB}}\right) = 0, \text{ for } n < 0 \text{ and } n \geq \text{length}\left(r_{TRN}^{i_{TX}(1)}\right) \times 3.$$

Example 58 includes the subject matter of any one of Examples 32-57, and optionally, wherein the controller is configured to cause the EDMG STA to transmit the PPDU in a Single Carrier (SC) transmission.

Example 59 includes the subject matter of any one of Examples 32-58, and optionally, wherein the PPDU comprises a control mode PPDU.

Example 60 includes the subject matter of any one of Examples 32-59, and optionally, wherein the controller is configured to cause the EDMG STA to transmit the PPDU over a channel bandwidth of 2.16 GHz, 4.32 GHz, 6.48 GHz, or 8.64 GHz.

Example 61 includes a method to be performed at an Enhanced Directional Multi-Gigabit (DMG) (EDMG) station (STA), the method comprising generating a Physical Layer (PHY) Protocol Data Unit (PPDU) comprising at least a preamble and a data field; generating one or more PPDU waveforms corresponding to one or more respective transmit chains for digital beamforming transmission of the PPDU by determining a PPDU waveform corresponding to a transmit chain of the one or more transmit chains based on a matrix element of a spatial mapping matrix, an index of the matrix element is based on a transmit chain number of the transmit chain; and transmitting the PPDU via the one or more transmit chains over a channel bandwidth of at least 2.16 Gigahertz (GHz) in a frequency band above 45 GHz, transmission of the PPDU via the transmit chain is based on the PPDU waveform corresponding to the transmit chain.

Example 62 includes the subject matter of Example 61, and optionally, wherein the index of the matrix element comprises a row index of the spatial mapping matrix, the row index is equal to the transmit chain number of the transmit chain.

Example 63 includes the subject matter of Example 61 or 62, and optionally, wherein the matrix element is in a row of the spatial mapping matrix having a row index equal to 1.

Example 64 includes the subject matter of any one of Examples 61-63, and optionally, comprising transmitting the PPDU according to a hybrid beamforming scheme.

Example 65 includes the subject matter of Example 64, and optionally, wherein the hybrid beamforming scheme comprises digital beamforming according to the spatial mapping matrix, and analog beamforming according to an Antenna Weight Vector (AWV).

Example 66 includes the subject matter of any one of Examples 61-65, and optionally, comprising generating one or more preamble-data waveforms corresponding to the one or more transmit chains, a preamble-data waveform corresponding to the transmit chain is based on the matrix element of the spatial mapping matrix; and generating the one or more PPDU waveforms corresponding to the one or more transmit chains by up-sampling and filtering the one or more preamble-data waveforms, the PPDU waveform corresponding to the transmit chain is based on up-sampling and filtering the preamble-data waveform corresponding to the transmit chain.

Example 67 includes the subject matter of any one of Examples 61-66, and optionally, comprising transmitting the PPDU over a channel bandwidth of 2.16 GHz.

Example 68 includes the subject matter of any one of Examples 61-66, and optionally, comprising transmitting the PPDU over a channel bandwidth comprising a plurality of 2.16 GHz channel bandwidths.

Example 69 includes the subject matter of Example 68, and optionally, comprising determining the PPDU waveform corresponding to the transmit chain to comprise an up-sampled and filtered waveform corresponding to the transmit chain duplicated, with time delay, over the plurality of 2.16 GHz channel bandwidths.

Example 70 includes the subject matter of any one of Examples 61-69, and optionally, wherein the PPDU comprises a non-EDMG PPDU decodable by one or more non-EDMG stations, which are DMG stations.

Example 71 includes the subject matter of Example 70, and optionally, comprising determining a non-EDMG waveform corresponding to the transmit chain, and determining the PPDU waveform corresponding to the transmit chain based on the non-EDMG waveform corresponding to the transmit chain, the non-EDMG waveform corresponding to the transmit chain determined based on the matrix element of the spatial mapping matrix as follows:

$$r_{non\text{-}EDMG}^{iTX(1)}(nT_c) = [Q]_{i_{TX},1} \cdot r_{non\text{-}EDMG}(nT_c),$$
$$1 \leq i_{TX} \leq N_{TX}$$

wherein $N_{Tx}$ denotes a total count of the one or more transmit chains, $r_{non\text{-}EDMG}^{iTX(1)}(nT_c)$ denotes the non-EDMG waveform corresponding to the transmit chain number $i_{TX}$, $r_{non\text{-}EDMG}(nT_c)$ denotes fields of the non-EDMG PPDU, Q denotes the spatial mapping matrix, and $[\ ]_{m,n}$ denotes a matrix element from an m-th row and an n-th column.

Example 72 includes the subject matter of Example 71, and optionally, comprising determining the PPDU waveform corresponding to the transmit chain based on an up-sampled and filtered waveform corresponding to the transmit chain, which is defined as follows:

$$r_{non\text{-}EDMG}^{iTX(2)}\left(n\frac{T_c}{N_{up}}\right) = \begin{cases} r_{non\text{-}EDMG}^{iTX(1)}\left(n\frac{T_c}{N_{up}}\right), & n = 0, N_{up}, 2*N_{up} \ldots \\ 0 & \text{otherwise} \end{cases}$$

$$r_{non\text{-}EDMG}^{iTX(3)}\left(n\frac{T_c}{N_{up}}\right) = \sum_{k=0}^{K-1} r_{non\text{-}EDMG}^{iTX(2)}\left((n-k)\frac{T_c}{N_{up}}\right) h_{SCCB}(k),$$

$n = 0, 1, \ldots$

-continued $$r_{non\text{-}EDMG}^{i_{TX}(4)}\left(n\frac{T_c}{N_{up}}\right) = r_{non\text{-}EDMG}^{i_{TX}(3)}\left(\left(n + \frac{K-1}{2}\right)\frac{T_c}{N_{up}}\right),$$

$$n = 0, 1, \ldots$$

wherein:

$$r_{non\text{-}EDMG}^{i_{TX}(4)}\left(n\frac{T_c}{N_{up}}\right)$$

denotes an up-sampled and filtered waveform corresponding to a transmit chain number $i_{TX}$,
$h_{SCCB}$ denotes a response of a pulse shaping filter,
$T_c$ denotes a Single Carrier (SC) chip time duration,
$N_{up}$ denotes a factor value,
K denotes a length of the pulse shaping filter in samples, and $$r_{non\text{-}EDMG,}^{i_{TX}(2)}\left(n\frac{T_c}{N_{up}}\right) = 0, \text{ for } n < 0 \text{ and } n \geq \text{length}\left(r_{non\text{-}EDMG}^{i_{TX}(1)}\right) \times N_{up}.$$

Example 73 includes the subject matter of any one of Examples 70-72, and optionally, comprising, when the non-EDMG PPDU is to be transmitted over a channel bandwidth of 2.16 GHz, determining the PPDU waveform corresponding to the transmit chain to comprise the following waveform:

$$r_{PPDU}^{i_{TX}}(nT_c) = r_{non\text{-}EDMG}^{i_{TX}(4)}(nT_c), 1 \leq i_{TX} \leq N_{TX}$$

wherein:
$r_{non\text{-}EDMG}^{i_{TX}(4)}$ denotes an up-sampled and filtered waveform corresponding to a transmit chain number $i_{TX}$, and
$T_c$ denotes a Single Carrier (SC) chip time duration, Example 74 includes the subject matter of any one of Examples 70-72, and optionally, comprising, when the non-EDMG PPDU is to be transmitted over a 4.32 GHz bandwidth, determining the PPDU waveform corresponding to the transmit chain to comprise the following waveform:

$$r_{PPDU}^{i_{TX}}\left(n\frac{T_c}{N_{up}}\right) = r_{non\text{-}EDMG}^{i_{TX}(4)}\left(n\frac{T_c}{N_{up}} + \Delta t_1\right) \cdot \frac{1}{\sqrt{2}} \exp\left(-j2\pi\left(\frac{\Delta F}{2}\right)\left(\frac{T_c}{N_{up}}\right)n\right) + +$$

$$r_{non\text{-}EDMG}^{i_{TX}(4)}\left(n\frac{T_c}{N_{up}} + \Delta t_2\right) \cdot \frac{1}{\sqrt{2}} \exp\left(+j2\pi\left(\frac{\Delta F}{2}\right)\left(\frac{T_c}{N_{up}}\right)n\right),$$

$$1 \leq i_{TX} \leq N_{TX}$$

wherein:

$$r_{non\text{-}EDMG}^{i_{TX}(4)}\left(n\frac{T_c}{N_{up}}\right)$$

denotes an up-sampled and filtered waveform corresponding to a transmit chain number $i_{TX}$,
$T_c$ denotes a Single Carrier (SC) chip time duration,
$\Delta F$ denotes a sub-channel spacing equal to 2.16 GHz, and
$\Delta t_1$ and $\Delta t_2$ are in the range [0, $T_c$].

Example 75 includes the subject matter of any one of Examples 70-72, and optionally, comprising, when the non-EDMG PPDU is to be transmitted over a 6.48 GHz bandwidth, determining the PPDU waveform corresponding to the transmit chain to comprise the following waveform:

$$r_{PPDU}^{i_{TX}}\left(n\frac{T_c}{N_{up}}\right) = r_{non\text{-}EDMG}^{i_{TX}(4)}\left(n\frac{T_c}{N_{up}} + \Delta t_1\right) \cdot \frac{1}{\sqrt{3}} \exp\left(-j2\pi\Delta F\left(\frac{T_c}{N_{up}}\right)n\right) + +$$

$$r_{non\text{-}EDMG}^{i_{TX}(4)}\left(n\frac{T_c}{N_{up}} + \Delta t_2\right) \cdot \frac{1}{\sqrt{3}} + +$$

$$r_{non\text{-}EDMG}^{i_{TX}(4)}\left(n\frac{T_c}{N_{up}} + \Delta t_3\right) \cdot \frac{1}{\sqrt{3}} \exp\left(+j2\pi\Delta F\left(\frac{T_c}{N_{up}}\right)n\right),$$

$$1 \leq i_{TX} \leq N_{TX}$$

wherein:

$$r_{non\text{-}EDMG}^{i_{TX}(4)}\left(n\frac{T_c}{N_{up}}\right)$$

denotes an up-sampled and filtered waveform corresponding to a transmit chain number $i_{TX}$,
$T_c$ denotes a Single Carrier (SC) chip time duration,
$\Delta F$ denotes a sub-channel spacing equal to 2.16 GHz, and
$\Delta t_1$, $\Delta t_2$, and $\Delta t_3$ are in the range [0, $T_c$].

Example 76 includes the subject matter of any one of Examples 70-72, and optionally, comprising, when the non-EDMG PPDU is to be transmitted over a 8.64 GHz bandwidth, determining the PPDU waveform corresponding to the transmit chain to comprise the following waveform:

$$r_{PPDU}^{i_{TX}}\left(n\frac{T_c}{N_{up}}\right) = r_{non\text{-}EDMG}^{i_{TX}(4)}\left(n\frac{T_c}{N_{up}} + \Delta t_1\right) \cdot \frac{1}{\sqrt{4}} \exp\left(-j2\pi\left(\frac{3\Delta F}{2}\right)\left(\frac{T_c}{N_{up}}\right)n\right) + +$$

$$r_{non\text{-}EDMG}^{i_{TX}(4)}\left(n\frac{T_c}{N_{up}} + \Delta t_2\right) \cdot \frac{1}{\sqrt{4}} \exp\left(-j2\pi\left(\frac{\Delta F}{2}\right)\left(\frac{T_c}{N_{up}}\right)n\right) + +$$

$$r_{non\text{-}EDMG}^{i_{TX}(4)}\left(n\frac{T_c}{N_{up}} + \Delta t_3\right) \cdot \frac{1}{\sqrt{4}} \exp\left(+j2\pi\left(\frac{\Delta F}{2}\right)\left(\frac{T_c}{N_{up}}\right)n\right) + +$$

$$r_{non\text{-}EDMG}^{i_{TX}(4)}\left(n\frac{T_c}{N_{up}} + \Delta t_4\right) \cdot \frac{1}{\sqrt{4}} \exp\left(+j2\pi\left(\frac{3\Delta F}{2}\right)\left(\frac{T_c}{N_{up}}\right)n\right), 1 \leq i_{TX} \leq N_{TX}$$

wherein:

$$r_{non\text{-}EDMG}^{i_{TX}(4)}\left(n\frac{T_c}{N_{up}}\right)$$

denotes an up-sampled and filtered waveform corresponding to a transmit chain number $i_{TX}$,
$T_c$ denotes a Single Carrier (SC) chip time duration,
$\Delta F$ denotes a sub-channel spacing equal to 2.16 GHz, and
$\Delta t_1$, $\Delta t_2$, $\Delta t_3$, and $\Delta t_4$ are in the range [0, $T_c$].

Example 77 includes the subject matter of any one of Examples 61-69, and optionally, wherein the PPDU comprises an EDMG PPDU decodable by EDMG stations.

Example 78 includes the subject matter of Example 77, and optionally, comprising determining an EDMG waveform corresponding to the transmit chain, and determining the PPDU waveform corresponding to the transmit chain based on the EDMG waveform corresponding to the transmit chain, the EDMG waveform corresponding to the transmit chain determined based on the matrix element of the spatial mapping matrix as follows:

$$r_{EDMG\text{-}Pream\text{-}Data}^{i_{TX}(1)}(nT_c) = [Q]_{i_{TX},1} \cdot r_{EDMG\text{-}Pream\text{-}Data}(nT_c), 1 \le i_{TX} \le N_{TX}$$

wherein $N_{Tx}$ denotes a total count of the one or more transmit chains, $r_{EDMG\text{-}Pream\text{-}Data}^{i_{TX}(1)}(nT_c)$ denotes the EDMG waveform corresponding to the transmit chain number $i_{TX}$, $r_{EDMG\text{-}Pream\text{-}Data}(nT_c)$ denotes the preamble and date field of the EDMG PPDU, Q denotes the spatial mapping matrix, and $[\ ]_{m,n}$ denotes a matrix element from an m-th row and an n-th column.

Example 79 includes the subject matter of Example 77 or 78, and optionally, comprising determining the PPDU waveform corresponding to the transmit chain based on an up-sampled and filtered waveform corresponding to the transmit chain, which is defined as follows:

$$r_{EDMG\text{-}Pream\text{-}Data}^{i_{TX}(2)}\left(n\frac{T_c}{N_{up}}\right) = \begin{cases} r_{EDMG\text{-}Pream\text{-}Data}^{i_{TX}(1)}\left(n\frac{T_c}{N_{up}}\right), & n = 0, N_{up}, 2*N_{up} \ldots \\ 0 & \text{otherwise} \end{cases}$$

$$r_{EDMG\text{-}Pream\text{-}Data}^{i_{TX}(3)}\left(n\frac{T_c}{N_{up}}\right) = \sum_{k=0}^{K-1} r_{EDMG\text{-}Pream\text{-}Data}^{i_{TX}(2)}\left((n-k)\frac{T_c}{N_{up}}\right) h_{SCCB}(k),$$

$$n = 0, 1, \ldots$$

$$r_{EDMG\text{-}Pream\text{-}Data}^{i_{TX}(4)}\left(n\frac{T_c}{N_{up}}\right) = r_{EDMG\text{-}Pream\text{-}Data}^{i_{TX}(3)}\left(\left(n + \frac{K-1}{2}\right)\frac{T_c}{N_{up}}\right),$$

$$n = 0, 1, \ldots$$

wherein:

$$r_{EDMG\text{-}Pream\text{-}Data}^{i_{TX}(4)}\left(n\frac{T_c}{N_{up}}\right)$$

denotes an up-sampled and filtered waveform corresponding to a transmit chain number $i_{TX}$, $$r_{EDMG\text{-}Pream\text{-}Data}^{i_{TX}(1)}\left(n\frac{T_c}{N_{up}}\right)$$

denotes an EDMG preamble-date waveform corresponding to a transmit chain number $i_{TX}$,
$h_{SCCB}$ denotes a response of a pulse shaping filter,
$T_c$ denotes a Single Carrier (SC) chip time duration,
$N_{up}$ denotes a factor value,
K denotes a length of the pulse shaping filter in samples, and $$r_{EDMG\text{-}Pream\text{-}Data}^{i_{TX}(2)}\left(n\frac{T_c}{N_{up}}\right) = 0,$$

for $n < 0$ and $n \ge \text{length}(r_{EDMG\text{-}Pream\text{-}Data}^{i_{TX}(1)}) \times N_{up}$.

Example 80 includes the subject matter of any one of Examples 77-79, and optionally, comprising, when the EDMG PPDU is to be transmitted over a channel bandwidth of 2.16 GHz, determining the PPDU waveform corresponding to the transmit chain to comprise the following waveform:

$$r_{EDMG\text{-}Pream\text{-}Data}^{i_{TX}}\left(n\frac{T_c}{N_{up}}\right) = r_{EDMG\text{-}Pream\text{-}Data}^{i_{TX}(4)}\left(n\frac{T_c}{N}\right), 1 \le i_{TX} \le N_{TX}$$

wherein:

$$r_{EDMG\text{-}Pream\text{-}Data}^{i_{TX}(4)}\left(n\frac{T_c}{N_{up}}\right)$$

denotes an up-sampled and filtered waveform corresponding to a transmit chain number $i_{TX}$, and
$T_c$ denotes a Single Carrier (SC) chip time duration, Example 81 includes the subject matter of any one of Examples 77-79, and optionally, comprising, when the EDMG PPDU is to be transmitted over a 4.32 GHz bandwidth, determining the PPDU waveform corresponding to the transmit chain to comprise the following waveform:

$$r_{EDMG\text{-}Pream\text{-}Data}^{i_{TX}}\left(n\frac{T_c}{N_{up}}\right) ==$$

$$r_{EDMG\text{-}Pream\text{-}Data}^{i_{TX}(4)}\left(n\frac{T_c}{N_{up}} + \Delta t_1\right) \cdot \frac{1}{\sqrt{2}} \exp\left(-j2\pi\left(\frac{\Delta F}{2}\right)\left(\frac{T_c}{N_{up}}\right)n\right) ++$$

$$r_{EDMG\text{-}Pream\text{-}Data}^{i_{TX}(4)}\left(n\frac{T_c}{N_{up}} + \Delta t_2\right) \cdot \frac{1}{\sqrt{2}} \exp\left(+j2\pi\left(\frac{\Delta F}{2}\right)\left(\frac{T_c}{N_{up}}\right)n\right),$$

$$1 \le i_{TX} \le N_{TX}$$

wherein:

$$r_{EDMG\text{-}Pream\text{-}Data}^{i_{TX}(4)}\left(n\frac{T_c}{N_{up}}\right)$$

denotes an up-sampled and filtered waveform corresponding to a transmit chain number $i_{TX}$,
$T_c$ denotes a Single Carrier (SC) chip time duration,
$\Delta F$ denotes a sub-channel spacing equal to 2.16 GHz, and
$\Delta t_1$ and $\Delta t_e$ are in the range $[0, T_c]$.

Example 82 includes the subject matter of any one of Examples 77-79, and optionally, comprising, when the EDMG PPDU is to be transmitted over a 6.48 GHz bandwidth, determining the PPDU waveform corresponding to the transmit chain to comprise the following waveform:

$$r_{EDMG\text{-}Pream\text{-}Data}^{i_{TX}}\left(n\frac{T_c}{N_{up}}\right) == r_{EDMG\text{-}Pream\text{-}Data}^{i_{TX}(4)}\left(n\frac{T_c}{N_{up}} + \Delta t_1\right) \cdot \frac{1}{\sqrt{3}}$$

$$\exp\left(-j2\pi\Delta F\left(\frac{T_c}{N_{up}}\right)n\right) ++ r_{EDMG\text{-}Pream\text{-}Data}^{i_{TX}(4)}\left(n\frac{T_c}{N_{up}} + \Delta t_2\right) \cdot \frac{1}{\sqrt{3}} ++$$

$$r_{EDMG\text{-}Pream\text{-}Data}^{i_{TX}(4)}\left(n\frac{T_c}{N_{up}} + \Delta t_3\right) \cdot \frac{1}{\sqrt{3}} \exp\left(+j2\pi\Delta F\left(\frac{T_c}{N_{up}}\right)n\right),$$

$$1 \le i_{TX} \le N_{TX}$$

wherein:

$$r^{i_{TX}(4)}_{EDMG\text{-}Pream\text{-}Data}\left(n\frac{T_c}{N_{up}}\right)$$

denotes an up-sampled and filtered waveform corresponding to a transmit chain number $i_{TX}$,
$T_c$ denotes a Single Carrier (SC) chip time duration,
$\Delta F$ denotes a sub-channel spacing equal to 2.16 GHz, and
$\Delta t_1$, $\Delta t_2$, and $\Delta t_3$ are in the range $[0, T_c]$.

Example 83 includes the subject matter of any one of Examples 77-79, and optionally, comprising, when the EDMG PPDU is to be transmitted over a 8.64 GHz bandwidth, determining the PPDU waveform corresponding to the transmit chain to comprise the following waveform:

$$r^{i_{TX}}_{EDMG\text{-}Pream\text{-}Data}\left(n\frac{T_c}{N_{up}}\right) ==$$

$$r^{i_{TX}(4)}_{EDMG\text{-}Pream\text{-}Data}\left(n\frac{T_c}{N_{up}}+\Delta t_1\right)\cdot\frac{1}{\sqrt{4}}\exp\left(-j2\pi\left(\frac{3\Delta F}{2}\right)\left(\frac{T_c}{N_{up}}\right)n\right)++$$

$$r^{i_{TX}(4)}_{EDMG\text{-}Pream\text{-}Data}\left(n\frac{T_c}{N_{up}}+\Delta t_2\right)\cdot\frac{1}{\sqrt{4}}\exp\left(-j2\pi\left(\frac{\Delta F}{2}\right)\left(\frac{T_c}{N_{up}}\right)n\right)++$$

$$r^{i_{TX}(4)}_{EDMG\text{-}Pream\text{-}Data}\left(n\frac{T_c}{N_{up}}+\Delta t_3\right)\cdot\frac{1}{\sqrt{4}}\exp\left(+j2\pi\left(\frac{\Delta F}{2}\right)\left(\frac{T_c}{N_{up}}\right)n\right)++$$

$$r^{i_{TX}(4)}_{EDMG\text{-}Pream\text{-}Data}\left(n\frac{T_c}{N_{up}}+\Delta t_4\right)\cdot\frac{1}{\sqrt{4}}\exp\left(+j2\pi\left(\frac{3\Delta F}{2}\right)\left(\frac{T_c}{N_{up}}\right)n\right),$$

$$1 \leq i_{TX} \leq N_{TX}$$

wherein:

$$r^{i_{TX}(4)}_{EDMG\text{-}Pream\text{-}Data}\left(n\frac{T_c}{N_{up}}\right)$$

denotes an up-sampled and filtered waveform corresponding to a transmit chain number $i_{TX}$,
$T_c$ denotes a Single Carrier (SC) chip time duration,
$\Delta F$ denotes a sub-channel spacing equal to 2.16 GHz, and
$\Delta t_1$, $\Delta t_2$, $\Delta t_3$, and $\Delta t_4$ are in the range $[0, T_c]$.

Example 84 includes the subject matter of any one of Examples 61-83, and optionally, comprising generating the PPDU comprising a training (TRN) field, and generating the PPDU waveform corresponding to the transmit chain based on a waveform for the TRN field.

Example 85 includes the subject matter of Example 84, and optionally, comprising generating the waveform for the TRN field by filtering and resampling a TRN field corresponding to the number of the transmit chain.

Example 86 includes the subject matter of Example 84 or 85, and optionally, comprising determining the waveform for the TRN field based on the following resampling procedure:

$$r^{i_{TX}(2)}_{TRN}\left(n\frac{T_c}{3N_{CB}}\right) = \begin{cases} r^{i_{TX}(1)}_{TRN}\left(n\frac{T_c}{3N_{CB}}\right), & n = 0, 3, 6 \ldots \\ 0 & \text{otherwise} \end{cases}$$

$$r^{i_{TX}(3)}_{TRN}\left(n\frac{T_c}{3N_{CB}}\right) = \sum_{k=0}^{K-1} r^{i_{TX}(2)}_{TRN}\left((n-k)\frac{T_c}{3N_{CB}}\right) h_{SCCB}(k),$$

$$n = 0, 1, \ldots$$

-continued $$r^{i_{TX}(4)}_{TRN}\left(n\frac{2T_c}{3N_{CB}}\right) = r^{i_{TX}(3)}_{TRN}\left(\left(2n+\frac{K-1}{2}\right)\frac{T_c}{3N_{CB}}\right),$$

$$n = 0, 1, \ldots$$

wherein:

$$r^{i_{TX}(1)}_{TRN}\left(n\frac{T_c}{N_{CB}}\right)$$

denotes a TRN field corresponding to a transmit chain number $i_{TX}$,
$T_c$ denotes a Single Carrier (SC) chip time duration,
$N_{up}$ denotes a factor value,
$N_{CB}$ denotes a channel bonding factor,
$h_{SCCB}$ denotes a response of a pulse shaping filter,
K denotes a length of the pulse shaping filter in samples, and $$r^{i_{TX}(2)}_{TRN}\left(n\frac{T_c}{3N_{CB}}\right) = 0, \text{ for } n < 0 \text{ and } n \geq \text{length}\left(r^{i_{TX}(1)}_{TRN}\right) \times 3.$$

Example 87 includes the subject matter of any one of Examples 61-86, and optionally, comprising transmitting the PPDU in a Single Carrier (SC) transmission.

Example 88 includes the subject matter of any one of Examples 61-87, and optionally, wherein the PPDU comprises a control mode PPDU.

Example 89 includes the subject matter of any one of Examples 61-88, and optionally, comprising transmitting the PPDU over a channel bandwidth of 2.16 GHz, 4.32 GHz, 6.48 GHz, or 8.64 GHz.

Example 90 includes a product comprising one or more tangible computer-readable non-transitory storage media comprising computer-executable instructions operable to, when executed by at least one processor, enable the at least one processor to cause an Enhanced Directional Multi-Gigabit (DMG) (EDMG) station (STA) to generate a Physical Layer (PHY) Protocol Data Unit (PPDU) comprising at least a preamble and a data field; generate one or more PPDU waveforms corresponding to one or more respective transmit chains for digital beamforming transmission of the PPDU by determining a PPDU waveform corresponding to a transmit chain of the one or more transmit chains based on a matrix element of a spatial mapping matrix, an index of the matrix element is based on a transmit chain number of the transmit chain; and transmit the PPDU via the one or more transmit chains over a channel bandwidth of at least 2.16 Gigahertz (GHz) in a frequency band above 45 GHz, transmission of the PPDU via the transmit chain is based on the PPDU waveform corresponding to the transmit chain.

Example 91 includes the subject matter of Example 90, and optionally, wherein the index of the matrix element comprises a row index of the spatial mapping matrix, the row index is equal to the transmit chain number of the transmit chain.

Example 92 includes the subject matter of Example 90 or 91, and optionally, wherein the matrix element is in a row of the spatial mapping matrix having a row index equal to 1.

Example 93 includes the subject matter of any one of Examples 90-92, and optionally, wherein the instructions, when executed, cause the EDMG STA to transmit the PPDU according to a hybrid beamforming scheme.

Example 94 includes the subject matter of Example 93, and optionally, wherein the hybrid beamforming scheme comprises digital beamforming according to the spatial mapping matrix, and analog beamforming according to an Antenna Weight Vector (AWV).

Example 95 includes the subject matter of any one of Examples 90-94, and optionally, wherein the instructions, when executed, cause the EDMG STA to generate one or more preamble-data waveforms corresponding to the one or more transmit chains, a preamble-data waveform corresponding to the transmit chain is based on the matrix element of the spatial mapping matrix; and generate the one or more PPDU waveforms corresponding to the one or more transmit chains by up-sampling and filtering the one or more preamble-data waveforms, the PPDU waveform corresponding to the transmit chain is based on up-sampling and filtering the preamble-data waveform corresponding to the transmit chain.

Example 96 includes the subject matter of any one of Examples 90-95, and optionally, wherein the instructions, when executed, cause the EDMG STA to transmit the PPDU over a channel bandwidth of 2.16 GHz.

Example 97 includes the subject matter of any one of Examples 90-95, and optionally, wherein the instructions, when executed, cause the EDMG STA to transmit the PPDU over a channel bandwidth comprising a plurality of 2.16 GHz channel bandwidths.

Example 98 includes the subject matter of Example 97, and optionally, wherein the instructions, when executed, cause the EDMG STA to determine the PPDU waveform corresponding to the transmit chain to comprise an up-sampled and filtered waveform corresponding to the transmit chain duplicated, with time delay, over the plurality of 2.16 GHz channel bandwidths.

Example 99 includes the subject matter of any one of Examples 90-98, and optionally, wherein the PPDU comprises a non-EDMG PPDU decodable by one or more non-EDMG stations, which are DMG stations.

Example 100 includes the subject matter of Example 99, and optionally, wherein the instructions, when executed, cause the EDMG STA to determine a non-EDMG waveform corresponding to the transmit chain, and to determine the PPDU waveform corresponding to the transmit chain based on the non-EDMG waveform corresponding to the transmit chain, the non-EDMG waveform corresponding to the transmit chain determined based on the matrix element of the spatial mapping matrix as follows:

$$r_{non\text{-}EDMG}^{iTX(1)}(nT_c) = [Q]_{i_{TX},1} r_{non\text{-}EDMG}(nT_c),$$
$$1 \le i_{TX} \le N_{TX}$$

wherein $N_{TX}$ denotes a total count of the one or more transmit chains, $r_{non\text{-}EDMG}^{iTX(1)}(nT_c)$ denotes the non-EDMG waveform corresponding to the transmit chain number $i_{TX}$, $r_{non\text{-}EDMG}(nT_c)$ denotes fields of the non-EDMG PPDU, Q denotes the spatial mapping matrix, and $[\ ]_{m,n}$ denotes a matrix element from an m-th row and an n-th column.

Example 101 includes the subject matter of Example 100, and optionally, wherein the instructions, when executed, cause the EDMG STA to determine the PPDU waveform corresponding to the transmit chain based on an up-sampled and filtered waveform corresponding to the transmit chain, which is defined as follows:

$$r_{non\text{-}EDMG}^{iTX(2)}\left(n\frac{T_c}{N_{up}}\right) = \begin{cases} r_{non\text{-}EDMG}^{iTX(1)}\left(n\frac{T_c}{N_{up}}\right), & n = 0, N_{up}, 2*N_{up} \ldots \\ 0 & \text{otherwise} \end{cases}$$

$$r_{non\text{-}EDMG}^{iTX(3)}\left(n\frac{T_c}{N_{up}}\right) = \sum_{k=0}^{K-1} r_{non\text{-}EDMG}^{iTX(2)}\left((n-k)\frac{T_c}{N_{up}}\right) h_{SCCB}(k), n = 0, 1, \ldots$$

$$r_{non\text{-}EDMG}^{iTX(4)}\left(n\frac{T_c}{N_{up}}\right) = r_{non\text{-}EDMG}^{iTX(3)}\left(\left(n + \frac{K-1}{2}\right)\frac{T_c}{N_{up}}\right), n = 0, 1, \ldots$$

wherein:

$$r_{non\text{-}EDMG}^{iTX(4)}\left(n\frac{T_c}{N_{up}}\right)$$

denotes an up-sampled and filtered waveform corresponding to a transmit chain number $i_{TX}$, $h_{SCCB}$ denotes a response of a pulse shaping filter, $T_c$ denotes a Single Carrier (SC) chip time duration, $N_{up}$ denotes a factor value, K denotes a length of the pulse shaping filter in samples, and $$r_{non\text{-}EDMG,}^{iTX(2)}\left(n\frac{T_c}{N_{up}}\right) = 0, \text{ for } n < 0 \text{ and } n \ge \text{length}\left(r_{non\text{-}EDMG}^{iTX(1)}\right) \times N_{up}.$$

Example 102 includes the subject matter of any one of Examples 99-101, and optionally, wherein the instructions, when executed, cause the EDMG STA to, when the non-EDMG PPDU is to be transmitted over a channel bandwidth of 2.16 GHz, determine the PPDU waveform corresponding to the transmit chain to comprise the following waveform:

$$r_{PPDU}^{iTX}(nT_c) = r_{non\text{-}EDMG}^{iTX(4)}(nT_c), 1 \le i_{TX} \le N_{TX} \quad (3)$$

wherein:

$r_{non\text{-}EDMG}^{iTX(4)}$ denotes an up-sampled and filtered waveform corresponding to a transmit chain number $i_{TX}$, and $T_c$ denotes a Single Carrier (SC) chip time duration, Example 103 includes the subject matter of any one of Examples 99-101, and optionally, wherein the instructions, when executed, cause the EDMG STA to, when the non-EDMG PPDU is to be transmitted over a 4.32 GHz bandwidth, determine the PPDU waveform corresponding to the transmit chain to comprise the following waveform:

$$r_{PPDU}^{iTX}\left(n\frac{T_c}{N_{up}}\right) = r_{non\text{-}EDMG}^{iTX(4)}\left(n\frac{T_c}{N_{up}} + \Delta t_1\right) \cdot \frac{1}{\sqrt{2}} \exp\left(-j2\pi\left(\frac{\Delta F}{2}\right)\left(\frac{T_c}{N_{up}}\right)n\right) + +$$

$$r_{non\text{-}EDMG}^{iTX(4)}\left(n\frac{T_c}{N_{up}} + \Delta t_2\right) \cdot \frac{1}{\sqrt{2}} \exp\left(+j2\pi\left(\frac{\Delta F}{2}\right)\left(\frac{T_c}{N_{up}}\right)n\right), 1 \le i_{TX} \le N_{TX}$$

wherein:

$$r_{non\text{-}EDMG}^{iTX(4)}\left(n\frac{T_c}{N_{up}}\right)$$

denotes an up-sampled and filtered waveform corresponding to a transmit chain number $i_{TX}$, $T_c$ denotes a Single Carrier (SC) chip time duration, $\Delta F$ denotes a sub-channel spacing equal to 2.16 GHz, and $\Delta t_1$ and $\Delta t_2$ are in the range $[0, T_c]$.

Example 104 includes the subject matter of any one of Examples 99-101, and optionally, wherein the instructions, when executed, cause the EDMG STA to, when the non-EDMG PPDU is to be transmitted over a 6.48 GHz bandwidth, determine the PPDU waveform corresponding to the transmit chain to comprise the following waveform:

$$r_{PPDU}^{i_{TX}}\left(n\frac{T_c}{N_{up}}\right) = r_{non\text{-}EDMG}^{i_{TX}(4)}\left(n\frac{T_c}{N_{up}} + \Delta t_1\right) \cdot \frac{1}{\sqrt{3}}$$

$$\exp\left(-j2\pi\Delta F\left(\frac{T_c}{N_{up}}\right)n\right) + + r_{non\text{-}EDMG}^{i_{TX}(4)}\left(n\frac{T_c}{N_{up}} + \Delta t_2\right) \cdot \frac{1}{\sqrt{3}} + +$$

$$r_{non\text{-}EDMG}^{i_{TX}(4)}\left(n\frac{T_c}{N_{up}} + \Delta t_3\right) \cdot \frac{1}{\sqrt{3}} \exp\left(+j2\pi\Delta F\left(\frac{T_c}{N_{up}}\right)n\right), 1 \le i_{TX} \le N_{TX}$$

wherein:

$$r_{non\text{-}EDMG}^{i_{TX}(4)}\left(n\frac{T_c}{N_{up}}\right)$$

denotes an up-sampled and filtered waveform corresponding to a transmit chain number $i_{TX}$, $T_c$ denotes a Single Carrier (SC) chip time duration, $\Delta F$ denotes a sub-channel spacing equal to 2.16 GHz, and $\Delta t_1$, $\Delta t_2$, and $\Delta t_3$ are in the range $[0, T_c]$.

Example 105 includes the subject matter of any one of Examples 99-101, and optionally, wherein the instructions, when executed, cause the EDMG STA to, when the non-EDMG PPDU is to be transmitted over a 8.64 GHz bandwidth, determine the PPDU waveform corresponding to the transmit chain to comprise the following waveform:

$$r_{PPDU}^{i_{TX}}\left(n\frac{T_c}{N_{up}}\right) =$$

$$r_{non\text{-}EDMG}^{i_{TX}(4)}\left(n\frac{T_c}{N_{up}} + \Delta t_1\right) \cdot \frac{1}{\sqrt{4}} \exp\left(-j2\pi\left(\frac{3\Delta F}{2}\right)\left(\frac{T_c}{N_{up}}\right)n\right) + +$$

$$r_{non\text{-}EDMG}^{i_{TX}(4)}\left(n\frac{T_c}{N_{up}} + \Delta t_2\right) \cdot \frac{1}{\sqrt{4}} \exp\left(-j2\pi\left(\frac{\Delta F}{2}\right)\left(\frac{T_c}{N_{up}}\right)n\right) + +$$

$$r_{non\text{-}EDMG}^{i_{TX}(4)}\left(n\frac{T_c}{N_{up}} + \Delta t_3\right) \cdot \frac{1}{\sqrt{4}} \exp\left(+j2\pi\left(\frac{\Delta F}{2}\right)\left(\frac{T_c}{N_{up}}\right)n\right) + +$$

$$r_{non\text{-}EDMG}^{i_{TX}(4)}\left(n\frac{T_c}{N_{up}} + \Delta t_4\right) \cdot \frac{1}{\sqrt{4}} \exp\left(+j2\pi\left(\frac{3\Delta F}{2}\right)\left(\frac{T_c}{N_{up}}\right)n\right), 1 \le i_{TX} \le N_{TX}$$

wherein:

$$r_{non\text{-}EDMG}^{i_{TX}(4)}\left(n\frac{T_c}{N_{up}}\right)$$

denotes an up-sampled and filtered waveform corresponding to a transmit chain number $i_{TX}$, $T_c$ denotes a Single Carrier (SC) chip time duration, $\Delta F$ denotes a sub-channel spacing equal to 2.16 GHz, and $\Delta t_1$, $\Delta t_2$, $\Delta t_3$, and $\Delta t_4$ are in the range $[0, T_c]$.

Example 106 includes the subject matter of any one of Examples 90-98, and optionally, wherein the PPDU comprises an EDMG PPDU decodable by EDMG stations.

Example 107 includes the subject matter of Example 106, and optionally, wherein the instructions, when executed, cause the EDMG STA to determine an EDMG waveform corresponding to the transmit chain, and to determine the PPDU waveform corresponding to the transmit chain based on the EDMG waveform corresponding to the transmit chain, the EDMG waveform corresponding to the transmit chain determined based on the matrix element of the spatial mapping matrix as follows:

$$r_{EDMG\text{-}Pream\text{-}Data}^{i_{TX}(1)}(nT_c) = [Q]_{i_{TX},1} \cdot r_{EDMG\text{-}Pream\text{-}Data}(nT_c), 1 \le i_{TX} \le N_{TX}$$

wherein $N_{Tx}$ denotes a total count of the one or more transmit chains, $r_{EDMG\text{-}Pream\text{-}Data}^{i_{TX}(1)}(nT_c)$ denotes the EDMG waveform corresponding to the transmit chain number $i_{TX}$, $r_{EDMG\text{-}Pream\text{-}Data}(nT_c)$ denotes the preamble and date field of the EDMG PPDU, Q denotes the spatial mapping matrix, and $[\ ]_{m,n}$ denotes a matrix element from an m-th row and an n-th column.

Example 108 includes the subject matter of Example 106 or 107, and optionally, wherein the instructions, when executed, cause the EDMG STA to determine the PPDU waveform corresponding to the transmit chain based on an up-sampled and filtered waveform corresponding to the transmit chain, which is defined as follows:

$$r_{EDMG\text{-}Pream\text{-}Data}^{i_{TX}(2)}\left(n\frac{T_c}{N_{up}}\right) =$$

$$\begin{cases} r_{EDMG\text{-}Pream\text{-}Data}^{i_{TX}(1)}\left(n\frac{T_c}{N_{up}}\right), & n = 0, N_{up}, 2*N_{up} \ldots \\ 0 & \text{otherwise} \end{cases}$$

$$r_{EDMG\text{-}Pream\text{-}Data}^{i_{TX}(3)}\left(n\frac{T_c}{N_{up}}\right) = \sum_{k=0}^{K-1} r_{EDMG\text{-}Pream\text{-}Data}^{i_{TX}(2)}\left((n-k)\frac{T_c}{N_{up}}\right) h_{SCCB}(k),$$

$$n = 0, 1, \ldots$$

$$r_{EDMG\text{-}Pream\text{-}Data}^{i_{TX}(4)}\left(n\frac{T_c}{N_{up}}\right) = r_{EDMG\text{-}Pream\text{-}Data}^{i_{TX}(3)}\left(\left(n + \frac{K-1}{2}\right)\frac{T_c}{N_{up}}\right), n = 0, 1, \ldots$$

wherein:

$$r_{EDMG\text{-}Pream\text{-}Data}^{i_{TX}(4)}\left(n\frac{T_c}{N_{up}}\right)$$

denotes an up-sampled and filtered waveform corresponding to a transmit chain number $i_{TX}$, $$r_{EDMG\text{-}Pream\text{-}Data}^{i_{TX}(1)}\left(n\frac{T_c}{N_{up}}\right)$$

denotes an EDMG preamble-date waveform corresponding to a transmit chain number $i_{TX}$, $h_{SCCB}$ denotes a response of a pulse shaping filter, $T_c$ denotes a Single Carrier (SC) chip time duration, $N_{up}$ denotes a factor value, K denotes a length of the pulse shaping filter in samples, and $$r_{EDMG\text{-}Pream\text{-}Data}^{i_{TX}(2)}\left(n\frac{T_c}{N_{up}}\right) = 0,$$

for $n < 0$ and $n \geq \text{length}\left(r_{EDMG\text{-}Pream\text{-}Data}^{i_{TX}(1)}\right) \times N_{up}$.

Example 109 includes the subject matter of any one of Examples 106-108, and optionally, wherein the instructions, when executed, cause the EDMG STA to, when the EDMG PPDU is to be transmitted over a channel bandwidth of 2.16 GHz, determine the PPDU waveform corresponding to the transmit chain to comprise the following waveform:

$$r_{EDMG\text{-}Pream\text{-}Data}^{i_{TX}}\left(n\frac{T_c}{N_{up}}\right) = r_{EDMG\text{-}Pream\text{-}Data}^{i_{TX}(4)}\left(n\frac{T_c}{N_{up}}\right),$$

$$1 \leq i_{TX} \leq N_{TX}$$

wherein:

$$r_{EDMG\text{-}Pream\text{-}Data}^{i_{TX}(4)}\left(n\frac{T_c}{N_{up}}\right)$$

denotes an up-sampled and filtered waveform corresponding to a transmit chain number $i_{TX}$, and $T_c$ denotes a Single Carrier (SC) chip time duration, Example 110 includes the subject matter of any one of Examples 106-108, and optionally, wherein the instructions, when executed, cause the EDMG STA to, when the EDMG PPDU is to be transmitted over a 4.32 GHz bandwidth, determine the PPDU waveform corresponding to the transmit chain to comprise the following waveform:

$$r_{EDMG\text{-}Pream\text{-}Data}^{i_{TX}}\left(n\frac{T_c}{N_{up}}\right) == r_{EDMG\text{-}Pream\text{-}Data}^{i_{TX}(4)}\left(n\frac{T_c}{N_{up}}+\Delta t_1\right) \cdot \frac{1}{\sqrt{2}}$$

$$\exp\left(-j2\pi\left(\frac{\Delta F}{2}\right)\left(\frac{T_c}{N_{up}}\right)n\right) + + r_{EDMG\text{-}Pream\text{-}Data}^{i_{TX}(4)}\left(n\frac{T_c}{N_{up}}+\Delta t_2\right) \cdot \frac{1}{\sqrt{2}}$$

$$\exp\left(+j2\pi\left(\frac{\Delta F}{2}\right)\left(\frac{T_c}{N_{up}}\right)n\right), 1 \leq i_{TX} \leq N_{TX}$$

wherein:

$$r_{EDMG\text{-}Pream\text{-}Data}^{i_{TX}(4)}\left(n\frac{T_c}{N_{up}}\right)$$

denotes an up-sampled and filtered waveform corresponding to a transmit chain number $i_{TX}$, $T_c$ denotes a Single Carrier (SC) chip time duration, $\Delta F$ denotes a sub-channel spacing equal to 2.16 GHz, and $\Delta t_1$ and $\Delta t_2$ are in the range $[0, T_c]$.

Example 111 includes the subject matter of any one of Examples 106-108, and optionally, wherein the instructions, when executed, cause the EDMG STA to, when the EDMG PPDU is to be transmitted over a 6.48 GHz bandwidth, determine the PPDU waveform corresponding to the transmit chain to comprise the following waveform:

$$r_{EDMG\text{-}Pream\text{-}Data}^{i_{TX}}\left(n\frac{T_c}{N_{up}}\right) == r_{EDMG\text{-}Pream\text{-}Data}^{i_{TX}(4)}\left(n\frac{T_c}{N_{up}}+\Delta t_1\right) \cdot \frac{1}{\sqrt{3}}$$

$$\exp\left(-j2\pi\Delta F\left(\frac{T_c}{N_{up}}\right)n\right) + + r_{EDMG\text{-}Pream\text{-}Data}^{i_{TX}(4)}\left(n\frac{T_c}{N_{up}}+\Delta t_2\right) \cdot \frac{1}{\sqrt{3}} + +$$

$$r_{EDMG\text{-}Pream\text{-}Data}^{i_{TX}(4)}\left(n\frac{T_c}{N_{up}}+\Delta t_3\right) \cdot \frac{1}{\sqrt{3}}$$

$$\exp\left(+j2\pi\Delta F\left(\frac{T_c}{N_{up}}\right)n\right), 1 \leq i_{TX} \leq N_{TX}$$

wherein:

$$r_{EDMG\text{-}Pream\text{-}Data}^{i_{TX}(4)}\left(n\frac{T_c}{N_{up}}\right)$$

denotes an up-sampled and filtered waveform corresponding to a transmit chain number $i_{TX}$, $T_c$ denotes a Single Carrier (SC) chip time duration, $\Delta F$ denotes a sub-channel spacing equal to 2.16 GHz, and $\Delta t_1$, $\Delta t_2$, and $\Delta t_3$ are in the range $[0, T_c]$.

Example 112 includes the subject matter of any one of Examples 106-108, and optionally, wherein the instructions, when executed, cause the EDMG STA to, when the EDMG PPDU is to be transmitted over a 8.64 GHz bandwidth, determine the PPDU waveform corresponding to the transmit chain to comprise the following waveform:

$$r_{EDMG\text{-}Pream\text{-}Data}^{i_{TX}}\left(n\frac{T_c}{N_{up}}\right) == r_{EDMG\text{-}Pream\text{-}Data}^{i_{TX}(4)}\left(n\frac{T_c}{N_{up}}+\Delta t_1\right) \cdot \frac{1}{\sqrt{4}}$$

$$\exp\left(-j2\pi\left(\frac{3\Delta F}{2}\right)\left(\frac{T_c}{N_{up}}\right)n\right) + + r_{EDMG\text{-}Pream\text{-}Data}^{i_{TX}(4)}\left(n\frac{T_c}{N_{up}}+\Delta t_2\right) \cdot \frac{1}{\sqrt{4}}$$

$$\exp\left(-j2\pi\left(\frac{\Delta F}{2}\right)\left(\frac{T_c}{N_{up}}\right)n\right) + + r_{EDMG\text{-}Pream\text{-}Data}^{i_{TX}(4)}\left(n\frac{T_c}{N_{up}}+\Delta t_3\right) \cdot \frac{1}{\sqrt{4}}$$

$$\exp\left(+j2\pi\left(\frac{\Delta F}{2}\right)\left(\frac{T_c}{N_{up}}\right)n\right) + + r_{EDMG\text{-}Pream\text{-}Data}^{i_{TX}(4)}\left(n\frac{T_c}{N_{up}}+\Delta t_4\right) \cdot \frac{1}{\sqrt{4}}$$

$$\exp\left(+j2\pi\left(\frac{3\Delta F}{2}\right)\left(\frac{T_c}{N_{up}}\right)n\right), 1 \leq i_{TX} \leq N_{TX}$$

wherein:

$$r_{EDMG\text{-}Pream\text{-}Data}^{i_{TX}(4)}\left(n\frac{T_c}{N_{up}}\right)$$

denotes an up-sampled and filtered waveform corresponding to a transmit chain number $i_{TX}$, $T_c$ denotes a Single Carrier (SC) chip time duration, $\Delta F$ denotes a sub-channel spacing equal to 2.16 GHz, and $\Delta t_1$, $\Delta t_2$, $\Delta t_3$, and $\Delta t_4$ are in the range $[0, T_c]$.

Example 113 includes the subject matter of any one of Examples 90-112, and optionally, wherein the instructions, when executed, cause the EDMG STA to generate the PPDU comprising a training (TRN) field, and to generate the PPDU waveform corresponding to the transmit chain based on a waveform for the TRN field.

Example 114 includes the subject matter of Example 113, and optionally, wherein the instructions, when executed, cause the EDMG STA to generate the waveform for the TRN field by filtering and resampling a TRN field corresponding to the number of the transmit chain.

Example 115 includes the subject matter of Example 113 or 114, and optionally, wherein the instructions, when executed, cause the EDMG STA to determine the waveform for the TRN field based on the following resampling procedure:

$$r_{TRN}^{i_{TX}(2)}\left(n\frac{T_c}{3N_{CB}}\right) = \begin{cases} r_{TRN}^{i_{TX}(1)}\left(n\frac{T_c}{3N_{CB}}\right), & n = 0, 3, 6 \ldots \\ 0 & \text{otherwise} \end{cases}$$

$$r_{TRN}^{i_{TX}(3)}\left(n\frac{T_c}{3N_{CB}}\right) = \sum_{k=0}^{K-1} r_{TRN}^{i_{TX}(2)}\left((n-k)\frac{T_c}{3N_{CB}}\right)h_{SCCB}(k),$$

$$n = 0, 1, \ldots$$

$$r_{TRN}^{i_{TX}(4)}\left(n\frac{2T_c}{3N_{CB}}\right) = r_{TRN}^{i_{TX}(3)}\left(\left(2n + \frac{K-1}{2}\right)\frac{T_c}{3N_{CB}}\right), n = 0, 1, \ldots$$

wherein:

$$r_{TRN}^{i_{TX}(1)}\left(n\frac{T_c}{N_{CB}}\right)$$

denotes a TRN field corresponding to a transmit chain number $i_{TX}$,
$T_c$ denotes a Single Carrier (SC) chip time duration,
$N_{up}$ denotes a factor value,
$N_{CB}$ denotes a channel bonding factor,
$h_{SCCB}$ denotes a response of a pulse shaping filter,
K denotes a length of the pulse shaping filter in samples, and $$r_{TRN}^{i_{TX}(2)}\left(n\frac{T_c}{3N_{CB}}\right) = 0, \text{ for } n < 0 \text{ and } n \geq \text{length}\left(r_{TRN}^{i_{TX}(1)}\right) \times 3.$$

Example 116 includes the subject matter of any one of Examples 90-115, and optionally, wherein the instructions, when executed, cause the EDMG STA to transmit the PPDU in a Single Carrier (SC) transmission.

Example 117 includes the subject matter of any one of Examples 90-116, and optionally, wherein the PPDU comprises a control mode PPDU.

Example 118 includes the subject matter of any one of Examples 90-117, and optionally, wherein the instructions, when executed, cause the EDMG STA to transmit the PPDU over a channel bandwidth of 2.16 GHz, 4.32 GHz, 6.48 GHz, or 8.64 GHz.

Example 119 includes an apparatus of wireless communication by an Enhanced Directional Multi-Gigabit (DMG) (EDMG) station (STA), the apparatus comprising means for generating a Physical Layer (PHY) Protocol Data Unit (PPDU) comprising at least a preamble and a data field; means for generating one or more PPDU waveforms corresponding to one or more respective transmit chains for digital beamforming transmission of the PPDU by determining a PPDU waveform corresponding to a transmit chain of the one or more transmit chains based on a matrix element of a spatial mapping matrix, an index of the matrix element is based on a transmit chain number of the transmit chain; and means for transmitting the PPDU via the one or more transmit chains over a channel bandwidth of at least 2.16 Gigahertz (GHz) in a frequency band above 45 GHz, transmission of the PPDU via the transmit chain is based on the PPDU waveform corresponding to the transmit chain.

Example 120 includes the subject matter of Example 119, and optionally, wherein the index of the matrix element comprises a row index of the spatial mapping matrix, the row index is equal to the transmit chain number of the transmit chain.

Example 121 includes the subject matter of Example 119 or 120, and optionally, wherein the matrix element is in a row of the spatial mapping matrix having a row index equal to 1.

Example 122 includes the subject matter of any one of Examples 119-121, and optionally, comprising means for transmitting the PPDU according to a hybrid beamforming scheme.

Example 123 includes the subject matter of Example 122, and optionally, wherein the hybrid beamforming scheme comprises digital beamforming according to the spatial mapping matrix, and analog beamforming according to an Antenna Weight Vector (AWV).

Example 124 includes the subject matter of any one of Examples 119-123, and optionally, comprising means for generating one or more preamble-data waveforms corresponding to the one or more transmit chains, a preamble-data waveform corresponding to the transmit chain is based on the matrix element of the spatial mapping matrix; and generating the one or more PPDU waveforms corresponding to the one or more transmit chains by up-sampling and filtering the one or more preamble-data waveforms, the PPDU waveform corresponding to the transmit chain is based on up-sampling and filtering the preamble-data waveform corresponding to the transmit chain.

Example 125 includes the subject matter of any one of Examples 119-124, and optionally, comprising means for transmitting the PPDU over a channel bandwidth of 2.16 GHz.

Example 126 includes the subject matter of any one of Examples 119-124, and optionally, comprising means for transmitting the PPDU over a channel bandwidth comprising a plurality of 2.16 GHz channel bandwidths.

Example 127 includes the subject matter of Example 126, and optionally, comprising means for determining the PPDU waveform corresponding to the transmit chain to comprise an up-sampled and filtered waveform corresponding to the transmit chain duplicated, with time delay, over the plurality of 2.16 GHz channel bandwidths.

Example 128 includes the subject matter of any one of Examples 119-127, and optionally, wherein the PPDU comprises a non-EDMG PPDU decodable by one or more non-EDMG stations, which are DMG stations.

Example 129 includes the subject matter of Example 128, and optionally, comprising means for determining a non-EDMG waveform corresponding to the transmit chain, and determining the PPDU waveform corresponding to the transmit chain based on the non-EDMG waveform corresponding to the transmit chain, the non-EDMG waveform corresponding to the transmit chain determined based on the matrix element of the spatial mapping matrix as follows:

$$r_{non\text{-}EDMG}^{i_{TX}(1)}(nT_c) = [Q]_{i_{TX},1} \cdot r_{non\text{-}EDMG}(nT_c),$$
$$1 \leq i_{TX} \leq N_{TX}$$

wherein $N_{Tx}$ denotes a total count of the one or more transmit chains, $r_{non\text{-}EDMG}^{i_{TX}(1)}(nT_c)$ denotes the non-EDMG waveform corresponding to the transmit chain number $i_{TX}$, $r_{non\text{-}EDMG}(nT_c)$ denotes fields of the non-EDMG PPDU, Q denotes the spatial mapping matrix, and $[\ ]_{m,n}$ denotes a matrix element from an m-th row and an n-th column.

Example 130 includes the subject matter of Example 129, and optionally, comprising means for determining the PPDU waveform corresponding to the transmit chain based on an up-sampled and filtered waveform corresponding to the transmit chain, which is defined as follows:

$$r^{i_{TX}(2)}_{non\text{-}EDMG}\left(n\frac{T_c}{N_{up}}\right) = \begin{cases} r^{i_{TX}(1)}_{non\text{-}EDMG}\left(n\frac{T_c}{N_{up}}\right), & n = 0, N_{up}, 2*N_{up} \ldots \\ 0 & \text{otherwise} \end{cases}$$

$$r^{i_{TX}(3)}_{non\text{-}EDMG}\left(n\frac{T_c}{N_{up}}\right) = \sum_{k=0}^{K-1} r^{i_{TX}(2)}_{non\text{-}EDMG}\left((n-k)\frac{T_c}{N_{up}}\right) h_{SCCB}(k),$$

$n = 0, 1, \ldots$ $$r^{i_{TX}(4)}_{non\text{-}EDMG}\left(n\frac{T_c}{N_{up}}\right) = r^{i_{TX}(3)}_{non\text{-}EDMG}\left(\left(n+\frac{K-1}{2}\right)\frac{T_c}{N_{up}}\right),$$

$n = 0, 1, \ldots$ wherein:

$$r^{i_{TX}(4)}_{non\text{-}EDMG}\left(n\frac{T_c}{N_{CB}}\right)$$

denotes an up-sampled and filtered waveform corresponding to a transmit chain number $i_{TX}$,
$h_{SCCB}$ denotes a response of a pulse shaping filter,
$T_c$ denotes a Single Carrier (SC) chip time duration,
$N_{up}$ denotes a factor value,
K denotes a length of the pulse shaping filter in samples, and $$r^{i_{TX}(2)}_{non\text{-}EDMG,}\left(n\frac{T_c}{N_{up}}\right) = 0, \text{ for } n < 0 \text{ and } n \geq \text{length}\left(r^{i_{TX}(1)}_{non\text{-}EDMG}\right) \times N_{up}.$$

Example 131 includes the subject matter of any one of Examples 128-130, and optionally, comprising means for, when the non-EDMG PPDU is to be transmitted over a channel bandwidth of 2.16 GHz, determining the PPDU waveform corresponding to the transmit chain to comprise the following waveform:

$$r_{PPDU}^{i_{TX}}(nT_c) = r_{non\text{-}EDMG}^{i_{TX}(4)}(nT_c), 1 \leq i_{TX} \leq N_{TX}$$

wherein:
$r_{non\text{-}EDMG}^{i_{TX}}{}_{(4)}$ denotes an up-sampled and filtered waveform corresponding to a transmit chain number $i_{TX}$, and
$T_c$ denotes a Single Carrier (SC) chip time duration,
Example 132 includes the subject matter of any one of Examples 128-130, and optionally, comprising means for, when the non-EDMG PPDU is to be transmitted over a 4.32 GHz bandwidth, determining the PPDU waveform corresponding to the transmit chain to comprise the following waveform:

$$r_{PPDU}^{i_{TX}}\left(n\frac{T_c}{N_{up}}\right) = r^{i_{TX}(4)}_{non\text{-}EDMG}\left(n\frac{T_c}{N_{up}} + \Delta t_1\right) \cdot \frac{1}{\sqrt{2}} \exp\left(-j2\pi\left(\frac{\Delta F}{2}\right)\left(\frac{T_c}{N_{up}}\right)n\right) ++$$

$$r^{i_{TX}(4)}_{non\text{-}EDMG}\left(n\frac{T_c}{N_{up}} + \Delta t_2\right) \cdot \frac{1}{\sqrt{2}} \exp\left(+j2\pi\left(\frac{\Delta F}{2}\right)\left(\frac{T_c}{N_{up}}\right)n\right), 1 \leq i_{TX} \leq N_{TX}$$

wherein:

$$r^{i_{TX}(4)}_{non\text{-}EDMG}\left(n\frac{T_c}{N_{up}}\right)$$

denotes an up-sampled and filtered waveform corresponding to a transmit chain number $i_{TX}$,
$T_c$ denotes a Single Carrier (SC) chip time duration,
$\Delta F$ denotes a sub-channel spacing equal to 2.16 GHz, and
$\Delta t_1$ and $\Delta t_2$ are in the range [0, $T_c$].

Example 133 includes the subject matter of any one of Examples 128-130, and optionally, comprising means for, when the non-EDMG PPDU is to be transmitted over a 6.48 GHz bandwidth, determining the PPDU waveform corresponding to the transmit chain to comprise the following waveform:

$$r_{PPDU}^{i_{TX}}\left(n\frac{T_c}{N_{up}}\right) = r^{i_{TX}(4)}_{non\text{-}EDMG}\left(n\frac{T_c}{N_{up}} + \Delta t_1\right) \cdot \frac{1}{\sqrt{3}}$$

$$\exp\left(-j2\pi\Delta F\left(\frac{T_c}{N_{up}}\right)n\right) ++ r^{i_{TX}(4)}_{non\text{-}EDMG}\left(n\frac{T_c}{N_{up}} + \Delta t_2\right) \cdot \frac{1}{\sqrt{3}} ++$$

$$r^{i_{TX}(4)}_{non\text{-}EDMG}\left(n\frac{T_c}{N_{up}} + \Delta t_3\right) \cdot \frac{1}{\sqrt{3}} \exp\left(+j2\pi\Delta F\left(\frac{T_c}{N_{up}}\right)n\right), 1 \leq i_{TX} \leq N_{TX}$$

wherein:

$$r^{i_{TX}(4)}_{non\text{-}EDMG}\left(n\frac{T_c}{N_{up}}\right)$$

denotes an up-sampled and filtered waveform corresponding to a transmit chain number $i_{TX}$,
$T_c$ denotes a Single Carrier (SC) chip time duration,
$\Delta F$ denotes a sub-channel spacing equal to 2.16 GHz, and
$\Delta t_1$, $\Delta t_2$, and $\Delta t_3$ are in the range [0, $T_c$].

Example 134 includes the subject matter of any one of Examples 128-130, and optionally, comprising means for, when the non-EDMG PPDU is to be transmitted over a 8.64 GHz bandwidth, determining the PPDU waveform corresponding to the transmit chain to comprise the following waveform:

$$r_{PPDU}^{i_{TX}}\left(n\frac{T_c}{N_{up}}\right) = r^{i_{TX}(4)}_{non\text{-}EDMG}\left(n\frac{T_c}{N_{up}} + \Delta t_1\right) \cdot \frac{1}{\sqrt{4}} \exp\left(-j2\pi\left(\frac{3\Delta F}{2}\right)\left(\frac{T_c}{N_{up}}\right)n\right) ++$$

$$r^{i_{TX}(4)}_{non\text{-}EDMG}\left(n\frac{T_c}{N_{up}} + \Delta t_2\right) \cdot \frac{1}{\sqrt{4}} \exp\left(-j2\pi\left(\frac{\Delta F}{2}\right)\left(\frac{T_c}{N_{up}}\right)n\right) ++$$

$$r^{i_{TX}(4)}_{non\text{-}EDMG}\left(n\frac{T_c}{N_{up}} + \Delta t_3\right) \cdot \frac{1}{\sqrt{4}} \exp\left(+j2\pi\left(\frac{\Delta F}{c}\right)\left(\frac{T_c}{N_{up}}\right)n\right) ++$$

$$r^{i_{TX}(4)}_{non\text{-}EDMG}\left(n\frac{T_c}{N_{up}} + \Delta t_4\right) \cdot \frac{1}{\sqrt{4}} \exp\left(+j2\pi\left(\frac{3\Delta F}{2}\right)\left(\frac{T_c}{N_{up}}\right)n\right), 1 \leq i_{TX} \leq N_{TX}$$

wherein:

$$r^{i_{TX}(4)}_{non\text{-}EDMG}\left(n\frac{T_c}{N_{up}}\right)$$

denotes an up-sampled and filtered waveform corresponding to a transmit chain number $i_{TX}$, $T_c$ denotes a Single Carrier (SC) chip time duration, $\Delta F$ denotes a sub-channel spacing equal to 2.16 GHz, and $\Delta t_1$, $\Delta t_2$, $\Delta t_3$, and $\Delta t_4$ are in the range $[0, T_c]$.

Example 135 includes the subject matter of any one of Examples 119-127, and optionally, wherein the PPDU comprises an EDMG PPDU decodable by EDMG stations.

Example 136 includes the subject matter of Example 135, and optionally, comprising means for determining an EDMG waveform corresponding to the transmit chain, and determining the PPDU waveform corresponding to the transmit chain based on the EDMG waveform corresponding to the transmit chain, the EDMG waveform corresponding to the transmit chain determined based on the matrix element of the spatial mapping matrix as follows:

$$r_{EDMG\text{-}Pream\text{-}Data}^{i_{TX}(1)}(nT_c) = [Q]_{i_{TX},1} \cdot r_{EDMG\text{-}Pream\text{-}Data}(nT_c), 1 \leq i_{TX} \leq N_{TX}$$

wherein $N_{Tx}$ denotes a total count of the one or more transmit chains, $r_{EDMG\text{-}Pream\text{-}Data}^{i_{TX}(1)}(nT_c)$ denotes the EDMG waveform corresponding to the transmit chain number $i_{TX}$, $r_{EDMG\text{-}Pream\text{-}Data}(nT_c)$ denotes the preamble and date field of the EDMG PPDU, Q denotes the spatial mapping matrix, and $[\ ]_{m,n}$ denotes a matrix element from an m-th row and an n-th column.

Example 137 includes the subject matter of Example 135 or 136, and optionally, comprising means for determining the PPDU waveform corresponding to the transmit chain based on an up-sampled and filtered waveform corresponding to the transmit chain, which is defined as follows:

$$r_{EDMG\text{-}Pream\text{-}Data}^{i_{TX}(2)}\left(n\frac{T_c}{N_{up}}\right) = \begin{cases} r_{EDMG\text{-}Pream\text{-}Data}^{i_{TX}(1)}\left(n\frac{T_c}{N_{up}}\right), & n = 0, N_{up}, 2*N_{up} \dots \\ 0 & \text{otherwise} \end{cases}$$

$$r_{EDMG\text{-}Pream\text{-}Data}^{i_{TX}(3)}\left(n\frac{T_c}{N_{up}}\right) = \sum_{k=0}^{K-1} r_{EDMG\text{-}Pream\text{-}Data}^{i_{TX}(2)}\left((n-k)\frac{T_c}{N_{up}}\right) h_{SCCB}(k),$$

$n = 0, 1, \dots$ $$r_{EDMG\text{-}Pream\text{-}Data}^{i_{TX}(4)}\left(n\frac{T_c}{N_{up}}\right) = r_{EDMG\text{-}Pream\text{-}Data}^{i_{TX}(3)}\left(\left(n + \frac{K-1}{2}\right)\frac{T_c}{N_{up}}\right),$$

$n = 0, 1, \dots$ wherein:

$$r_{EDMG\text{-}Pream\text{-}Data}^{i_{TX}(4)}\left(n\frac{T_c}{N_{up}}\right)$$

denotes an up-sampled and filtered waveform corresponding to a transmit chain number $i_{TX}$, $$r_{EDMG\text{-}Pream\text{-}Data}^{i_{TX}(1)}\left(n\frac{T_c}{N_{up}}\right)$$

denotes an EDMG preamble-date waveform corresponding to a transmit chain number $i_{TX}$, $h_{SCCB}$ denotes a response of a pulse shaping filter, $T_c$ denotes a Single Carrier (SC) chip time duration, $N_{up}$ denotes a factor value, K denotes a length of the pulse shaping filter in samples, and $$r_{EDMG\text{-}Pream\text{-}Data}^{i_{TX}(2)}\left(n\frac{T_c}{N_{up}}\right) = 0,$$

for $n < 0$ and $n \geq \text{length}\left(r_{EDMG\text{-}Pream\text{-}Data}^{i_{TX}(1)}\right) \times N_{up}$.

Example 138 includes the subject matter of any one of Examples 135-137, and optionally, comprising means for, when the EDMG PPDU is to be transmitted over a channel bandwidth of 2.16 GHz, determining the PPDU waveform corresponding to the transmit chain to comprise the following waveform:

$$r_{EDMG\text{-}Pream\text{-}Data}^{i_{TX}}\left(n\frac{T_c}{N_{up}}\right) = r_{EDMG\text{-}Pream\text{-}Data}^{i_{TX}(4)}\left(n\frac{T_c}{N_{up}}\right),$$

$1 \leq i_{TX} \leq N_{TX}$ wherein:

$$r_{EDMG\text{-}Pream\text{-}Data}^{i_{TX}(4)}\left(n\frac{T_c}{N_{up}}\right)$$

denotes an up-sampled and filtered waveform corresponding to a transmit chain number $i_{TX}$, and $T_c$ denotes a Single Carrier (SC) chip time duration, Example 139 includes the subject matter of any one of Examples 135-137, and optionally, comprising means for, when the EDMG PPDU is to be transmitted over a 4.32 GHz bandwidth, determining the PPDU waveform corresponding to the transmit chain to comprise the following waveform:

$$r_{EDMG\text{-}Pream\text{-}Data}^{i_{TX}}\left(n\frac{T_c}{N_{up}}\right) = = r_{EDMG\text{-}Pream\text{-}Data}^{i_{TX}(4)}\left(n\frac{T_c}{N_{up}} + \Delta t_1\right) \cdot \frac{1}{\sqrt{2}}$$

$$\exp\left(-j2\pi\left(\frac{\Delta F}{2}\right)\left(\frac{T_c}{N_{up}}\right)n\right) + + r_{EDMG\text{-}Pream\text{-}Data}^{i_{TX}(4)}\left(n\frac{T_c}{N_{up}} + \Delta t_2\right) \cdot \frac{1}{\sqrt{2}}$$

$$\exp\left(+j2\pi\left(\frac{\Delta F}{2}\right)\left(\frac{T_c}{N_{up}}\right)n\right), 1 \leq i_{TX} \leq N_{TX}$$

wherein:

$$r_{EDMG\text{-}Pream\text{-}Data}^{i_{TX}(4)}\left(n\frac{T_c}{N_{up}}\right)$$

denotes an up-sampled and filtered waveform corresponding to a transmit chain number $i_{TX}$, $T_c$ denotes a Single Carrier (SC) chip time duration, $\Delta F$ denotes a sub-channel spacing equal to 2.16 GHz, and $\Delta t_1$ and $\Delta t_2$ are in the range $[0, T_c]$.

Example 140 includes the subject matter of any one of Examples 135-137, and optionally, comprising means for, when the EDMG PPDU is to be transmitted over a 6.48 GHz bandwidth, determining the PPDU waveform corresponding to the transmit chain to comprise the following waveform:

$$r^{i_{TX}}_{EDMG\text{-}Pream\text{-}Data}\left(n\frac{T_c}{N_{up}}\right) == r^{i_{TX}(4)}_{EDMG\text{-}Pream\text{-}Data}\left(n\frac{T_c}{N_{up}} + \Delta t_1\right) \cdot \frac{1}{\sqrt{3}}$$

$$\exp\left(-j2\pi\Delta F\left(\frac{T_c}{N_{up}}\right)n\right) + + r^{i_{TX}(4)}_{EDMG\text{-}Pream\text{-}Data}\left(n\frac{T_c}{N_{up}} + \Delta t_2\right) \cdot \frac{1}{\sqrt{3}} + +$$

$$r^{i_{TX}(4)}_{EDMG\text{-}Pream\text{-}Data}\left(n\frac{T_c}{N_{up}} + \Delta t_3\right) \cdot \frac{1}{\sqrt{3}}$$

$$\exp\left(+j2\pi\Delta F\left(\frac{T_c}{N_{up}}\right)n\right), 1 \le i_{TX} \le N_{TX}$$

wherein:

$$r^{i_{TX}(4)}_{EDMG\text{-}Pream\text{-}Data}\left(n\frac{T_c}{N_{up}}\right)$$

denotes an up-sampled and filtered waveform corresponding to a transmit chain number $i_{TX}$,
$T_c$ denotes a Single Carrier (SC) chip time duration,
$\Delta F$ denotes a sub-channel spacing equal to 2.16 GHz, and
$\Delta t_1$, $\Delta t_2$, and $\Delta t_3$ are in the range [0, $T_c$].

Example 141 includes the subject matter of any one of Examples 135-137, and optionally, comprising means for, when the EDMG PPDU is to be transmitted over a 8.64 GHz bandwidth, determining the PPDU waveform corresponding to the transmit chain to comprise the following waveform:

$$r^{i_{TX}}_{EDMG\text{-}Pream\text{-}Data}\left(n\frac{T_c}{N_{up}}\right) == r^{i_{TX}(4)}_{EDMG\text{-}Pream\text{-}Data}\left(n\frac{T_c}{N_{up}} + \Delta t_1\right) \cdot \frac{1}{\sqrt{4}}$$

$$\exp\left(-j2\pi\left(\frac{3\Delta F}{2}\right)\left(\frac{T_c}{N_{up}}\right)n\right) + + r^{i_{TX}(4)}_{EDMG\text{-}Pream\text{-}Data}\left(n\frac{T_c}{N_{up}} + \Delta t_2\right) \cdot \frac{1}{\sqrt{4}}$$

$$\exp\left(-j2\pi\left(\frac{\Delta F}{2}\right)\left(\frac{T_c}{N_{up}}\right)n\right) + + r^{i_{TX}(4)}_{EDMG\text{-}Pream\text{-}Data}\left(n\frac{T_c}{N_{up}} + \Delta t_3\right) \cdot \frac{1}{\sqrt{4}}$$

$$\exp\left(+j2\pi\left(\frac{\Delta F}{2}\right)\left(\frac{T_c}{N_{up}}\right)n\right) + + r^{i_{TX}(4)}_{EDMG\text{-}Pream\text{-}Data}\left(n\frac{T_c}{N_{up}} + \Delta t_4\right) \cdot \frac{1}{\sqrt{4}}$$

$$\exp\left(+j2\pi\left(\frac{3\Delta F}{2}\right)\left(\frac{T_c}{N_{up}}\right)n\right), 1 \le i_{TX} \le N_{TX}$$

wherein:

$$r^{i_{TX}(4)}_{EDMG\text{-}Pream\text{-}Data}\left(n\frac{T_c}{N_{up}}\right)$$

denotes an up-sampled and filtered waveform corresponding to a transmit chain number $i_{TX}$,
$T_c$ denotes a Single Carrier (SC) chip time duration,
$\Delta F$ denotes a sub-channel spacing equal to 2.16 GHz, and
$\Delta t_1$, $\Delta t_2$, $\Delta t_3$, and $\Delta t_4$ are in the range [0, $T_c$].

Example 142 includes the subject matter of any one of Examples 119-141, and optionally, comprising means for generating the PPDU comprising a training (TRN) field, and generating the PPDU waveform corresponding to the transmit chain based on a waveform for the TRN field.

Example 143 includes the subject matter of Example 142, and optionally, comprising means for generating the waveform for the TRN field by filtering and resampling a TRN field corresponding to the number of the transmit chain.

Example 144 includes the subject matter of Example 142 or 143, and optionally, comprising means for determining the waveform for the TRN field based on the following resampling procedure:

$$r^{i_{TX}(2)}_{TRN}\left(n\frac{T_c}{3N_{CB}}\right) = \begin{cases} r^{i_{TX}(1)}_{TRN}\left(n\frac{T_c}{3N_{CB}}\right), & n = 0, 3, 6 \ldots \\ 0 & \text{otherwise} \end{cases}$$

$$r^{i_{TX}(3)}_{TRN}\left(n\frac{T_c}{3N_{CB}}\right) = \sum_{k=0}^{K-1} r^{i_{TX}(2)}_{TRN}\left((n-k)\frac{T_c}{3N_{CB}}\right) h_{SCCB}(k), n = 0, 1, \ldots$$

$$r^{i_{TX}(4)}_{TRN}\left(n\frac{2T_c}{3N_{CB}}\right) = r^{i_{TX}(3)}_{TRN}\left(\left(2n + \frac{K-1}{2}\right)\frac{T_c}{3N_{CB}}\right), n = 0, 1, \ldots$$

wherein:

$$r^{i_{TX}(1)}_{TRN}\left(n\frac{T_c}{N_{CB}}\right)$$

denotes a TRN field corresponding to a transmit chain number $i_{TX}$,
$T_c$ denotes a Single Carrier (SC) chip time duration,
$N_{up}$ denotes a factor value,
$N_{up}$ denotes a channel bonding factor,
$h_{SCCB}$ denotes a response of a pulse shaping filter,
K denotes a length of the pulse shaping filter in samples, and $$r^{i_{TX}(2)}_{TRN}\left(n\frac{T_c}{3N_{CB}}\right) = 0, \text{ for } n < 0 \text{ and } n \ge \text{length}\left(r^{i_{TX}(1)}_{TRN}\right) \times 3.$$

Example 145 includes the subject matter of any one of Examples 119-144, and optionally, comprising means for transmitting the PPDU in a Single Carrier (SC) transmission.

Example 146 includes the subject matter of any one of Examples 119-145, and optionally, wherein the PPDU comprises a control mode PPDU.

Example 147 includes the subject matter of any one of Examples 119-146, and optionally, comprising means for transmitting the PPDU over a channel bandwidth of 2.16 GHz, 4.32 GHz, 6.48 GHz, or 8.64 GHz.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
a processor comprising logic and circuitry configured to cause an Enhanced Directional Multi-Gigabit (DMG) (EDMG) wireless communication station (STA) to:
generate one or more non-EDMG waveforms corresponding to one or more respective transmit chains, wherein a non-EDMG waveform corresponding to a transmit chain of the one or more transmit chains is based on a matrix element of a spatial mapping matrix, wherein an index of the matrix element is based on a transmit chain number of the transmit chain; and transmit a non-EDMG Physical Layer (PHY) Protocol Data Unit (PPDU) via the one or more transmit chains based on the one or more non-EDMG waveforms; and a memory to store information processed by the processor.

2. The apparatus of claim 1, wherein a row index of the matrix element is equal to the transmit chain number of the transmit chain, and a column index of the matrix element is 1.

3. The apparatus of claim 1 configured to cause the EDMG STA to generate the one or more non-EDMG waveforms based on a waveform $r_{non\text{-}EDMG}^{i_{TX}(1)}(nT_c)$ defined as follows:

$$r_{non\text{-}EDMG}^{i_{TX}(1)}(nT_c) = [Q]_{i_{TX},1} \cdot r_{non\text{-}EDMG}(nT_c),$$
$$1 \leq i_{TX} \leq N_{TX}$$

wherein $i_{Tx}$ denotes the transmit chain number, $N_{Tx}$ denotes a total count of the one or more transmit chains, $r_{non\text{-}EDMG}(nT_c)$ denotes modulated fields of the non-EDMG PPDU, Q denotes the spatial mapping matrix, and $[\;]_{m,n}$ denotes a matrix element from an m-th row and an n-th column.

4. The apparatus of claim 1 configured to cause the EDMG STA to:
   determine a first waveform corresponding to the transmit chain based on the matrix element of the spatial mapping matrix;
   determine a second waveform corresponding to the transmit chain by up-sampling and filtering the first waveform according to an up-sampling factor and a pulse-shaping filter impulse response; and
   determine the non-EDMG waveform corresponding to the transmit chain based on the second waveform and according to a channel bandwidth for transmission of the non-EDMG PPDU.

5. The apparatus of claim 4, wherein the up-sampling factor and the pulse-shaping filter impulse response are implementation dependent.

6. The apparatus of claim 1 configured to cause the EDMG STA to determine the one or more non-EDMG waveforms based on the following up-sampled and filtered waveforms:

$$r_{non\text{-}EDMG}^{i_{TX}(2)}\left(n\frac{T_c}{N_{up}}\right) = \begin{cases} r_{non\text{-}EDMG}^{i_{TX}(1)}\left(n\frac{T_c}{N_{up}}\right), & n = 0, N_{up}, 2*N_{up} \ldots \\ 0 & \text{otherwise} \end{cases}$$

$$r_{non\text{-}EDMG}^{i_{TX}(3)}\left(n\frac{T_c}{N_{up}}\right) = \sum_{k=0}^{K-1} r_{non\text{-}EDMG}^{i_{TX}(2)}\left((n-k)\frac{T_c}{N_{up}}\right) h_{SCCB}(k), n = 0, 1, \ldots$$

$$r_{non\text{-}EDMG}^{i_{TX}(4)}\left(n\frac{T_c}{N_{up}}\right) = r_{non\text{-}EDMG}^{i_{TX}(3)}\left(\left(n+\frac{K-1}{2}\right)\frac{T_c}{N_{up}}\right), n = 0, 1, \ldots$$

wherein:

$$r_{non\text{-}EDMG}^{i_{TX}(4)}\left(n\frac{T_c}{N_{up}}\right)$$

denotes an up-sampled and filtered waveform corresponding to a transmit chain number $i_{TX}$,
   $h_{SCCB}$ denotes a pulse-shaping filter impulse response,
   $T_c$ denotes a Single Carrier (SC) chip time duration,
   $N_{up}$ denotes an up-sampling factor value,
   K denotes a length of $h_{SCCB}$ in samples, and $$r_{non\text{-}EDMG}^{i_{TX}(2)}\left(n\frac{T_c}{N_{up}}\right) = 0, \text{ for } n < 0 \text{ and } n \geq \text{length}\left(r_{non\text{-}EDMG}^{i_{TX}(1)}\right) \times N_{up}.$$

7. The apparatus of claim 1 configured to, when the non-EDMG PPDU is to be transmitted over a channel bandwidth of 2.16 Gigahertz (GHz), determine the one or more non-EDMG waveforms as follows:

$$r_{PPDU}^{i_{TX}}\left(n\frac{T_c}{N_{up}}\right) = r_{non\text{-}EDMG}^{i_{TX}(4)}\left(n\frac{T_c}{N_{up}}\right), 1 \leq i_{TX} \leq N_{TX}$$

wherein:

$$r_{PPDU}^{i_{TX}}\left(n\frac{T_c}{N_{up}}\right)$$

denotes a non-EDMG waveform corresponding to a transmit chain number $i_{TX}$, $$r_{non\text{-}EDMG}^{i_{TX}(4)}\left(n\frac{T_c}{N_{up}}\right)$$

denotes an up-sampled and filtered waveform corresponding to the transmit chain number $i_{TX}$,
   $N_{Tx}$ denotes a total count of the one or more transmit chains,
   $N_{up}$ denotes an up-sampling factor value, and
   $T_c$ denotes a Single Carrier (SC) chip time duration.

8. The apparatus of claim 1 configured to, when the non-EDMG PPDU is to be transmitted over a channel bandwidth of 4.32 Gigahertz (GHz), determine the one or more non-EDMG waveforms as follows:

$$r_{PPDU}^{i_{TX}}\left(n\frac{T_c}{N_{up}}\right) = r_{non\text{-}EDMG}^{i_{TX}(4)}\left(n\frac{T_c}{N_{up}} + \Delta t_1\right) \cdot \frac{1}{\sqrt{2}} \exp\left(-j2\pi\left(\frac{\Delta F}{2}\right)\left(\frac{T_c}{N_{up}}\right)n\right) + + r_{non\text{-}EDMG}^{i_{TX}(4)}\left(n\frac{T_c}{N_{up}} + \Delta t_2\right) \cdot \frac{1}{\sqrt{2}} \exp\left(+j2\pi\left(\frac{\Delta F}{2}\right)\left(\frac{T_c}{N_{up}}\right)n\right), 1 \leq i_{TX} \leq N_{TX}$$

wherein:

$$r_{PPDU}^{i_{TX}}\left(n\frac{T_c}{N_{up}}\right)$$

denotes a non-EDMG waveform corresponding to a transmit chain number $i_{TX}$, $$r_{non\text{-}EDMG}^{i_{TX}(4)}\left(n\frac{T_c}{N_{up}}\right)$$

denotes an up-sampled and filtered waveform corresponding to the transmit chain number $i_{TX}$,
   $N_{Tx}$ denotes a total count of the one or more transmit chains,
   $N_{up}$ denotes an up-sampling factor value,
   $T_c$ denotes a Single Carrier (SC) chip time duration, ΔF denotes a sub-channel spacing equal to 2.16 GHz, and Δt$_1$ and Δt$_2$ are in the range [0, T$_c$].

9. The apparatus of claim 1 configured to, when the non-EDMG PPDU is to be transmitted over a channel bandwidth of 6.48 Gigahertz (GHz), determine the one or more non-EDMG waveforms as follows:

$$r_{PPDU}^{i_{TX}}\left(n\frac{T_c}{N_{up}}\right) = r_{non\text{-}EDMG}^{i_{TX}(4)}\left(n\frac{T_c}{N_{up}}+\Delta t_1\right)\cdot\frac{1}{\sqrt{3}}$$
$$\exp\left(-j2\pi\Delta F\left(\frac{T_c}{N_{up}}\right)n\right)++r_{non\text{-}EDMG}^{i_{TX}(4)}\left(n\frac{T_c}{N_{up}}+\Delta t_2\right)\cdot\frac{1}{\sqrt{3}}++$$
$$r_{non\text{-}EDMG}^{i_{TX}(4)}\left(n\frac{T_c}{N_{up}}+\Delta t_3\right)\cdot\frac{1}{\sqrt{3}}\exp\left(+j2\pi\Delta F\left(\frac{T_c}{N_{up}}\right)n\right), 1\le i_{TX}\le N_{TX}$$

wherein:

$$r_{PPDU}^{i_{TX}}\left(n\frac{T_c}{N_{up}}\right)$$

denotes a non-EDMG waveform corresponding to a transmit chain number $i_{TX}$, $$r_{non\text{-}EDMG}^{i_{TX}(4)}\left(n\frac{T_c}{N_{up}}\right)$$

denotes an up-sampled and filtered waveform corresponding to the transmit chain number $i_{TX}$, N$_{Tx}$ denotes a total count of the one or more transmit chains, N$_{up}$ denotes an up-sampling factor value, T$_c$ denotes a Single Carrier (SC) chip time duration, ΔF denotes a sub-channel spacing equal to 2.16 GHz, and Δt$_1$, Δt$_2$, and Δt$_3$ are in the range [0, T$_c$].

10. The apparatus of claim 1 configured to, when the non-EDMG PPDU is to be transmitted over a channel bandwidth of 8.64 Gigahertz (GHz), determine the one or more non-EDMG waveforms as follows:

$$r_{PPDU}^{i_{TX}}\left(n\frac{T_c}{N_{up}}\right)=r_{non\text{-}EDMG}^{i_{TX}(4)}\left(n\frac{T_c}{N_{up}}+\Delta t_1\right)\cdot\frac{1}{\sqrt{4}}\exp\left(-j2\pi\left(\frac{3\Delta F}{2}\right)\left(\frac{T_c}{N_{up}}\right)n\right)++$$
$$r_{non\text{-}EDMG}^{i_{TX}(4)}\left(n\frac{T_c}{N_{up}}+\Delta t_2\right)\cdot\frac{1}{\sqrt{4}}\exp\left(-j2\pi\left(\frac{\Delta F}{2}\right)\left(\frac{T_c}{N_{up}}\right)n\right)++$$
$$r_{non\text{-}EDMG}^{i_{TX}(4)}\left(n\frac{T_c}{N_{up}}+\Delta t_3\right)\cdot\frac{1}{\sqrt{4}}\exp\left(+j2\pi\left(\frac{\Delta F}{c}\right)\left(\frac{T_c}{N_{up}}\right)n\right)++$$
$$r_{non\text{-}EDMG}^{i_{TX}(4)}\left(n\frac{T_c}{N_{up}}+\Delta t_4\right)\cdot\frac{1}{\sqrt{4}}\exp\left(+j2\pi\left(\frac{3\Delta F}{2}\right)\left(\frac{T_c}{N_{up}}\right)n\right), 1\le i_{TX}\le N_{TX}$$

wherein:

$$r_{PPDU}^{i_{TX}}\left(n\frac{T_c}{N_{up}}\right)$$

denotes a non-EDMG waveform corresponding to a transmit chain number $i_{TX}$, $$r_{non\text{-}EDMG}^{i_{TX}(4)}\left(n\frac{T_c}{N_{up}}\right)$$

denotes an up-sampled and filtered waveform corresponding to the transmit chain number $i_{TX}$, N$_{Tx}$ denotes a total count of the one or more transmit chains, N$_{up}$ denotes an up-sampling factor value, T$_c$ denotes a Single Carrier (SC) chip time duration, ΔF denotes a sub-channel spacing equal to 2.16 GHz, and Δt$_1$, Δt$_2$, Δt$_3$, and Δt$_4$ are in the range [0, T$_c$].

11. The apparatus of claim 1, wherein the spatial mapping matrix comprises a digital beamforming spatial mapping matrix.

12. The apparatus of claim 1 configured to cause the EDMG STA to transmit the non-EDMG PPDU according to a hybrid beamforming scheme comprising digital beamforming according to the spatial mapping matrix, and analog beamforming according to an Antenna Weight Vector (AWV).

13. The apparatus of claim 1, wherein the non-EDMG PPDU is configured for decoding by one or more non-EDMG stations, which are DMG stations.

14. The apparatus of claim 1 configured to cause the EDMG STA to transmit the non-EDMG PPDU over a channel bandwidth of at least 2.16 Gigahertz (GHz) in a frequency band above 45 GHz.

15. The apparatus of claim 1 comprising a radio comprising the one or more transmit chains, the processor configured to cause the radio to transmit the non-EDMG PPDU.

16. The apparatus of claim 15 comprising one or more antennas connected to the radio, and another processor to execute instructions of an operating system.

17. A product comprising one or more tangible computer-readable non-transitory storage media comprising computer-executable instructions operable to, when executed by at least one processor, enable the at least one processor to cause an Enhanced Directional Multi-Gigabit (DMG) (EDMG) wireless communication station (STA) to:

generate one or more non-EDMG waveforms corresponding to one or more respective transmit chains, wherein a non-EDMG waveform corresponding to a transmit chain of the one or more transmit chains is based on a matrix element of a spatial mapping matrix, wherein an index of the matrix element is based on a transmit chain number of the transmit chain; and transmit a non-EDMG Physical Layer (PHY) Protocol Data Unit (PPDU) via the one or more transmit chains based on the one or more non-EDMG waveforms.

18. The product of claim 17, wherein a row index of the matrix element is equal to the transmit chain number of the transmit chain, and a column index of the matrix element is 1.

19. The product of claim 17, wherein the instructions, when executed, cause the EDMG STA to generate the one or more non-EDMG waveforms based on a waveform $r_{non\text{-}EDMG}^{i_{TX}(1)}(nT_c)$ defined as follows:

$$r_{non\text{-}EDMG}^{i_{TX}(1)}(nT_c)=[Q]_{i_{TX},1}\cdot r_{non\text{-}EDMG}(nT_c),$$
$$1\le i_{TX}\le N_{TX}$$

wherein $i_{Tx}$ denotes the transmit chain number, N$_{Tx}$ denotes a total count of the one or more transmit chains, $r_{non\text{-}EDMG}(nT_c)$ denotes modulated fields of the non-EDMG PPDU, Q denotes the spatial mapping matrix, and [ ]$_{m,n}$ denotes a matrix element from an m-th row and an n-th column.

20. The product of claim 17, wherein the instructions, when executed, cause the EDMG STA to:
- determine a first waveform corresponding to the transmit chain based on the matrix element of the spatial mapping matrix;
- determine a second waveform corresponding to the transmit chain by up-sampling and filtering the first waveform according to an up-sampling factor and a pulse-shaping filter impulse response; and
- determine the non-EDMG waveform corresponding to the transmit chain based on the second waveform and according to a channel bandwidth for transmission of the non-EDMG PPDU.

21. The product of claim 17, wherein the instructions, when executed, cause the EDMG STA to determine the one or more non-EDMG waveforms based on the following up-sampled and filtered waveforms:

$$r^{i_{TX}(2)}_{non\text{-}EDMG}\left(n\frac{T_c}{N_{up}}\right) = \begin{cases} r^{i_{TX}(1)}_{non\text{-}EDMG}\left(n\frac{T_c}{N_{up}}\right), & n = 0, N_{up}, 2*N_{up} \ldots \\ 0 & \text{otherwise} \end{cases}$$

$$r^{i_{TX}(3)}_{non\text{-}EDMG}\left(n\frac{T_c}{N_{up}}\right) = \sum_{k=0}^{K-1} r^{i_{TX}(2)}_{non\text{-}EDMG}\left((n-k)\frac{T_c}{N_{up}}\right) h_{SCCB}(k), n = 0, 1, \ldots$$

$$r^{i_{TX}(4)}_{non\text{-}EDMG}\left(n\frac{T_c}{N_{up}}\right) = r^{i_{TX}(3)}_{non\text{-}EDMG}\left(\left(n + \frac{K-1}{2}\right)\frac{T_c}{N_{up}}\right), n = 0, 1, \ldots$$

wherein:

$$r^{i_{TX}(4)}_{non\text{-}EDMG}\left(n\frac{T_c}{N_{up}}\right)$$

denotes an up-sampled and filtered waveform corresponding to a transmit chain number $i_{TX}$,
- $h_{SCCB}$ denotes a pulse-shaping filter impulse response,
- $T_c$ denotes a Single Carrier (SC) chip time duration,
- $N_{up}$ denotes an up-sampling factor value,
- K denotes a length of $h_{SCCB}$ in samples, and $$r^{i_{TX}(2)}_{non\text{-}EDMG,}\left(n\frac{T_c}{N_{up}}\right) = 0, \text{ for } n < 0 \text{ and } n \geq \text{length}\left(r^{i_{TX}(1)}_{non\text{-}EDMG}\right) \times N_{up}.$$

22. The product of claim 17, wherein the instructions, when executed, cause the EDMG STA to transmit the non-EDMG PPDU according to a hybrid beamforming scheme comprising digital beamforming according to the spatial mapping matrix, and analog beamforming according to an Antenna Weight Vector (AWV).

23. An apparatus comprising:
- means for causing an Enhanced Directional Multi-Gigabit (DMG) (EDMG) wireless communication station (STA) to generate one or more non-EDMG waveforms corresponding to one or more respective transmit chains, wherein a non-EDMG waveform corresponding to a transmit chain of the one or more transmit chains is based on a matrix element of a spatial mapping matrix, wherein an index of the matrix element is based on a transmit chain number of the transmit chain; and
- means for causing the EDMG STA to transmit a non-EDMG Physical Layer (PHY) Protocol Data Unit (PPDU) via the one or more transmit chains based on the one or more non-EDMG waveforms.

24. The apparatus of claim 23 comprising means for causing the EDMG STA to generate the one or more non-EDMG waveforms by:
- determining a first waveform corresponding to the transmit chain based on the matrix element of the spatial mapping matrix;
- determining a second waveform corresponding to the transmit chain by up-sampling and filtering the first waveform according to an up-sampling factor and a pulse-shaping filter impulse response; and
- determining the non-EDMG waveform corresponding to the transmit chain based on the second waveform and according to a channel bandwidth for transmission of the non-EDMG PPDU.

* * * * *